United States Patent
Keith et al.

(10) Patent No.: US 10,601,251 B2
(45) Date of Patent: Mar. 24, 2020

(54) SYSTEM AND METHOD FOR POWER TRANSFER

(71) Applicant: Apple Inc., Cupertino, CA (US)

(72) Inventors: Aaron Rex Keith, Auckland (NZ); Arunim Kumar, Auckland (NZ); Junbo Zeng, Auckland (NZ); Lewis Freeth Harpham, Auckland (NZ); Paul David Marson, Auckland (NZ); Sander Vocke, Auckland (NZ); Ya-Ting Wang, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/503,547

(22) PCT Filed: Aug. 12, 2015

(86) PCT No.: PCT/NZ2015/050106
§ 371 (c)(1),
(2) Date: Feb. 13, 2017

(87) PCT Pub. No.: WO2016/024869
PCT Pub. Date: Feb. 18, 2016

(65) Prior Publication Data
US 2017/0237296 A1 Aug. 17, 2017
US 2019/0245383 A9 Aug. 8, 2019

Related U.S. Application Data

(60) Provisional application No. 62/108,495, filed on Jan. 27, 2015, provisional application No. 62/099,990, (Continued)

(30) Foreign Application Priority Data

Aug. 3, 2015 (NZ) ........................................ 710703

(51) Int. Cl.
*H02J 50/12* (2016.01)
*H02J 50/40* (2016.01)
(Continued)

(52) U.S. Cl.
CPC ............ *H02J 50/12* (2016.02); *H02J 7/0042* (2013.01); *H02J 7/025* (2013.01); *H02J 7/045* (2013.01); *H02J 50/40* (2016.02); *H02J 50/80* (2016.02)

(58) Field of Classification Search
None
See application file for complete search history.

(56) References Cited

U.S. PATENT DOCUMENTS 4,873,677 A 10/1989 Sakamoto et al.
4,960,983 A 10/1990 Inoue
(Continued)

FOREIGN PATENT DOCUMENTS

CN 101461114 6/2009
EP 2602908 A1 6/2013
(Continued)

OTHER PUBLICATIONS

International Search Report for International Application No. PCT/NZ2015/050106 dated Dec. 9, 2015 (5 pages).
(Continued)

*Primary Examiner* — Jared Fureman
*Assistant Examiner* — Aqeel Bukhari
(74) *Attorney, Agent, or Firm* — Blank Rome LLP

(57) ABSTRACT

A system for inductive power transfer that may selectively transmit power in a plurality of modes based on characteristics of a power receiver and determine which transmitter coils to drive based on received signal strength information. The inductive power transfer transmitter may detect characteristics of the power receiver in order to control the mode
(Continued)

of the power transfer and selectively control which transmitter coils are driven based on signal strength information received from a power receiver. The power transmitter may have slugs formed of a magnetically permeable material within common coil winding openings and the transmitter coils may consists of a plurality of parallel windings.

22 Claims, 42 Drawing Sheets

Related U.S. Application Data filed on Jan. 5, 2015, provisional application No. 62/070,042, filed on Aug. 12, 2014, provisional application No. 62/036,622, filed on Aug. 13, 2014.

(51) Int. Cl.
*H02J 50/80* (2016.01)
*H02J 7/02* (2016.01)
*H02J 7/04* (2006.01)
*H02J 7/00* (2006.01)

(56) References Cited

U.S. PATENT DOCUMENTS

| | | |
|---|---|---|
| 4,973,907 A | 11/1990 | Bergman et al. |
| 5,000,178 A | 3/1991 | Griffith |
| 5,469,036 A | 11/1995 | Eto |
| 5,496,036 A | 3/1996 | Chester |
| 5,803,744 A | 9/1998 | Yen |
| 5,959,433 A | 9/1999 | Rohde |
| 6,151,231 A | 11/2000 | Saint-Pierre et al. |
| 6,219,267 B1 | 4/2001 | Andres |
| 6,320,772 B1 | 11/2001 | Doyama et al. |
| 7,164,255 B2 | 1/2007 | Hui |
| 7,880,337 B2 | 2/2011 | Farkas |
| 7,915,858 B2 | 3/2011 | Liu et al. |
| 7,948,208 B2 | 5/2011 | Partovi et al. |
| 8,169,185 B2 | 5/2012 | Partovi et al. |
| 8,258,653 B2 | 9/2012 | Kitamura et al. |
| 8,299,753 B2 | 10/2012 | Hui |
| 8,519,668 B2 | 8/2013 | Hui |
| 8,629,652 B2 | 1/2014 | Partovi et al. |
| 8,629,654 B2 | 1/2014 | Partovi et al. |
| 2005/0068019 A1 | 3/2005 | Nakamura et al. |
| 2005/0133497 A1 | 6/2005 | Makoto |
| 2005/0140482 A1 | 6/2005 | Cheng et al. |
| 2007/0064406 A1 | 3/2007 | Beart |
| 2007/0131505 A1 | 6/2007 | Kim |
| 2010/0109604 A1 | 5/2010 | Boys et al. |
| 2010/0259217 A1 | 10/2010 | Baarman et al. |
| 2011/0089768 A1 | 4/2011 | Byrne et al. |
| 2013/0026850 A1 | 1/2013 | Throngnumchai et al. |
| 2013/0030892 A1 | 1/2013 | Liu et al. |
| 2013/0119773 A1 | 5/2013 | Davis |
| 2013/0175984 A1* | 7/2013 | Yamazaki ............ H04B 5/0037 320/108 |
| 2014/0091755 A1 | 4/2014 | Walley et al. |
| 2014/0197687 A1 | 7/2014 | Lin |
| 2016/0099602 A1* | 4/2016 | Leabman ................ H02J 7/025 307/104 |

FOREIGN PATENT DOCUMENTS

| | | |
|---|---|---|
| EP | 3127215 A1 | 2/2017 |
| JP | 60-254400 A | 12/1985 |
| JP | H01157896 A | 6/1989 |
| JP | H06277358 | 10/1994 |
| JP | 2846090 B2 | 1/1999 |
| JP | 2001044054 | 2/2001 |
| JP | 2001196249 A | 7/2001 |
| JP | 2002246248 | 8/2002 |
| JP | 2005302959 A | 10/2005 |
| JP | 06-029128 A | 2/2006 |
| JP | 2006042519 | 2/2006 |
| JP | 06-105471 A | 4/2006 |
| JP | 2006128381 | 5/2006 |
| JP | 2006245363 A | 9/2006 |
| JP | 2007505480 | 3/2007 |
| JP | 2009088479 A | 4/2009 |
| JP | 2009164293 A | 7/2009 |
| JP | 2010538596 A | 12/2010 |
| JP | 2011229360 | 11/2011 |
| JP | 2011229360 A | 11/2011 |
| JP | 2012119496 A | 6/2012 |
| JP | 2012120328 A | 6/2012 |
| JP | 2013534040 A | 8/2013 |
| KR | 100944113 | 2/2010 |
| KR | 1020100017582 | 2/2010 |
| WO | 2003105308 | 12/2003 |
| WO | 2005024865 | 3/2005 |
| WO | 2005033819 A2 | 4/2005 |
| WO | 2005109598 A1 | 11/2005 |
| WO | 2007031897 A1 | 3/2007 |
| WO | 200712632 | 11/2007 |
| WO | 2008137996 A1 | 11/2008 |
| WO | 2008140333 | 11/2008 |
| WO | 2009027674 A1 | 3/2009 |
| WO | 2009004587 A2 | 4/2009 |
| WO | 2010090538 A1 | 8/2010 |
| WO | 2010090539 | 8/2010 |
| WO | 2010090539 A1 | 8/2010 |
| WO | 2011016736 | 2/2011 |
| WO | 2011016737 | 2/2011 |
| WO | 2011016737 A1 | 2/2011 |
| WO | 2012073427 A1 | 6/2012 |
| WO | 2013103943 A1 | 7/2013 |
| WO | 2013122483 A1 | 8/2013 |
| WO | 2014011059 A1 | 1/2014 |
| WO | 2014083015 A1 | 6/2014 |

OTHER PUBLICATIONS

International Search Report for International Application No. PCT/NZ2015/050106 dated Dec. 9, 2015 (9 pages).
Gao. "Demodulating Communication Signals of Qi-Compliant Low-Power Wireless Charger Using MC56F8006 DSC." Freescale Semiconductor Inc. (2013) pp. 1-21.
Waffenschmidt et al. "Limitation of inductive power transfer for consumer applications." 13th European Conference on Power Electronics (EPE), (Sep. 8, 2009), pp. 1-10.
European Search Report for EP Application No. 15832412.9 dated Aug. 14, 2017 (9 pages).
Boys, John T., et al., "Controlling Inrush Currents in Inductively Coupled Power Systems", 2005 International Power Engineering Conference, Nov. 29, 2005-Dec. 2, 2005, 7, IEEE, Singapore, Singapore.

* cited by examiner

SYSTEM AND METHOD FOR POWER TRANSFER

This application is a National Stage Application of PCT/NZ2015/050106, filed 12 Aug. 2015, which claims benefit of U.S. Provisional Ser. No. 62/070,042, filed 12 Aug. 2014, U.S. Provisional Ser. No. 62/036,622, filed 13 Aug. 2014, U.S. Provisional Ser. No. 62/099,990, filed 5 Jan. 2015, U.S. Provisional Ser. No. 62/108,495, filed 27 Jan. 2015, and NZ Serial No. 710703 filed 3 Aug. 2015 and which applications are incorporated herein by reference. To the extent appropriate, a claim of priority is made to each of the above disclosed applications.

FIELD OF THE INVENTION

The present invention is in the field of wireless or inductive power transfer. More particularly, but not exclusively, the present invention is directed to systems and methods for inductive power transfer for consumer electronic devices.

BACKGROUND OF THE INVENTION

IPT technology is an area of increasing development and IPT systems are now utilised in a range of applications and with various configurations. One such application is the use of IPT systems in so called 'charging mats' or pads. Such charging mats will normally provide a planar charging surface onto which portable electronic devices (such as smartphones) may be placed to be charged or powered wirelessly.

Typically, the charging mat will include a transmitter having one or more power transmission coils arranged parallel to the planar charging surface of the charging mat. The transmitter drives the transmitting coils so that the transmitting coils generate a time-varying magnetic field in the immediate vicinity of the planar surface. When portable electronic devices are placed on or near the planar surface, the time-varying magnetic field will induce an alternating current in the receiving coil of a suitable receiver associated with the device (for example a receiver incorporated into the device itself). The received power may then be used to charge a battery, or power the device or some other load.

A problem associated with charging mat design is ensuring that the inductive power transfer is adequately efficient. One approach is to require precise alignment between the transmitting coil and the receiving coil. This may be achieved, for example, by having markings or indentations on the planar charging surface so that when a user places the device on the charging mat alignment between the coils can be guaranteed. However, this approach is not ideal since it requires the user to place their device carefully onto the charging mat.

Another problem associated with charging mat design is enabling multiple devices to be charged simultaneously in an efficient and cost effective manner. Some conventional designs use a single large transmitting coil corresponding to the entire surface of the charging mat. In this instance, one or more devices may be placed anywhere on the surface of the charging mat. This allows more freedom in terms of where a user may place a device on the charging mat. However, the magnetic field produced by a large transmitting coil may not be uniform, with 'weak spots' towards the centre of the charging mat. Further, since the entire surface is being 'powered' it is possible that any portions of the surface not covered by a device being charged may be a safety hazard.

Another conventional approach for multi-device charging is to have an array of smaller transmitting coils. In order to provide efficient and safe power transfer, the charging mat detects the position of the devices using a suitable detection mechanism and activates the most proximate transmitting coil or coils. Though this allows more freedom in terms of where a user may place a device, like the single coil design, the boundary between adjacent transmitting coils can result in weak spots due to the cancelling effects of adjacent coils whereby receivers do not receiver sufficient power.

A further problem arises when a non-receiver is brought into the range of the transmitter, and an unwanted current (and therefore heat) is induced therein. These non-receivers are typically known as parasitic loads or foreign objects. Detection of the presence of a receiver device is conventionally possible, but it may also be necessary to identify the receiver as being compatible with the particular transmitter. Attempting to transfer power to non-compatible receivers may result in inefficient power transfer (thus, undesired energy loss), or transmitter and/or receiver failure.

An obvious solution to the problems outlined above is to include a manually operated power switch with the transmitter. Though this provides a means for controlling when the transmitter should be powered, it undermines the convenience that is a goal of many IPT systems. It also requires a user to manually switch off the transmitter when the receiver is removed and does not accommodate any parasitic loads that may be introduced into the vicinity of the transmitter without the user's knowledge.

The invention provides an inductive power transfer system and methods that achieve reliable and efficient wireless power transfer for multi-device powering or at least provides the public with a useful choice.

SUMMARY OF THE INVENTION

According to one exemplary embodiment there is provided a system for power transfer, and method of operating that system. The system includes a power transmitter and a power receiver. The power transmitter has a plurality of transmitter coils which can be selectively caused to transmit power in a plurality of modes under control of a controller to a receiver coil of the power receiver. The controller is configured to detect characteristics of the power receiver in order to control the mode of the power transfer.

According to another exemplary embodiment there is provided a system for power transfer comprising a power transmitter and at least one power receiver, the power transmitter having a plurality of transmitter coils which can be selectively caused to transmit power in a plurality of modes under control of a controller to a receiver coil of the at least one power receiver, wherein the controller is configured to detect characteristics of the power receiver in order to control the mode of the power transfer.

The characteristics of the power receiver may include whether the power receiver comprises circuitry for controlling power flow to a load of the receiver.

The controller may be configured to communicate with the power receiver and to receive information from the power receiver on said characteristics. The controller may be configured to communicate with the power receiver through modulation of a power signal transmitted through electromagnetic induction between the power transmitter and receiver.

The power transmitter may include an object detector may be provided for detecting objects within a magnetic field induced by object detection coils.

The controller may extract receiver device version information from modulated power signals passing between coupled transmitter and receiver coils to control the mode of power transfer based on the version information.

The controller may also extract receiver device configuration information from modulated power signals passing between coupled transmitter and receiver coils to control the mode of power transfer based on the configuration information. The maximum power to be transmitted to the receiver device and/or the number of transmitter coils needed to power the receiver may be controlled according to the configuration information.

During a receiver location phase, prior to energy transfer, the controller may selectively control which one or ones of the transmitter coils are driven based on information received from the receiver as to a measure of signal strength received by the receiver from a driven transmitter coil. During the receiver location phase the control circuit may sequentially connect a drive signal from the power conditioning circuit to each power transmitting coil to energise each coil for a predetermined time.

According to another exemplary embodiment there is provided an inductive power transfer transmitter for supplying power to an inductive power transfer receiver having one or more receiver coils, the transmitter including:
  i. a plurality of transmitter coils;
  ii. a power conditioning circuit for supplying drive signals to transmitter coils when driven; and
  iii. a control circuit which selectively controls which one or ones of the transmitter coils are driven by the power conditioning circuit based on information received by the transmitter from the receiver as to measure of signal strength received by a receiver coil from a driven transmitter coil.

During the receiver location phase the control circuit sequentially connects a drive signal from the power conditioning circuit to each power transmitting coil to energise each coil for a predetermined time. The predetermined time corresponds to an expected receipt time for receiving a signal strength packet.

The control circuit may associate information received from a receiver in response to a coil being driven with the driven coil in order to select which one or ones of the transmitter coils are to be driven. A communications module may detect the modulation of power signals passing between coupled transmitter and receiver coils to develop a measure of coupling between a transmitter and receiver coil pair, preferably by extracting a signal strength value from a signal strength packet sent by a receiver to develop a measure of coupling between a transmitter and receiver coil pair.

Following selection of the one or ones of the transmitter coils, the one or ones of the transmitter coils may be energised for longer than the predetermined time in order to allow receipt of further packets from the receiver. The control circuit may select one or more transmitter coils to supply power to the receiver. A single transmitter coil having the highest associated signal strength value may be selected or two or more transmitter coils being the transmitter coil having the highest associated signal strength value and the transmitter coil having the next highest associated signal strength value.

The control circuit may control the power conditioning circuit in response to characteristics of the power receiver contained in information received by the transmitter.

The transmitter may include an object detection system and the control system may energise the transmitter coils when the object detection system detects an object.

The communications module may extract receiver identification information from modulated signals passing between coupled transmitter and receiver coils and control operation of the power conditioning circuit based on the identification information.

According to another exemplary embodiment there is provided, in an IPT power system including an IPT power transmitter having a plurality of transmitter coils and a power receiver having one or more receiver coils, a method of selectively driving one or more transmitter coils including the steps of:
  a. during a receiver location phase sequentially driving power transmitting coils to energise each coil for a predetermined time;
  b. detecting energisation of the one or more receiver coils of the receiver and in response thereto sending signal strength information from the receiver to the transmitter;
  c. associating received signal strength information with an energised transmitter coil; and
  d. determining which transmitter coil or coils to drive during power transfer based on the signal strength information associated with each transmitter coil.

The predetermined time may correspond to an expected receipt time for receiving a signal strength packet. The receiver may send signals to the transmitter by modulation of a power signal transmitted between the power transmitter and receiver. The signal strength information may be sent in a signal strength packet which may include receiver identification information. Receiver identification information may be sent in an identification packet to a coupled transmitter after the receiver location phase.

The transmitter may determine version information based on the receiver identification information. The mode of operation of the transmitter may be controlled according to the version information. The identification packet may include a version code identifying the mode of operation of the receiver. The identification packet may also include a manufacturer code identifying the manufacturer of the receiver. The identification packet may also include a unique Identifier.

The communications circuit sends receiver device configuration information to a coupled transmitter, preferably in a configuration packet. the configuration packet may include the maximum power to be transmitted. The power transmitter may supply power to the power receiver in dependence upon characteristics of the power receiver contained in information received by the transmitter.

Where every packet includes a receiver identification code, preferably a unique code, then the mode of power transfer may be based on the receiver identification code.

According to another exemplary embodiment there is provided an inductive power transfer receiver including:
  i. a receiver coil;
  ii. a signal strength measurement circuit for measuring the strength of a signal received by the receiver coil from an inductive power transfer transmitter coil; and
  iii. a communication circuit which, upon receiving power from an inductive power transfer transmitter coil, transmits a signal to the inductive power transfer transmitter as to the measured signal strength and receiver identification information.

According to another exemplary embodiment there is provided an inductive power transfer transmitter including a plurality of adjacent transmitter coils, each winding defining a central opening and the central openings of adjacent coils defining common openings, and slugs formed of a magnetically permeable material provided within at least some of the common openings and protruding above the transmitter coils.

The slugs may project from a layer of magnetically permeable material provided underneath the coils. At least some adjacent transmitter coils may have multiple layers and their layers may be interleaved.

According to another exemplary embodiment there is provided a transmitter wherein each winding defines a central opening and the central openings of adjacent coils define common openings and wherein slugs formed of a magnetically permeable material are provided within at least some of the common openings.

Each slug may protrude above the top surface of the transmitter coils. A plurality of transmitter coils may be provided with each coil having a plurality of winding layers with at least some coils being offset and their layers are interleaved. The slugs may project from a layer of magnetically permeable material provided underneath the coils.

The windings of each layer of at least some coils may be formed as a plurality of parallel windings electrically connected in parallel. The windings of each layer of at least some coils may be formed as three parallel windings electrically connected in parallel. The radial displacement of at least some of the parallel windings may change between layers. In one design a pair of parallel windings alternate between being closest to the centre of the coil and most distant from the centre of the coil between layers.

According to another exemplary embodiment there is provided an inductive power transfer transmitter including a plurality of transmitter coils wherein each coil consists of a plurality of winding layers and wherein the windings are formed as a plurality of parallel windings electrically connected in parallel.

The parallel windings may be formed on each layer and interconnected between layers. The windings of each layer of at least some coils may be formed as three parallel windings electrically connected in parallel. The radial displacement of at least some of the parallel windings may change between layers, such as a pair of parallel windings alternating between being closest to the centre of the coil and most distant from the centre of the coil between layers.

The parallel windings of each turn may be distributed between winding layers, preferably two layers. The parallel windings may also be offset between layers.

A slug formed of a magnetically permeable material may extend sufficiently above each coil to substantially reduce induced currents in the windings. The slug may project about the height of each winding above the top of each winding or about or above 1 mm above the top of each winding. Four common openings may be defined within each transmitter coil to accommodate the slugs. An air gap may be provided between each transmitter coil and each slug to reduce induced currents in the transmitter coils.

According to another exemplary embodiment there is provided an inductive power transfer transmitter having a plurality of transmitter coils which can be selectively caused to transmit power in a plurality of modes under control of a controller to a receiver coil of at least one power receiver, wherein the controller is configured to detect characteristics of the power receiver in order to control the mode of the power transfer.

The characteristics of the power receiver may include whether the power receiver includes circuitry for controlling power flow to a load of the receiver. The controller may be configured to communicate with the power receiver and to receive information from the power receiver on such characteristics, such as through modulation of a power signal transmitted by electromagnetic induction between the power transmitter and receiver.

The controller may extract receiver device version information from modulated power signals passing between coupled transmitter and receiver coils and controls the mode of power transfer based on the version information.

The maximum power to be transmitted to the receiver device and/or the number of transmitter coils needed to power the receiver may be controlled according to the version information.

According to another exemplary embodiment there is provided an inductive power transfer receiver including:
  i. one or more receiver coils; and
  ii. a communication circuit which, upon receiving power in the receiver coil from an inductive power transfer transmitter coil, transmits a signal to the inductive power transfer transmitter as to the characteristics of the receiver.

The receiver may include a power flow controller for controlling power flow to a load of the receiver and the characteristics communicated by the communication circuit include power flow control characteristics.

The characteristics of the receiver may include version information, which may indicate the mode of power transfer of the receiver. The version information may be sent in a packet subsequent to a signal strength packet.

The characteristics may also include configuration information, which may include the number of transmitter coils required to be driven to provide power to the one or more receiver coils.

Signal strength information as to the strength of a power signal received from a power transmitter may be sent prior to other communications.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning, i.e., they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention. In the drawings.

DETAILED DESCRIPTION OF EMBODIMENTS OF THE INVENTION

Figure 1:
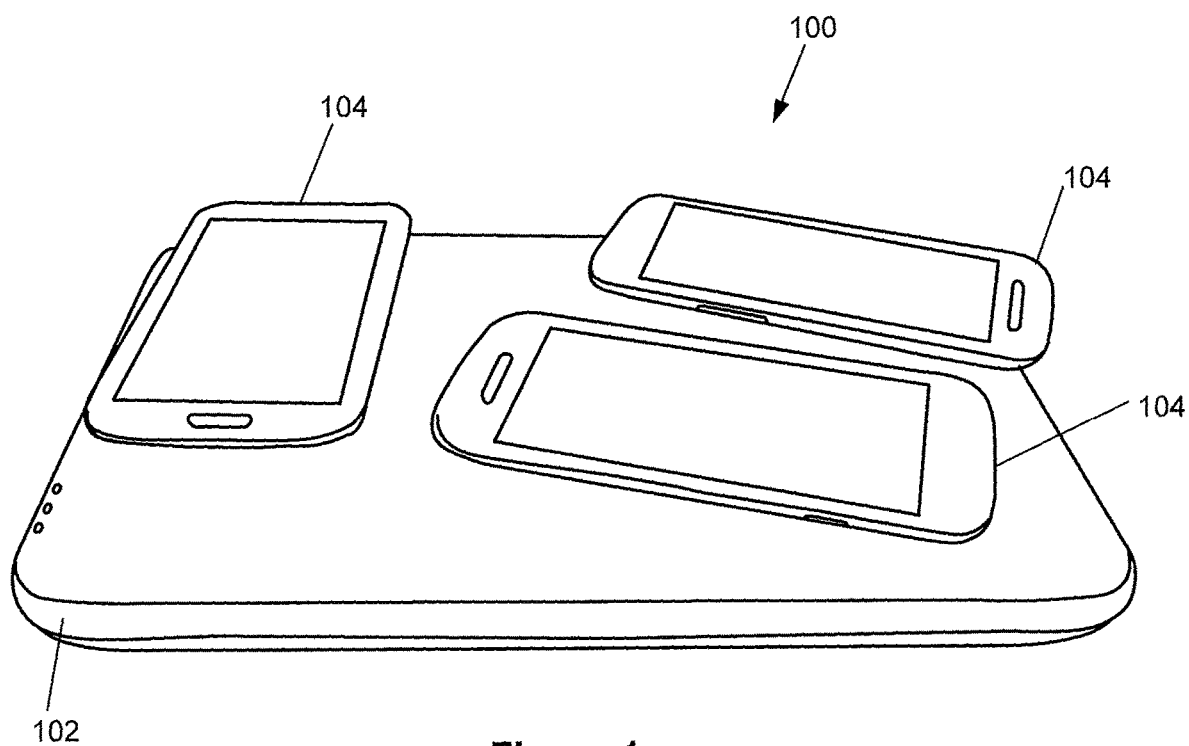
FIG. 1 illustrates a typical application of the present invention.

FIG. 1 illustrates a typical application 100 of the present invention. The wireless power transfer system 100 is illustrated as having a transmitter or charging "pad" 102 having a plurality of consumer electronic devices 104 disposed thereon so that electrical loads or energy storage elements, e.g., batteries, of the devices can be charged with electrical power in a wireless or contactless manner. In the illustrated example, the electrical power is provided between the pad and devices via electromagnetic induction or inductive power transfer (IPT) using loose-coupling techniques between transmitter and receiver electronics. However, other types of wireless power transfer may be possible for such a system, such as capacitive power transfer.

The transmitter and receiver electronics of the charging pad 102 and the devices 104 are configured so that the disposition of the devices on the pad can be arbitrarily selected by the user without the need to ensure pre-defined alignment of the transmitter electronics (in or on the pad) with the receiver electronics (in or on the devices) for power transfer to take place either at all or in an effective manner. Further, the transmitter is configured to independently charge the so-disposed multiple receiver devices. This 'spatial freedom' between transmitter and plural receivers is substantially unlimited, and is provided as described below.

Figure 2:
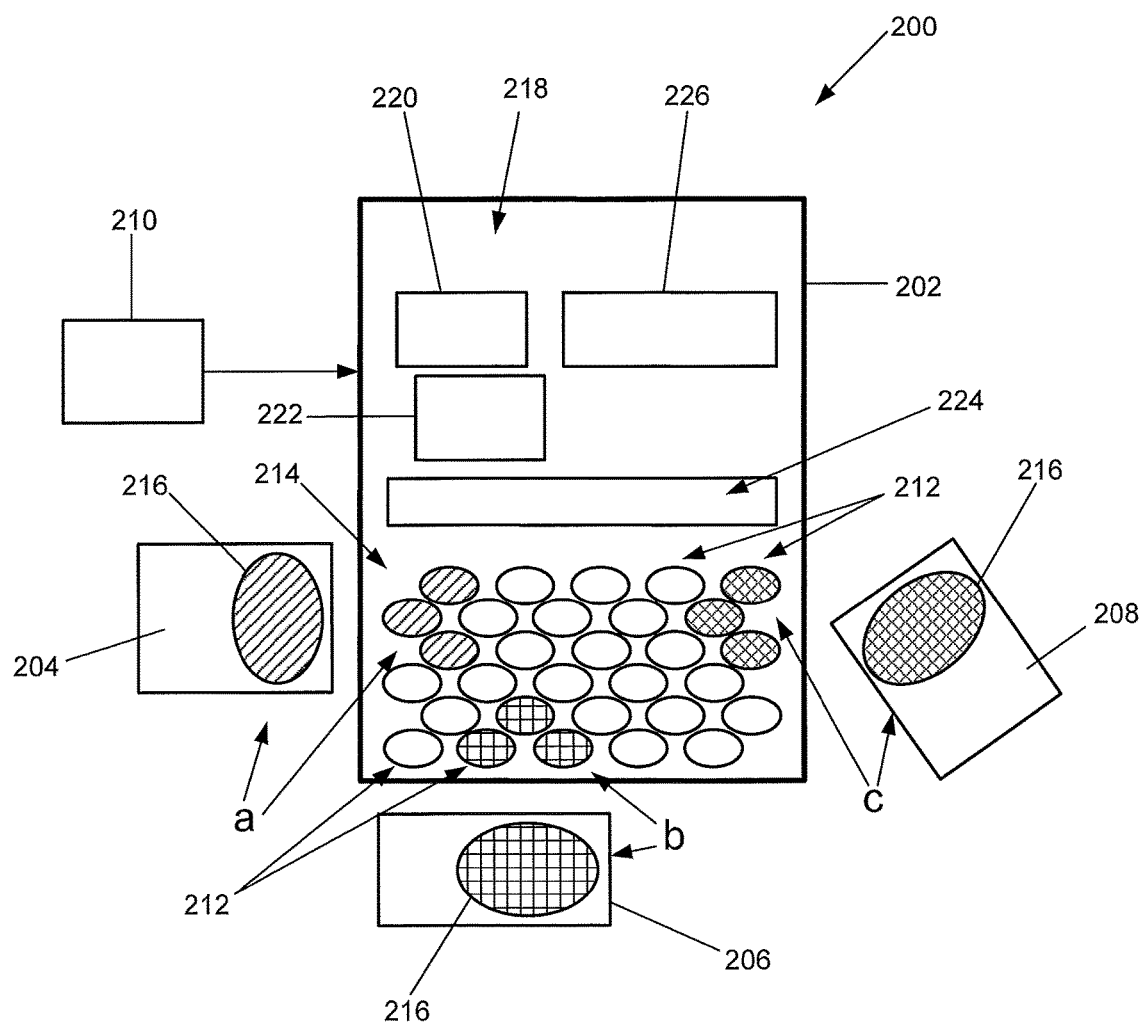
FIG. 2 illustrates an exemplary configuration of a wireless power transfer system of the present invention.

An exemplary configuration of a wireless power transfer system 200 is illustrated in FIG. 2. A transmitter 202 is provided which is configured to transfer power to multiple receivers 204, 206 and 208. In this example, three receivers are shown of a consumer device configuration, such as the 'smartphones' shown in FIG. 1, placed on the transmitter 'pad', however it will be understood by those skilled in the art based on the following description that the 'pad' of the transmitter can be scaled so as to accommodate and power two or more receiver devices of the same types or of different types, e.g., plural phones, phablets, tablets, laptops, combinations of these, etc., each having respective spatial dimensions and power levels, e.g. a smartphone may require about 5 Watts to about 7.5 Watts of power whereas a tablet may require about 15 Watts of power in order to charge the respective batteries.

The transmitter 202 is illustrated in block diagram form showing its electronics and components. Power for transfer to the receivers is input to the transmitter from a power supply 210. The power supply 210 may supply either AC or DC power to the transmitter 202. For AC power supply, the power supply 210 may be, for example, Mains power and the input method via a cabled connection, however other AC power supplies and input methods are possible. For DC power supply, the power supply 210 may be, for example, batteries, a regulated DC power supply, or a USB power connection to a PC or the like. In either case the circuitry of the transmitter 202 converts the input power into suitable signals for transfer via power transmission elements 212. The transmission elements 212 are provided in an array 214. As shown, the transmission elements 212 are configured so that one or more of the elements are employed to transmit power to a receiving element 216 of one of the receiver devices 204-208.

As understood by those skilled in the art, in IPT the transmission and receiving elements are inductive elements provided as primary (transmission) coils and secondary or pick-up (receiving) coils which are inductively coupled to one another when in proximity and between which power is transferred via a magnetic field induced when an alternating current (AC) is passed through the transmission coils. In the depiction of FIG. 2, the receiver coils 216 are shown remote from the transmission coils 212 with the groups of coupled transmitter and receiver coils illustrated with like hatching; this is only for ease of explanation and in operation the receiver coils overlay the transmitter coils with which they are coupled.

It is understood that the use of the term "coils" herein is meant to designate inductive "coils" in which electrically conductive wire is wound into three dimensional coil shapes or two dimensional planar coil shapes, electrically conductive material is fabricated using printed circuit board (PCB) techniques, stamping or printing (e.g., screen- or 3D-printing) into three dimensional coil shapes over one or plural PCB 'layers', and other coil-like shapes. The use of the term "coils" is not meant to be restrictive in this sense. Further, the transmitter and receiver coils are depicted as being generally oval in shape in the two dimensions shown in FIG. 2; this is merely exemplary and other two dimensional shapes are possible such as circular, triangular, square, rectangular, and other polygonal shapes, where such shapes are conducive to the array configuration, as explained in more detail later.

In order to allow efficient operation of the system, it is necessary for the transmitter 202 to only power those transmitter coils 212 which can be coupled to the receiver coils 216 of the proximate receiver devices. In this way, the supplied power is used for power transfer to the receiver(s) and not to power the transmitter coils themselves. This selective operation requires knowledge of the positioning of the receiver coils in relation to the transmitter coils, which will be explained in detail later.

The simplest way to selectively power the multiple transmitter coils of the array 214 is to provide driving electronics dedicated to each coil, or at least groups of coils in the array. Whilst this solution is simple, the amount of electronic circuitry required is high leading to added circuit complexity, size and cost. Increased circuit complexity means that higher component counts are required which increases possible losses in the circuitry in conflict with the efficiency required for effective IPT. Increased cost is particularly a concern for the consumer electronics industry in which the financial margins for manufacturers and vendors are small and therefore need to be optimised. Accordingly, the IPT transmitter of the present invention utilises driving electronics which is common to all of the transmitter coils. This simplifies the circuitry required but increases the complexity of the manner of controlling the driving circuitry. This increased control complexity is tolerable however when the control methods of the present invention are employed, as described in detail later. The transmitter driving electronics is illustrated in FIG. 2 as driving or control circuitry 218. The control circuitry 218 includes a controller 220, a transmitted power conditioner 222 and a selector 224.

The controller 220 may be provided as a digital controller in the form of a programmable integrated circuit, such as microcontroller or microprocessor, or as an analog controller in the form of discrete circuit components, and may include or be a proportional-integral-derivative (PID) controller. In the examples of the driving circuitry described herein, a microcontroller is provided not only to drive the coils but also as the main processing circuitry of the transmitter, however those skilled in the art understand that the different applicable forms of controller may be equivalently used depending on the particular application of the present system.

The transmitted power conditioner 222 is used to condition the input power for driving the transmitter coils, accordingly the configuration of the transmitted power conditioner 222 depends on the power supply 210 used and the requirements of the transmitter coil circuitry. For example, if the power supply 210 supplies DC power, the transmitted power conditioner 222 is a DC-AC inverter with a power rectification function, whereas if the power supply 210 supplies AC power, the transmitted power conditioner 222 is a combination of an AC-DC converter with a power regulation function and a DC-AC inverter with a power rectification function thus providing AC to AC power conditioning via a DC transmission link. In either case a single inverter is used for driving the transmitter element array. It is possible to configure the transmitted power conditioner 222 as a direct AC-AC converter when the power supply 210 supplies AC power, however such direct converters are typically not suitable for IPT applications due to the inability to generate high frequency outputs. The power rectifying DC-AC inverter may be provided as a switch-based rectifier, such as a half-bridge rectifier or full-bridge rectifier having switches, such as diode based switches, or semiconductor switches, such as transistors, field-effect transistors (FETs) or Metal-Oxide-Semiconductor FETs (MOSFETs), in either non-synchronous or synchronous configurations, as is well known to those skilled in the art. The power regulating DC-AC converter may be provided as an AC-to-DC converter (ADC) combined with a step-up (Boost) converter, a step-down (Buck) converter, a Buck-Boost converter, or other converter type suitable for regulating the power in the specific application of the system 200. In the examples of the driving circuitry described herein, the power supply 210 supplies AC at Mains rating, and the transmitter or transmitted power conditioner has an ADC to convert the AC power input by the power supply 210 to DC, a Buck-Boost converter to regulate the converted DC power and a half-bridge rectifier having a pair of FETs to rectify the regulated power thus providing rectified power to the transmission coils 212 for inducing the required magnetic flux, however those skilled in the art understand that the different applicable forms of regulator and rectifier may be equivalently used depending on the particular application of the present system.

The selector 224 may be provided as a battery or array of switches separate from, and connected to, the respective transmitter coils 212 or as switches separately integrated with the coils 212 in respective transmission circuits. The selector 224 may also include a demultiplexer and shift register for driving the switches in a manner well understood by those skilled in the art. The operation and effect of these components of the driving circuitry 218 are discussed in detail later.

The array 214 of transmitter coils 212 may be configured in a number of ways. The transmitter coils may be configured to have substantially the same dimensions and configuration as the receiver coils, such that coupled pairs of transmitter and receiver coils is possible. Alternatively, the transmitter coils may be configured to be larger or smaller than the receiver coils and/or to have a different configuration as the receiver coils. Indeed, different types of receiver devices may have differently dimensioned and configured receiver coils, such that a combination of these relative configurations may be supported by the system and method of the present invention. In the example of FIG. 2, the transmitter coils 212 are illustrated as being smaller in dimension than the receiver coils 216 but of the same configuration, i.e., generally oval. In such a configuration, plural transmitter coils 212 can be coupled to a respective receiver coil 216, illustrated as the hatched transmitter coil groups 212a, 212b and 212c. The use of multiple transmitter coils to power a single larger receiver coil optimises the amount of power transferred through efficient use of the transmitter and driving circuitry. As illustrated in FIG. 2, the transmitter coils of the groups are selected based on the disposition of the overlying receiver coil, including the relative orientation.

The array 214 of FIG. 2 is the simplest form of arranging the transmitter coils 212. That is, a repeated pattern of transmitter coils is provided in a single layer or plane with each coil being generally co-planer with all the other coils of the array. Whilst this configuration provides benefits in simplicity, other configurations of the array are possible, including multiple-layered or multiple-planar arrays of coils with or without interlayer offsets or overlaps of regularly or irregularly arranged transmitter coils. Such increased complexity arrays provide other benefits such as improved uniformity in the coupling magnetic field. Specific embodiments of different array forms are described later, however the purposive effect of providing spatially free, multi-device IPT charging is common to each of these embodiments.

With further reference to FIG. 2, the transmitter 202 also includes instrumentation 226 for use by a user of the system 200. The instrumentation 226 may include user controls, such as buttons, and/or indicators, such as light emitting diodes (LEDs), as illustrated in FIG. 1. The instrumentation 226 may be connected to, and controlled by, the controller 220 or other control circuitry as applicable for the input and output of information regarding the operation of the system.

As previously stated, the selective operation of the transmitter coils requires knowledge of the positioning of the receiver coils in relation to the transmitter coils. Various techniques exist in the art for achieving such a goal. In an exemplary embodiment however the present invention uses a relatively simple technique to first detect the presence of a receiver or other object(s) in proximity (e.g., within charging range) of the transmitter ("coarse" detection) and then detect the relative position of the receiver coil(s) with respect to the transmitter coil(s) ("fine" detection). This is advantageous in the system of the present invention since sufficient powering of the plurality of transmitter coils for fine detection is only undertaken once a receiver is detected as being present, thereby allowing a substantially low power idle or 'sleep' mode of the transmitter. Typical values of "low" power are below about 100 mW, preferably below about 50 mW, and more preferably in the range of about a few mW to less than about 20 mW.

Figure 3:
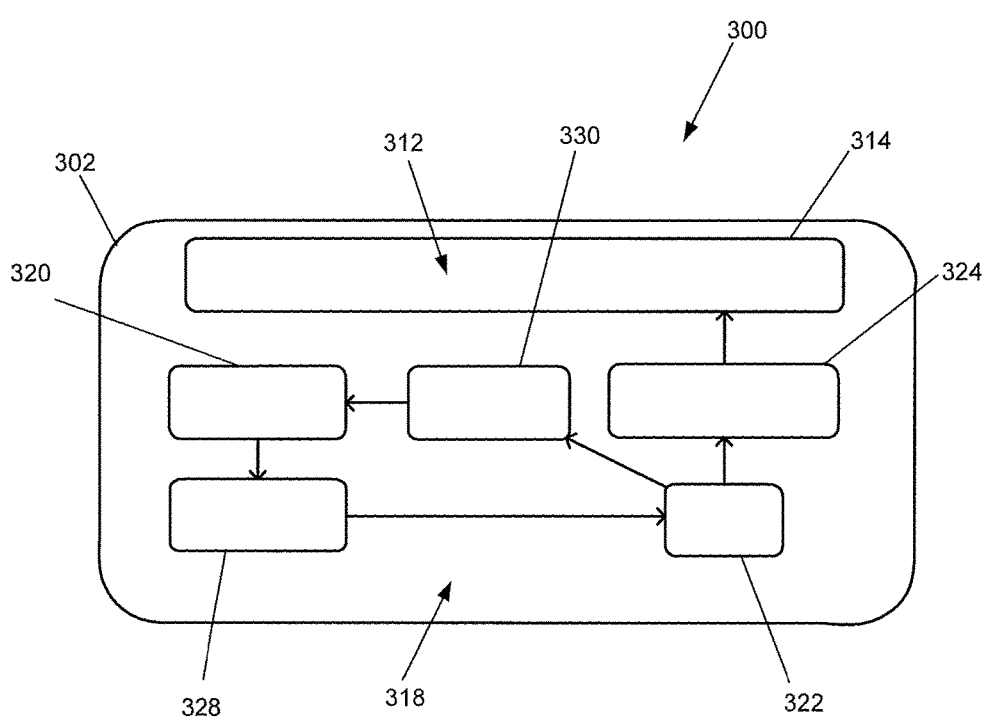
FIG. 3 illustrates an embodiment of a transmitter of the system.
Figure 4:
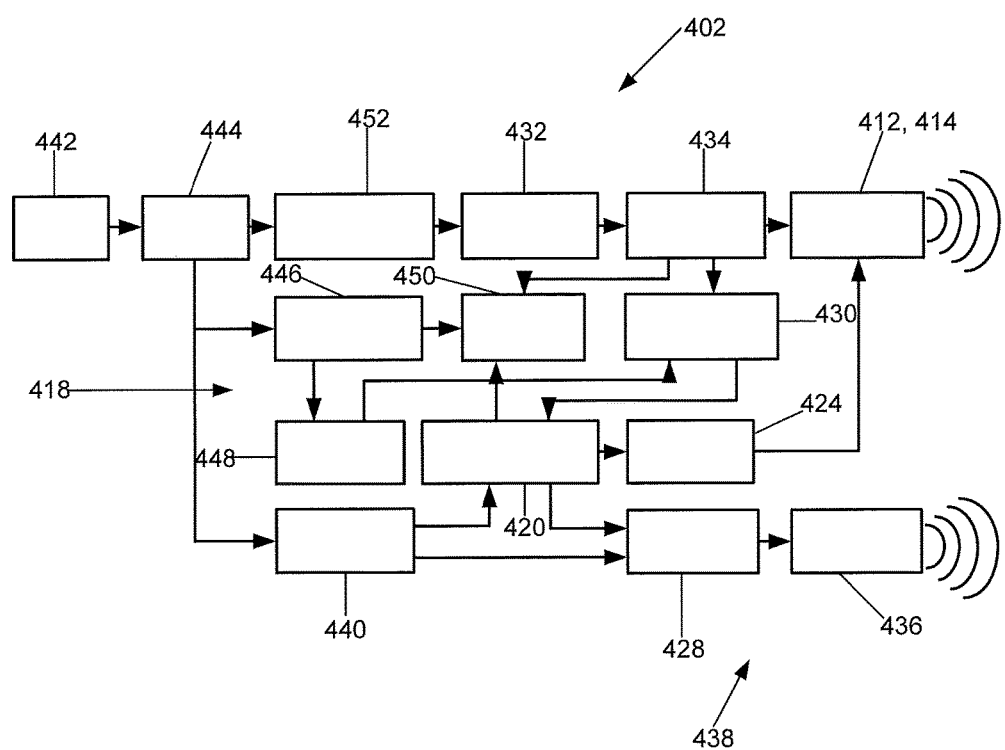
FIG. 4 shows a more detailed example of the transmitter in block diagram form.

The two stage receiver detection method of the present invention of coarse detection followed by fine detection may be provided as follows. FIG. 3 illustrates an embodiment of a transmitter 302 of the system of the present invention. As in FIG. 2, the transmitter 302 is illustrated in block diagram form showing electronics including transmission elements/coils 312 in an array 314, and driving circuitry 318 including a controller 320, transmitted power conditioner 322 and selector 324. Additionally, the transmitter 302 is illustrated as further having a detector 328 and a communications module 330. FIG. 4 shows a more detailed example of a transmitter 402 having like components/elements in block diagram form including transmission elements/coils 412 in an array 414, driving circuitry 418 including a controller 420, transmitted power conditioner 422 and selector 424, a detector 428 and a communications module 430. Additionally, the transmitted power conditioner 422 is illustrated as having a (Buck-Boost) converter 432 and a (half-bridge) rectifier 434 as described earlier. It is noted that the components/elements of the transmitters 302 and 402 function in a manner similar to the like components/elements of the transmitter 202, and the detector and communications modules of the transmitters 328 and 428 represent the same elements in each Figure.

The detector is used for the coarse detection of the receivers in conjunction with the controller whilst the controller in conjunction with other circuitry may be used for the fine detection method. The detector 428 is provided as a detection transmission element 436 and associated detection circuitry 438. In one embodiment the detection transmission element 432 is provided as a coil which surrounds the array 414 of the power transmission elements 412. In another embodiment the detection transmission element 436 may be provided as a coil that overlays (at least) portions of the array 414 or as a plurality (or array) of coils. For example, the configurations and operation of the detection coil(s) disclosed in PCT Publication No. WO 2014/070026, the contents of which are expressly incorporated herein by reference, are applicable exemplary forms of the transmission element 432. The detection element 436 is used to determine if a receiver is in the proximity of the transmitter, e.g., if a receiver device, such as a smartphone, is placed on, or removed from, the transmitter pad or charging surface. As stated earlier, the "coils" of the detector 328/428 may be wound coils or printed circuit coils or stamped or printed coils having such shapes and dimensions conducive to the specific application.

This detection is achieved as follows. As illustrated in FIG. 4, the coil(s) 436 are powered via the detection circuitry 438 by a power regulator 440 under control of the controller 420. The power regulator 440 converts the input power from a power supply for use by the detector 428. That is, similar to the operation of the transmitted power conditioner, the power regulator 440 is configured to supply a regulated AC signal (voltage/current) to the detection coil(s) 436 so as to induce the required magnetic flux for receiver coil detection. For example, the power regulator 440 may be provided as an ADC combined with a Buck, Boost or Buck-Boost converter. In the exemplary embodiment illustrated in FIG. 4, the power regulator 440 is Buck-Boost converter supplied with DC voltage from a DC power input 442. The DC power input 442 may be provided as an AC adaptor at which either Mains AC power or DC power, e.g., via USB connection to a PC or the like, is supplied to the transmitter 402. It is understood by those skilled in art that the power regulator 440 may be part of the driving circuitry 418 depending on the relative voltage/current requirements of the power (transmitter) coils 412 and the detection coil(s) 436. In the exemplary embodiment illustrated in FIG. 4, the relative requirements are different so separate drive electronics are provided with the detector 428 (and controller 420) requiring a first voltage level and the transmitted power conditioner 422 and transmission coils 412 requiring a second voltage level. Exemplary values of these parameters are described later. In either configuration, the DC voltage provided by the DC power input 442 may be input to the circuitry of the transmitter 402 after undergoing electromagnetic interference (EMI) conditioning by an EMI filter block 444, which contains common and differential mode filters for EMI noise suppression. Suppressing EMI noise enhances stability and responsiveness of the transmitter circuitry, especially when the system is used in cellular communication environments.

In the simplest form of the detector, the "detection" provided is basically that of a metal detection system. The coil(s) of the detector, when powered, is caused to oscillate at a frequency, as well understood by those skilled in the art. This oscillation frequency is measured by the detection circuitry under control of the controller (in terms of the number of edges of the oscillating frequency signal counted within a predetermined time frame). When a metallic object is in proximity of the detection coil(s), and therefore the transmitter, it causes the oscillation to change in frequency, thus changing the number of edges that are counted in the time period, due to the metal absorbing the energy of the magnetic flux emitted by the detection coil(s). The amount of change varies by the amount of energy the metallic object absorbs. Accordingly, by setting a limit or threshold for this oscillation frequency change, a "metal object" can be detected. The change can be measured (i.e., detected) within a single time period or over a sequence of time periods. Suitable methods for detecting and counting the edges are well known and therefore not discussed in detail herein.

The frequency of the detection coil oscillation is selected through appropriate selection of the components of the detection circuitry, which may be variable components, and dimensions and topology of the detection coil(s) so as to be in a frequency range different than or offset from the frequency at which the transmission coils are driven. In this way, the coarse detection provided by the detector does not interfere with the operation of the transmitter in powering the receivers. In the examples of the present invention, the detection frequency is in the MHz range, e.g., about 1 MHz, whilst power transmission is in the kHz range, e.g., about 100 kHz (more specific value ranges are discussed later). At this frequency range, the predetermined (first) time period for detection is in the millisecond (ms) range, e.g., about 40 ms. Accordingly, the 'search' for an object being brought into proximity of the transmitter is performed by the constant operation of the detection coil(s) and the sampling of the oscillation frequency at regular time intervals to determine if changes occur. It is considered that a (second) time period of about 500 ms between detection 'pulses' is suitable for detecting objects not only once they are placed on the transmitter 'pad' but when they are being moved toward, along, or away from the transmitter, where 'proximity' is considered to be in the sub-100 millimeter (mm) range, e.g., about 3 mm to about 30 mm, which is the charging range of the system. However, the first and second time periods can be selected to be less or greater depending on the 'coarseness' of detection required.

Whilst the operation of the detection coil(s) does not interfere significantly with the operation of the transmitter coils, the operation of the transmitter coils does interfere with the operation of the detection coil(s), in that when charging is occurring the oscillation frequency of the detection coil(s) is changed. This is due, in part, to the ongoing presence of a receiver device on the charging surface of the transmitter throughout charging, and in part, to the effect of the induced magnetic field of the powered transmitter coils on the induced magnetic field of the (larger) detector coil(s). However, this influence is simply accounted for since sudden changes in the oscillation frequency are measured such that the effect of the charging sequence merely shifts the baseline of the frequency delta measurement, as is discussed in more detail later.

The setting of the threshold of measured frequency change for detection can be determined experimentally depending on the application of the system, or can be set through calibration, or can be dynamically determined and used as a 'rolling' average of frequency values due to the placement of plural receiver devices on the transmitter surface. In the exemplary embodiments of the system described herein, a variance between sequential readings of the edge count of about 5% to about 10% is considered to be environmental (e.g., 'background noise') and are therefore ignored (see FIG. 5(A)). When an actual consumer device, such as a smartphone, which is a dense object containing a relatively large amount of metal in comparison to the typical environment in which the IPT system is deployed, is placed on the transmitter surface, a comparably large change in the oscillating frequency is caused, for example, for a typical smartphone an almost doubling of the frequency can be observed between two sequential readings and further increases by about 150% to about 200% over the next reading (see FIG. 5(B)). Such an 'event' is used to 'trigger' the fine detection which will determine if the 'object' detected is a receiver or just some other metallic object that was placed on the transmitter and therefore should not be powered, i.e., a so-called "foreign object" or "parasitic load", as is discussed in more detail later.

Figure 5A:
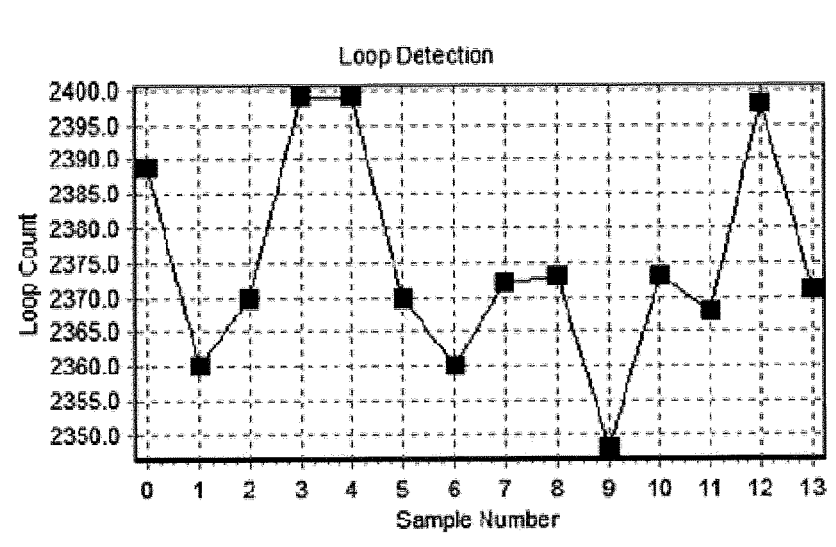
FIGS. 5(A)-(D) show results pertaining to object detection measurements.
Figure 5B:
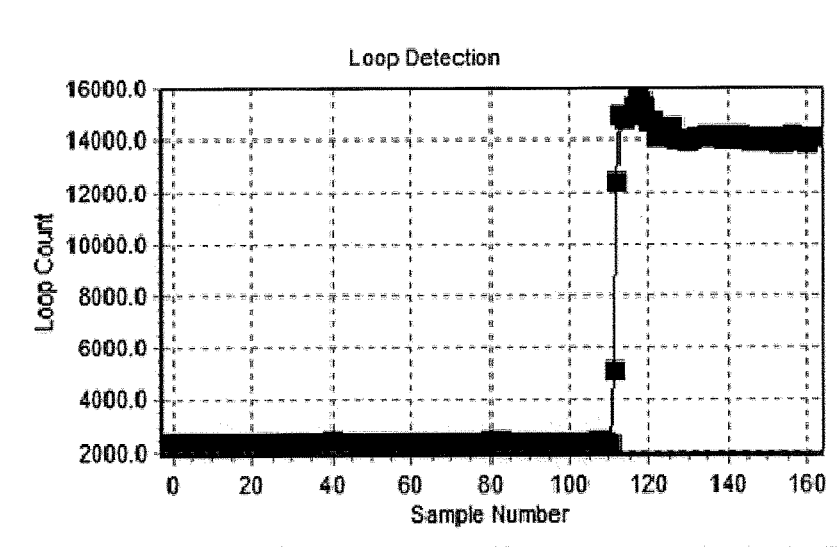

Whilst the results shown in FIGS. 5(A) and 5(B) illustrate that a frequency change threshold of more than about 10% could be set for a relatively sensitive 'event' detection or, say, about 50% or more for a relatively coarse event detection, other factors should be taken into account when setting the threshold so that 'false positives' are not created in which the more time- and energy-consuming fine detection method is used.

For example, the amount of metal in the environment of use proximate the system may influence the background variations. Whilst it is difficult to account for such factors in a predefined manner when the location and environment of ultimate use of the system is unknown and unconstrained, the level of influence can be reduced by suitable design of the detector coil(s). For example, directional coil topologies, shielding, magnetic field shaping, etc., could be used as understood by those skilled in the art.

Figure 5C:
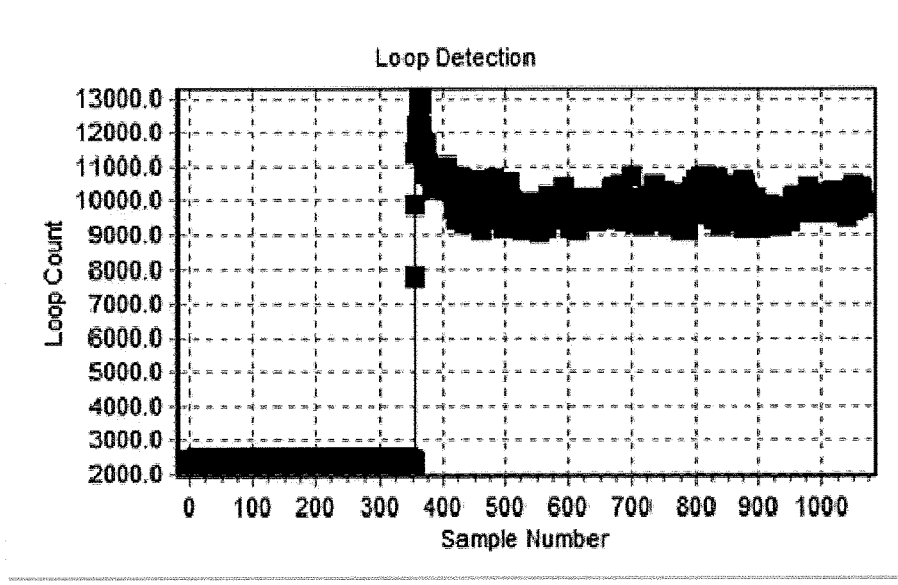

Further, the oscillation frequency can change due to the energizing of the power transmitter coils. As discussed earlier, in the present example the transmitter coils 412, when powered, are caused to oscillate at a frequency, as well understood by those skilled in the art, of about 100 kHz to about 120 kHz. This oscillation of the transmission coils affects the oscillation on the detection coil(s) causing a variance in the detection readings of about 10% or more (see FIG. 5(C)). Accordingly, the effect of the powering of the power transmission or charging coils needs to be understood and accounted for when setting the coarse detection threshold.

Figure 5D:
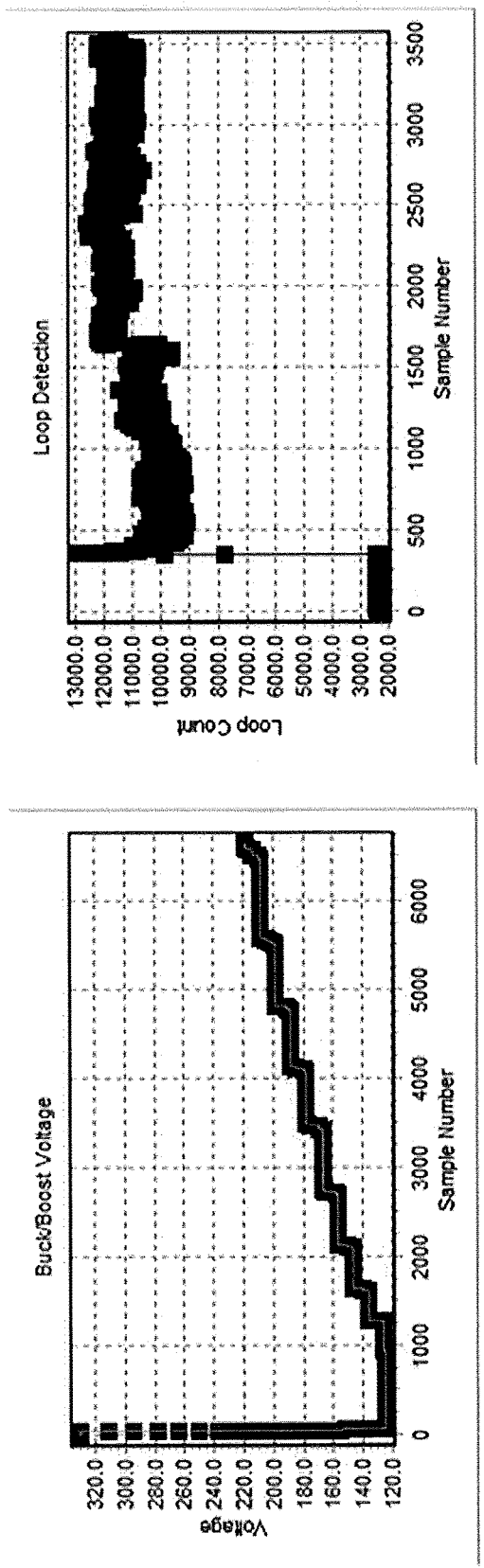

Another factor that must be considered is the effect of the charging current drawn by the receiver(s) coupled to the transmitter on the oscillation frequency of the detector circuit. This change in drawn current is due to the change in the level of 'charge' of the battery or other energy storage device of the consumer electronic receiver device(s) over time and the power flow control which is implemented on the transmitter-side to account for this change in terms of power transmission efficiency (discussed in detail later). This is particularly observed over a longer span of time, i.e., the length of time required to charge a smartphone battery, e.g., about an hour or so, over which time the load steps in the Buck converter voltage of the power regulator 440 reflects the amount of power required by the receiver and that amount of change gets reflected back to the detection readings as a fluctuating change in the frequency of oscillation (see FIG. 5(D)). This change over time can be accounted for in the detection algorithm by dynamically setting the 'baseline' of the oscillation frequency in accordance with the Buck converter voltage load step, which is known to the controller 420. Of course, it will be understood that the number of devices being powered/charged at a time and the types of devices being powered/charged, and the relative 'charge levels' of these devices also effects the detection measurements.

By combining these known influences on the detection coil(s) magnetics, a robust and effective detection regime can be provided for the coarse or initial (primary) detection regime. For example, a set of thresholds can be dynamically determined during operation or pre-set based on the 'mode' or use case of the multi-device charging system, e.g., no devices being powered/charged, one device of a certain type being powered/charged, one device of another certain type being powered/charged, two devices of the same or different type being powered/charged, etc. Further, the edges being detected and counted can be either positive going edges or negative going edges, however isolation of the thresholds to be different for the positive going and negative going edges can also be used for more specific categorization. Furthermore, by detecting a change in conditions at the transmitter rather than measuring static values, detection of an object only need occur once such that if a detected object results in not being a receiver device once the 'fine' or second (secondary) detection is performed, the detected object does not trigger the need perform the secondary detection again.

Figure 20A:
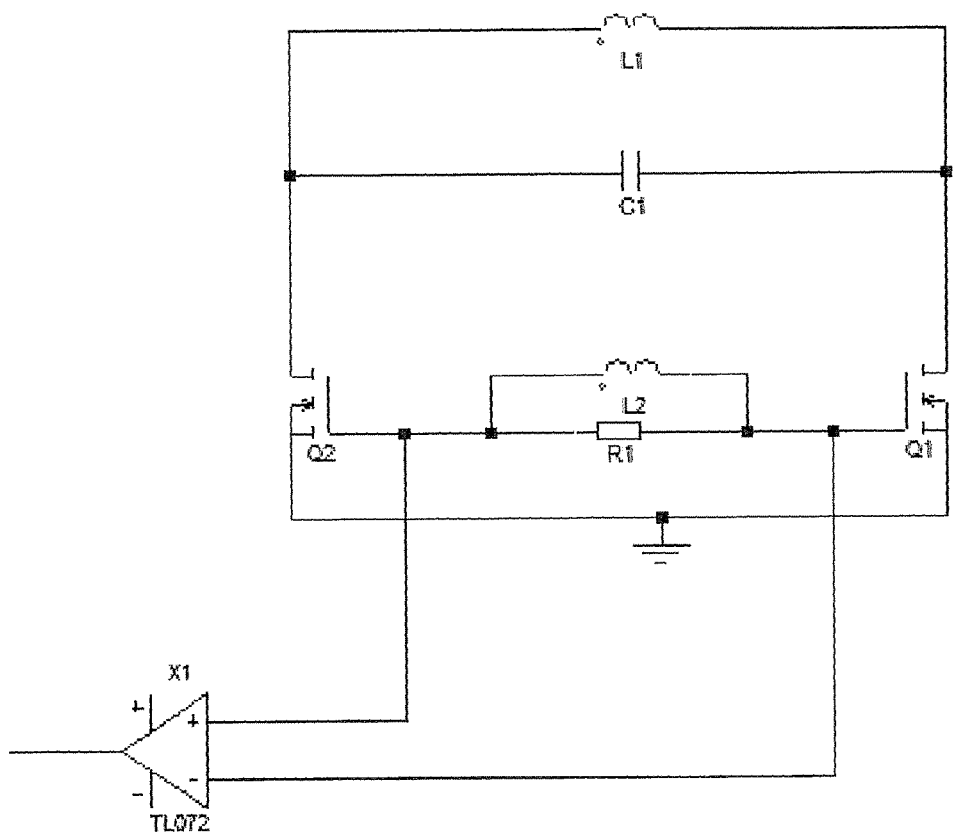
FIGS. 20(A) and (B) illustrate equivalent circuits of exemplary object detectors of the system.
Figure 20B:
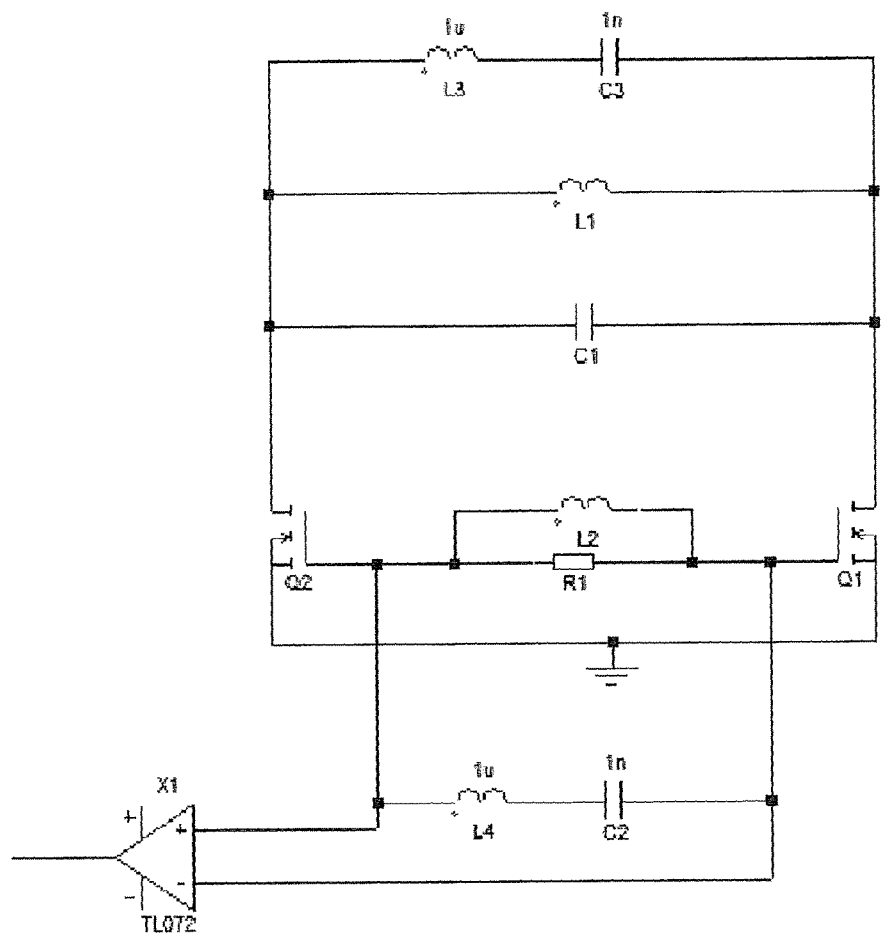

In another example, the influence of the IPT field on the detection field may alternatively be accounted for in hardware rather than in software as described above, or in addition to such software accounting. FIG. 20A illustrates an equivalent circuit of the (self-oscillating) perimeter coil disclosed in PCT Publication No. WO 2014/070026. With this circuit, when metal is placed inside the 'loop' coil L1 the inductance of that coil is changed resulting in a change in the oscillation frequency (provided by the resonant circuit of the inductor L1 and capacitor C1) which is measured using the comparator circuitry illustrated. However, as discussed above, operation of the power transmission coils can cause the loop coil to be coupled with the IPT field, thereby corrupting the detection signal. In order to lessen the detrimental effect (i.e., noise) of the IPT field on the detection coil, suitable filters may be provided in the detector circuit as illustrated in FIG. 20B. In this example, a LC filter of inductor L3 and capacitor C3 is added in parallel with the detector coil L1 and a LC filter of inductor L2 and capacitor C2 is also provided in the comparator circuitry. In this way, coupling of the inductors L1 and L2 (in the comparator circuitry) with the IPT field is reduced.

As can be understood from the forgoing, the object detection method can not only be used to detect the presence of objects, including receiver devices, but also to detect the absence of those objects, that is when a receiver device is removed from the charging surface of the transmitter or moved relative to the charging surface, using the same threshold regime. In this way, the charging mode(s) of the transmitter can be accurately controlled in a simple manner, providing low-power and safe operation.

In operation of the transmitter of the system of the present invention, efficient and effective functioning of the object detection is provided as follows. At power up of the transmitter, that is when power is supplied to the transmitter from the power supply, none of the transmitter coils are powered and the detector coil(s) is powered under the afore-described regime to detect if an object, including a receiver device, is within charging range of the transmitter. The object detection is continuously performed whilst the transmitter is powered and is ceased when the transmitter is powered down.

Upon detection of a proximate object, the system performs the detection of the receivers in conjunction with the controller. This 'fine' detection amounts to a scan of the transmitter 'pad' or charging surface to determine the actual location of the detected object and whether that detected object is a receiver device. This scan is achieved by selectively activating the transmitter coils of the array to determine if an object is located in the discrete, known positions of those transmitter coils. The detected objects may be receiver devices or other objects containing metal as discussed earlier. The detection is facilitated by the interaction of the metal with the energy transmitted by the transmitter coils. The activation of the transmitter coils is performed in a manner so that the energy transmitted may cause coupling of the transmitter coils with proximate receiver coils without actual powering/charging of the receiver circuitry/load associated with the coupled receiver coils. In particular, the scan is performed so that the location is determined of any potential objects detected using the object detector through magnetic interactions of the transmitter coil(s) and the objects. The scanning and detection may be carried out in a number of ways depending on the configuration of the transmitter coil array. For example, the principles of the inrush current measurement and detection methods disclosed in PCT Publication No. WO 2013/165261 and PCT Publication No. WO 2014/070026, the contents of both being expressly incorporated herein by reference, and the sweep detection methods disclosed in PCT Publication No. WO 2013/165261 can be used as the basis of the tests or steps of the 'fine' detection method of the present invention. Alternatively, other methods of locating the receivers can be used, including the exemplary method discussed later.

As disclosed in PCT Publication No. WO 2013/165261 and PCT Publication No. WO 2014/070026 the inrush and frequency sweep detection methods can be used to 'identify' the receiver devices as well as locate the devices if the characteristics of the receiver electronics is known. Having said this, an alternative method of locating and identifying the receivers is discussed later. This identification assists in determining whether the detected object is a receiver device which is compatible to be powered/charged by the transmitter. With respect to this function, the system of the present invention is distinguished from conventional systems for wireless power charging of consumer electronic devices as follows.

As previously stated, the transmitter can accommodate and power two or more receiver devices of the same types or of different types. These receiver 'types' not only include device types, such as smartphone, tablet, etc., and power rating types, such as 3 Watts, 10 Watts, etc., but also include receiver types compliant with the different specifications defined under Industry Standards. Support of these different specifications is important so to allow backward compatibility when specifications of the Industry Standards are changed through evolution of the Standard. That is, devices that are compliant with an earlier version of a specification may not be (fully) compliant with a later version of that specification. Accordingly, supporting the powering/charging of those earlier version devices with transmitters designed for newer version devices means that the early adopters of the Standard are not unduly prejudiced, at least until they are able to phase out the earlier version devices for the newer versions. Whilst this is sensible, the different generations of the Standard based specifications may not be complimentary or compatible in terms of circuit design and operation. At present the wireless power industry for consumer devices has several specifications that are being set by different Standard Setting Organizations (SSOs). These competing specifications can be even more difficult to support with a single system, due to the very different underlying technology for wireless power transfer being used.

In this context, the system of the present invention provides a mechanism for identifying the 'type' of receiver device or at least characteristics of the receiver device being presented to the transmitter and for supporting the charging of plural 'types' of receiver device through this identification. The system of the present invention also provides a mechanism by which the receiver device identifies itself to a transmitter, whether that transmitter is part of the present system or that of a different version of an Industry Standard specification.

As an example application of the multi-device type powering/charging capabilities of the system of the present invention, operation of the communications module 330 of FIG. 3 is now described. In this exemplary embodiment, the communications module complies with the communication requirements set out in a first version of an Industry Standards specification so that identification, communications and powering/charging can be carried out with receiver devices compliant with that first version specification as well as receiver devices compliant with a second version of that Industry Standards specification, where the second version is later than the first version. In order to perform such multi-version receiver support, the transmitter 302 needs to distinguish between the receiver types so that appropriate version wireless power transfer modes can be selected.

The earlier version specification has the following four phases for power transfer from the transmitter to the receiver:

Selection
The transmitter monitors the transmitter (interface) surface for the placement and removal of objects. If the transmitter detects an object, the system proceeds to the Ping phase.

Ping
The transmitter executes a digital ping, and listens for a response. If the transmitter receives a response, the system proceeds to the Identification & Configuration phase.

Identification & Configuration
The transmitter identifies the receiver and obtains configuration information such as the maximum amount of power that the receiver intends to provide at its output (load). Once the receiver is identified and configured, the system proceeds to the Power Transfer phase.

Power Transfer
The transmitter provides power to the receiver, adjusting its coil current in response to control data that it receives from the receiver.

In this regime of the earlier version specification, a transition from any of the other phases to the Selection phase involves the transmitter removing the power signal to the receiver. In terms of the present invention, these phases are performed as follows. The Selection phase involves the object detection performed by the system of the present invention as described earlier. The Ping and Identification & Configuration phases are performed in the manner of the present invention as will now be described. The Power Transfer phase is performed depending on the version of receiver identified so as to be in either earlier version mode, in which the transmitter adjusts the amount of power being transferred as described above, or later version mode, in which the receiver adjusts the amount of received power being delivered to the receiver-side load, as will be described later. In the following description the earlier version specification is referred to as version A, and the later version specification is referred to as version B. It is to be understood that more versions or versions of different Standards specifications may be supported in like manner.

Firstly, the Ping phase of the present invention is described. In the present embodiment, the version B transmitter of the present invention (e.g., the transmitter 302) first conducts the receiver location scan by selectively powering the transmitter coils 312 in turn to first determine if a version A or version B receiver is present, and if not, the location scan is ended. This is merely an example, and the various versions can be subsequently located (e.g., in order) instead of within the same scan.

Figure 6A:
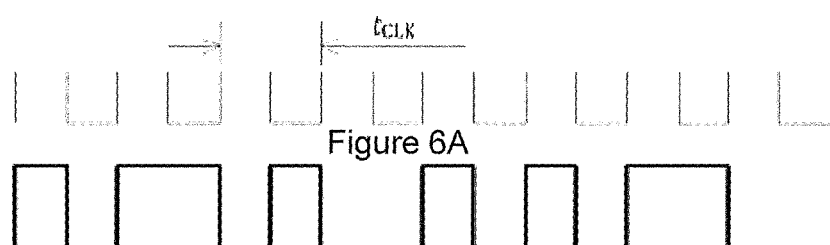
FIGS. 6(A)-(E) illustrate data and data packet structures of a communications protocol.
Figure 6B:
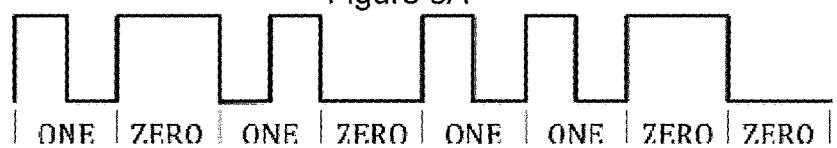
Figure 6C:
Figure 6D:

In order to detect where a receiver device is located on the transmitter surface and identify that receiver device, a communications protocol between the transmitter and the receiver(s) can be used. This communications protocol may be in accordance with the either version specification so that version A and version B devices can be detected in a time efficient manner. Time efficiency is desired so that the experience of the user of the system is not unduly effected by having to wait for receiver devices to be detected before being powered/charged by the transmitter. FIG. 6 illustrates components of an exemplary communications or data 'packet' of the version A communications protocol. The packet includes a bit stream made up of ONE and ZERO bits. As illustrated in FIGS. 6(A) and 6(B), a ZERO bit is encoded as a single transition in a single period of a clock signal, $t_{CLK}$, and a ONE bit is encoded as two transitions in a single clock period, with the clock period being, for example, about 2 kHz. As the bits are encoded as either one or two transitions, it does not matter what the initial state of the signal is, only how many transitions occur in the period of the clock period. Each byte of the packet is encoded in an 11-bit asynchronous serial format, with one start bit, one odd parity bit and one stop bit as illustrated in FIG. 6(C). FIG. 6(D) illustrates the packet as having four parts (portions or fields): a preamble portion of 11 to 25 bits, with all bits set to ONE (i.e., no bytes are encoded in the preamble portion); a header portion of a single byte which indicates the packet type and number of message portion bytes; a message portion of one or more bytes; and a checksum portion of a single byte calculated as the header portion byte XORd with each of the message portion bytes.

In operation, a 'ping' is transmitted by the transmitter 302 from each transmitter coil 312 of the array 314 sequentially over a pre-determined time period, e.g., from about 100 ms to about 300 ms. The 'ping' is a discrete non-charging energy signal which is able to temporarily couple the transmitter coil transmitting the ping with a proximate receiver coil. The ping is achieved by controlling the transmitted power conditioner 322 to output the appropriate power signal over the specific time period via the transmitter coils 312 selected using the selector 324. The power delivered by the temporary ping signal enables the coupled receiver device to "send" a coupling communications packet to the transmitter 302, and the communications module 330 of the transmitter 302 includes decoding and processing circuitry for decoding and processing the received packets. The circuitry for performing these functions may be provided in the communications module 330 of the transmitter 302 under control of the controller 320, or may be provided as part of the controller 320 itself. The manner in which the receivers encode the information to be communicated in the packets and in which these packets are "sent" is described later.

Figure 7:
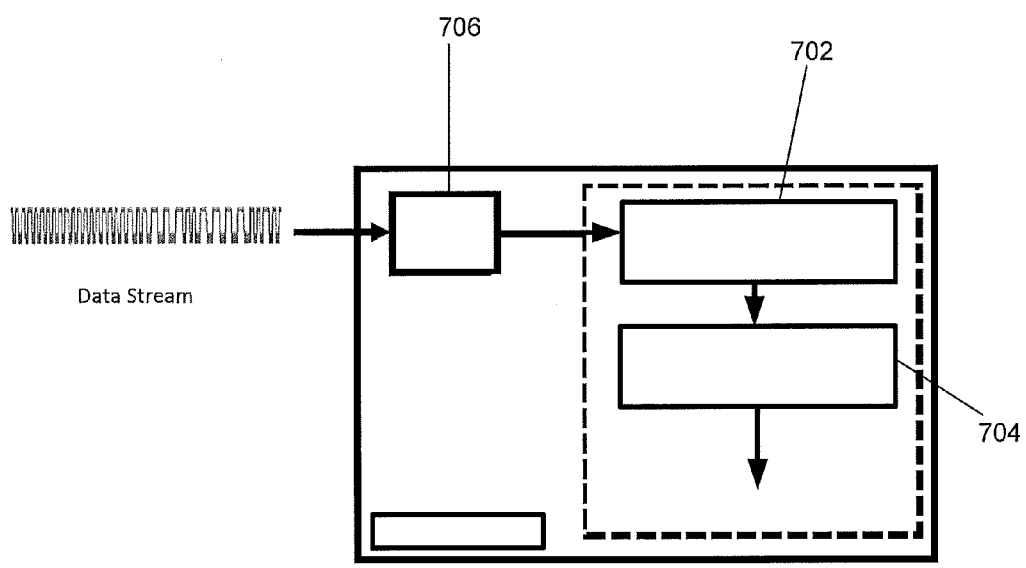
FIG. 7 is a block diagram of a communications processing block.

FIG. 7 is a block diagram illustrating a decoder 702 for decoding the received packets and a state machine 704 for processing the decoded packets as implemented in the controller 320 or the communications module 330. A timer 706 for measuring the time periods within the received communications packets is also shown. The decoder 702 is configured to only consider a message of a received packet valid when at least four preamble bits are received, there is no parity error in the message, and the checksum matches, as per the version A communications protocol; however other validity criteria is possible. The decoder 702 passes the decoded messages to the state machine 704, as well as indicating when a message with an error has been received. The state machine 704 processes the decoded packets.

As stated above, a receiver device which receives the energy of the ping signal responds by sending a coupling communications packet to the transmitter. This coupling (first) communications packet can be in the form of a signal strength packet. The signal strength packet communicates a signal strength value in the message portion of the packet which indicates the degree of coupling between the transmitter coil sending the ping and the coupled receiver coil. The state machine 704 processes this received signal strength packet whereby the transmitter 302 is able to locate the receiver device as being at a position local to the transmitting transmission coil because it is that transmission coil which receives the signal strength packet, primarily as a reflected signal in the IPT field, as is understood by those skilled in the art.

Further to the locating of a receiver device, the transmitter coil or coils for powering/charging the receiver device can also be deduced from the signal strength packet. That is, as discussed below, and in more detail later, the receiver is configured to measure the level of coupling between a certain one of the transmitter coils and the receiver coil(s) of the receiver device, and to indicate this level of coupling to the transmitter by communicating the signal strength. Accordingly, the transmitter can determine which transmitter coil or combination of transmitter coils gives the best coupling. For example, if a combination of two or more transmitter coils are to be used to maximize power transmission whilst maximizing power efficiency, the controller 320 may determine which transmitter coil 312 provides the maximum signal strength measurement and which transmitter coils 312 adjacent that 'best' transmitter coil 312 provides the next 'best' signal strength, so that the 'best' two transmitter coils 312 are selected for power transmission using the selector 324. Alternatively, other measurements of the same or different parameters may be used, such as the current inrush method discussed earlier.

Whilst a two stage receiver detection method has been described in which objects are first detected using a low-power coarse detection method and then located relative to the transmitter coils using the fine detection scanning method, a single stage detection method is within the scope of the present invention. For example, if the power efficiency in detecting newly presented, or movement of previously presented, receiver devices is considered to be of lower importance for a particular application, the coarse detection can be omitted either in particular situations or by omitting the object detection circuitry and associated software altogether from the system. Indeed, the circuitry of the transmitter and receiver may be configured such that power efficiency is optimized during the transmitter pad scan, or any consequential increase in the speed of detection/location may be valued higher than the need for low-power "idle" or standby modes.

Upon locating the receiver device, the system enters the Identification & Configuration phase. In this phase, the transmitter identifies the receiver and obtains configuration information such as the maximum amount of power that the receiver intends to provide at its output (load). For example, this is achieved by the located receiver device also sending an identification communications packet to the transmitter when the energy of the ping signal is received. This identification (second) communications packet communicates an identity of the receiver device in the message portion of the packet. For example, the message contains: a Version Code, a Manufacturer Code, and Basic Device Identifier, as per the version A communications protocol, where the Version Code specifies the receiver is version A and/or version B compatible, the Manufacturer Code identifies the manufacturer of the receiver and the Basic Device Identifier is the receiver device identity which can be randomly generated to ensure sufficient uniqueness (e.g., device ID or ID Code). The state machine 704 processes this received identification packet whereby the transmitter 302 is able to identify the receiver device that has been located. In the version A communications protocol, the identification packet is accompanied by a configuration (third) communications packet in which the message portion of the packet indicates the maximum power the receiver device has been configured to receive. The state machine 704 processes this received configuration packet whereby the transmitter 302 is able to configure parameters of the Power Transfer mode accordingly. For a version B receiver, the configuration packet may contain additional configuration information, such as the maximum/minimum number of transmitter coils needed to power the receiver.

Figure 6E:

As an alternative to the above-described protocol of sequentially providing the coupling, identification and configuration packets in response to the ping from the transmitter, the system may be configured to send similar information in more or less data packets. FIG. 6(E) illustrates an alternative packet structure in which an ID portion or field is provided between the header and message portions. This allows the identity of the device, such as the Basic Device Identifier, to be sent with all data packets which may be useful during subsequent communications, as described later. Further, this could obviate the need for the separate identification data packet being (generated and) sent if the Version and Manufacturer Codes can be inherently deduced from the ID Code, which can assist in speeding up the location and identification scan. Furthermore, the ID code could be further used to initially define the configuration requirements of the identified receiver device, such that the configuration data packet could be omitted also, thereby further speeding up the processing time of the 'fine' detection method of the present system.

In order to describe the Power Transfer phase, it will be first instructive to describe in detail examples of receiver device(s) applicable to the present invention in relation to the applicable exemplary transmitter(s).

Figure 8:
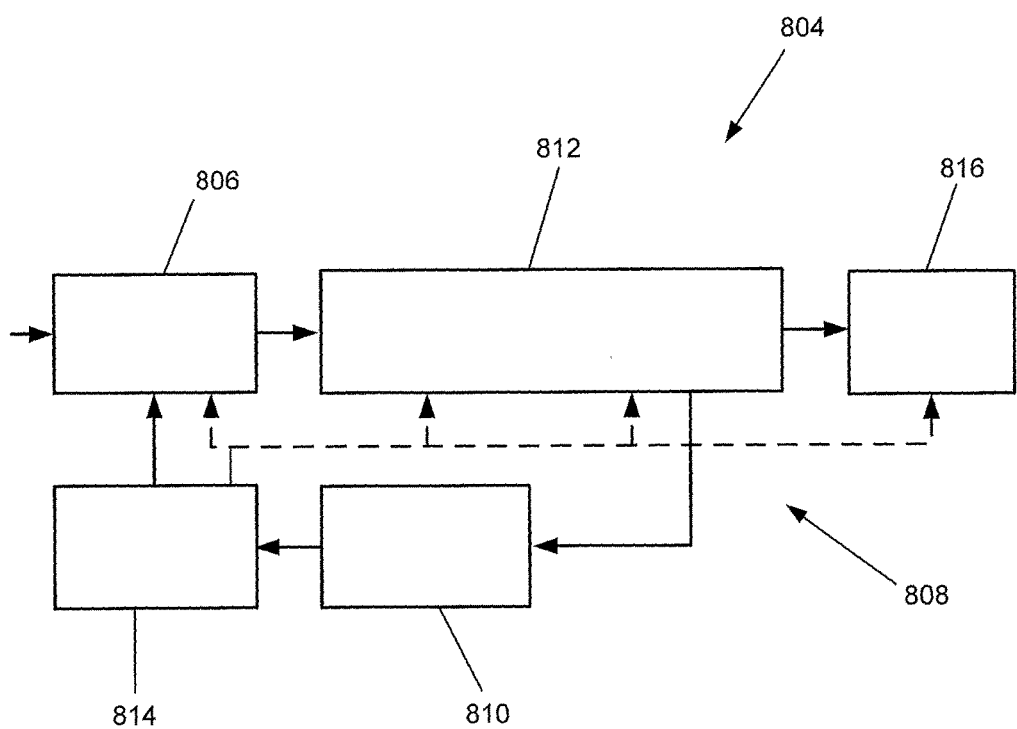
FIG. 8 illustrates an embodiment of a receiver of the system.
Figure 9:
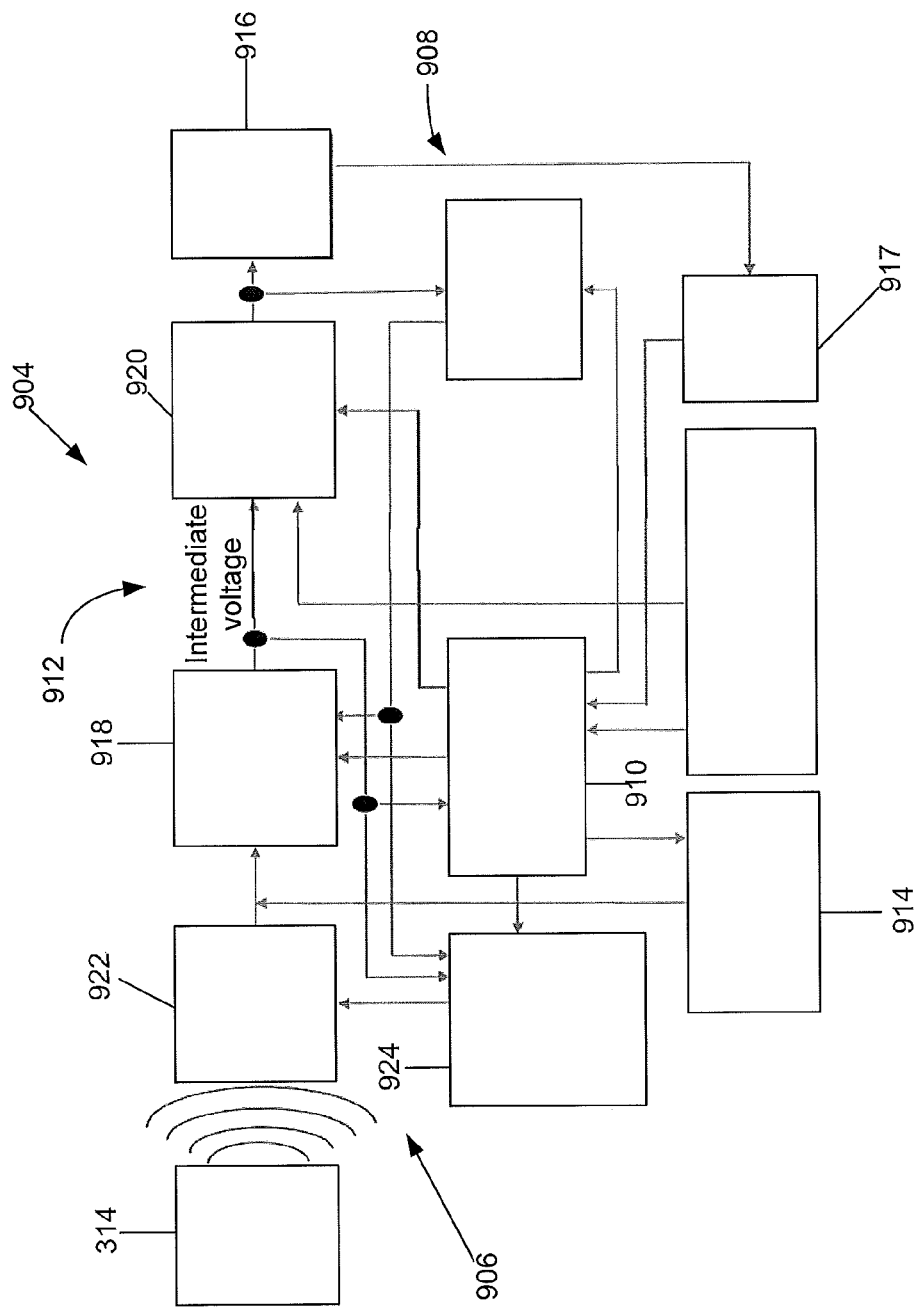
FIG. 9 shows a more detailed example of the receiver in block diagram form.

FIG. 8 illustrates an embodiment of a receiver 804 of the system of the present invention. The receiver 804 is illustrated in block diagram form showing electronics including received power management circuitry 806 and receiver circuitry 808, which includes a controller 810, a received power conditioner 812 and a communications module 814, and a load 816. FIG. 9 shows a more detailed example of a receiver 904 having like components/elements in block diagram form including received power management circuitry 906 and receiver circuitry 908, which includes a controller 910, a received power conditioner 912 and a communications module 914, and a load 916, and a current sensing circuit 917. Additionally, the received power conditioner 912 is illustrated as having a power rectifier 918 and a voltage regulator 920, and the transmitted energy from the coil array 314 of FIG. 3 is shown for context. It is noted that like components/elements of the receivers 804 and 904 function in a similar manner to one another.

The controller 810/910 may be provided as a digital controller in the form of a programmable integrated circuit, such as microcontroller or microprocessor, or as an analog controller in the form of discrete circuit components. In the examples of the received power management and receiver circuitry described herein, a microcontroller is provided not only to drive power flow control to the receiver-side load but also as the main processing circuitry of the receiver, however those skilled in the art understand that the different applicable forms of controller may be equivalently used depending on the particular application of the present system.

The power rectifier 918 may be provided as a switch-based rectifier, such as a half-bridge rectifier or full-bridge rectifier having switches, such as diode based switches, or semiconductor switches, such as transistors, FETs or MOSFETs, in either non-synchronous or synchronous configurations, as is well known to those skilled in the art. The voltage regulator 920 may be provided as a low dropout regulator (LDO) or other circuitry suitable for regulating the voltage in the specific application of the system. As the power received by the receiver coil is an AC signal, in the examples of the receiver circuitry 908 described herein the received power conditioner has the power rectifier 918 configured as a full bridge rectifier which converts AC voltage into DC voltage and the voltage regulator 920 configured as an LDO for regulating the rectified DC voltage (i.e., the Intermediate Voltage illustrated in FIG. 9) to a voltage suitable for delivery to the load 916, however those skilled in the art understand that the different applicable forms of rectifier and regulator may be equivalently used depending on the particular application of the present system.

As discussed earlier, when a receiver device is brought into coupling proximity of the transmitter of the system the presence, relative location and identity of the receiver device is first ascertained before powering/charging of the receiver device is allowed/enabled. This functioning not only assists the spatial freedom of device placement on the transmitter and the simultaneous charging of multiple devices, but also ensures that the devices are powered/charged in a compatible manner. This is because, as described earlier, multiple receiver device versions which adhere to different SSO specifications have different powering and charging requirements, such as maximum allowable voltage delivered to the receiver-side load, for example. This detection and configuration phase is most conveniently performed by having the receiver-side load disconnected from the charging circuitry of the receiver, and thus the transmitter, so there are no issues with incorrect or undesired charging. That is, when the receiver is powered on by the coupling ping of the transmitter the receiver enters an initial state. In this initial state, the power regulator 924 is disabled and the output load 916 is disconnected by keeping the LDO 920 disabled, in a manner well understood by those skilled in the art. Other ways of disconnecting the receiver-side load in the initial and other states are also applicable to the present invention.

By this provision of the load disconnection together with the power rectification and the inclusion of the communications module, the receiver of the present invention, which is configured as a version B receiver, is similar to a version A receiver. However, this is where the similarities end. One functional difference between the version B receiver of the present invention and a version A receiver is the inclusion of power flow control in the receiver side. As will become apparent from the description to come, power flow control for the version A receiver is provided through the communications between the version A receiver and the transmitter, either version A or version B, where the transmitter responds to such communication by altering the amount of power being transmitted. Power flow control is necessary in order to ensure that the load of the receiver device, such a rechargeable battery, is not overcharged or undercharged and so that transmitted power is not unduly and undesirably wasted, since this would reduce the system efficiency. Whilst requiring power flow control on the transmitter-side works well, it is relatively slow in operation as constrained by the use of the communications link and difficult to control in a fine or precise manner as the transmission of power over an IPT field is being used as the primary means of power flow control. Accordingly, the provision of power flow control in the receiver of the present invention itself allows a more dynamic and precise form a control.

Whilst power flow control on the receiver-side is known, it is to be understood that particular application of the present invention is the miniaturisation of the receiver circuitry into consumer electronic devices, such as smartphones, as has been previously described. Accordingly, known power flow control circuitry which is complex, cumbersome and component heavy is not suitable for such application, where the ultimate goal is to integrate the circuitry of the receiver into ICs of the devices themselves.

Figure 10:
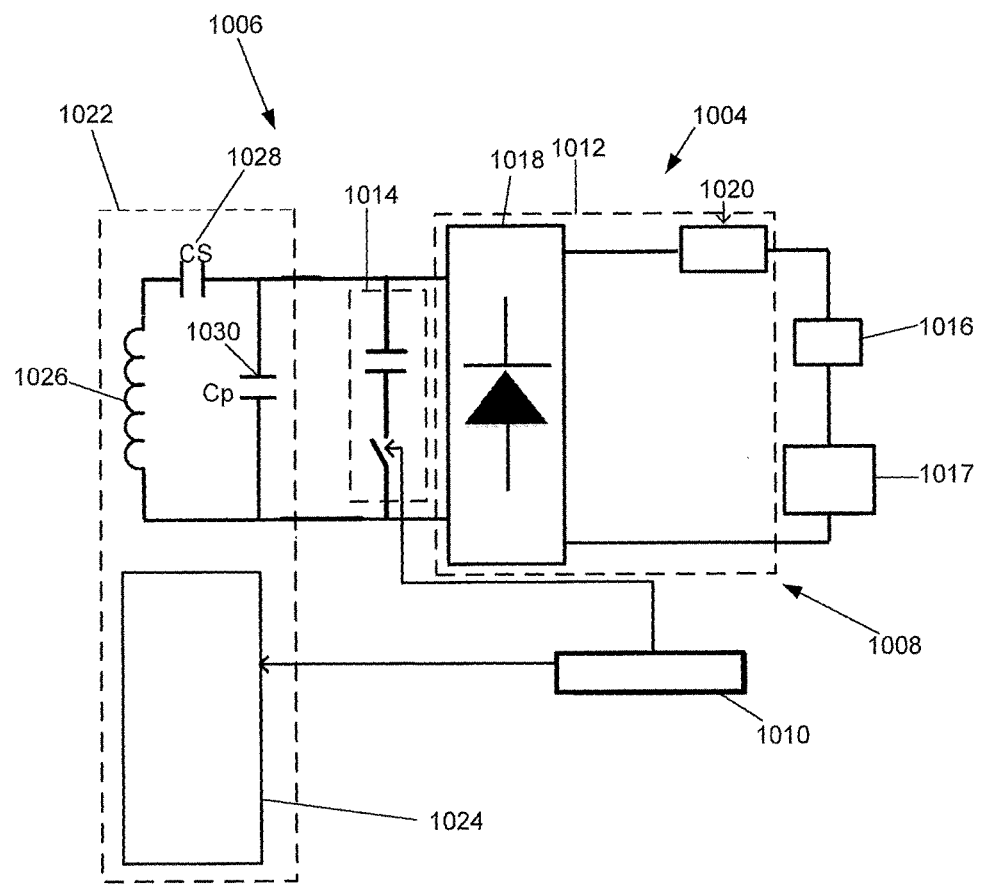
FIG. 10 is a circuit diagram of an exemplary form of the receiver.

The power flow control of the receiver of the present invention is provided by the received power management circuitry under control of the controller. Returning to FIG. 9, the received power management circuitry 906 includes receiver element (coil) circuitry 922 and a power regulator 924 which regulates the power that is delivered from the receiver element circuitry 922 to the received power conditioner 912. Exemplary forms of the received power management circuitry include the tuning circuitry and power regulation configurations disclosed in U.S. Provisional Application Nos. 61/930,191 and 61/990,409 both entitled Coupled-Coil Power Control for Inductive Power Transfer Systems and filed 22 Jan. and 8 May 2014, respectively, U.S. Provisional Application Nos. 62/075,878 and 62/076,714 both entitled Received Wireless Power Regulation and filed 5 Nov. and 7 Nov. 2014, respectively, and New Zealand Provisional Application Nos. 617604, 617606 and 620979 entitled Power Receiver Having Magnetic Signature and Method of Operating Same, Contactless Power Receiver and Method of Operating Same, and Inductive Power Receiver with Resonant Coupling Regulator, respectively, and filed 11 Nov. 2013, 11 Nov. 2013 and 7 Feb. 2014, respectively, the contents of which are all expressly incorporated herein by reference. FIG. 10 illustrates an exemplary embodiment of the receiver having received power management circuitry with adaptions for providing multiple-mode operation for version A and version B powering/charging.

Like FIG. 8 and FIG. 9, FIG. 10 shows a receiver 1004 having received power management circuitry 1006 and receiver circuitry 1008, which includes a controller 1010, a received power conditioner 1012 and a communications module 1014, and a load 1016. The received power conditioner 1012 has a power rectifier 1018, shown as a block diagram of a diode bridge, and a voltage regulator 1020. These components may be configured, and operate, in the manner described for the like components of FIG. 9. The received power management circuitry 1006 has receiver element circuitry 1022 and a power regulator 1024.

The receiver element circuitry 1022 is configured as a dual resonant circuit having a receiving element 1026 and (resonant) tuning elements 1028 and 1030. The receiving element is configured as a receiver (pickup or secondary) coil 1026. The (first) tuning element 1028 is illustrated as a series tuning capacitor $C_S$ configured to improve the power transfer efficiency of the system in a manner understood by those skilled in the art. The (second) tuning element 1030 is illustrated as a parallel tuning capacitor $C_P$ configured to enable a resonant detection method for a version A transmitter in accordance with the version A specification, tuned to about 1 MHz, so is not described in detail herein. The illustrated capacitors may be provided as other fixed or variable reactive elements, such as variable capacitors, inductors, etc., or combinations of such elements, or as other tuning elements, such as resistors, etc., as is well understood by those skilled in the art.

As illustrated in FIG. 10, the receiver 1004 also includes a current sensing circuit 1017 which is provided for sensing the output current to the load 1016 which is communicated to the controller 1010. The controller 1010 uses the sensed output current information for a number of purposes when in version A mode (described in detail later) including:
(a) to request a version A (mode) transmitter to establish an optimal operating point;
(b) to determine the received power as sent to a version A (mode) transmitter; and
(c) to determine if the synchronous rectifier 1018 needs to be enabled, which is not required in version A mode.

Having described exemplary forms of the version A and version B receivers, an example of the Power Transfer mode as implemented by the system of the present invention is now described. As discussed earlier, in the Power Transfer mode of the earlier version SSO specification, the transmitter provides power to the receiver, adjusting its coil current in response to control data that it receives from the receiver. However, in the later version SSO specification the receiver adjusts the amount of received power being delivered to the receiver-side load in the manner described earlier. Therefore, several operation scenarios need to be supported by the system of the present invention in this multi-version charging environment. These scenarios are:
(1) Version B mode—version B transmitter
   version B transmitter charging one or more version B receiver devices;
(2) Version B mode—version B receiver
   version B receiver being charged by a version B transmitter;
(3) Version A mode—version B transmitter
   version B transmitter charging one or more version A receiver devices;
(4) Version A mode—version B receiver
   version B receiver being charged by a version A transmitter;
(5) Multi-version mode—version B transmitter
   version B transmitter charging one or more version A and version B receiver devices.

In order for the system to adopt one of these different modes of operation, a determination of the respective versions of the transmitter and receiver needs to be made in each case. In the version A communications protocol described earlier, the communication is performed in one-direction, that is, from the receiver to the transmitter. This provides a good mechanism for identifying the version of the receiver to the transmitter, in the manner of the Identification & Configuration phase as described earlier, however it does not provide a mechanism for identifying the version of the transmitter to the receiver. Before description of the various scenarios is made the common elements are discussed.

Firstly, as the version A communications protocol is suitable for either version A or version B receiver identification, the manner in which the different version receivers encode the information to be communicated in the data packets in response to the 'ping' from either a version A or version B transmitter is fundamentally the same. That is, the communications module 914 of the receiver 904 uses amplitude modulation (AM) under control of the controller 910 to produce the transitions which define the bit stream of ONE and ZERO bits making the various data packets in a manner well understood by those skilled in the art, for example, amplitude modulation can be provided by configuring the communications module 914 as two capacitors of suitable size with associated switches on the AC-side of the receiver so that an AC signal is modulated using the capacitive load. Further, the communications module 330 of the transmitter 302 is configured in a manner well understood by those skilled in the art to demodulate the modulated signals received from the receiver 904 and feeds the demodulated packets to the decoder 702. Specific examples of embodiments of the demodulation circuitry of the transmitter are described later.

For the signal strength packet, for example, the receipt of the (digital) ping from the transmitter (of any version) causes the receiver element (coil) circuitry 922 to produce a corresponding AC signal which is converted to a rectified DC voltage by the power rectifier 918 as the Intermediate Voltage. The Intermediate Voltage is sampled by the controller 910 (e.g., by using a voltage divider circuit to measure the Intermediate Voltage to produce a voltage sensing signal that is communicated to the controller 910) and is used thereby to control the communications module 914 to produce, using the amplitude modulation, the signal strength packet indicating a level of the Intermediate Voltage, and therefore the level (or strength) of the coupling between the receiver coil and the transmitter coil used to transmit the ping.

Secondly, in the present example, version A requires that the transmitters of any version operate in a certain frequency range, e.g., from about 110 kHz to about 205 kHz. This requirement must be met to ensure compatibility of the later version transmitter and receivers with the earlier version transmitter and receivers. With respect to the frequency range requirements, the operating frequency of the version B transmitter and the version B receiver are set to be about 110 kHz.

Thirdly, the limited required frequency range provides an opportunity for the version B transmitter to communicate with a coupled version B receiver, thereby providing two-way or bi-directional communication, as follows with reference to the FIG. 3 embodiment. The version B transmitter is configured to transmit a discrete non-powering signal outside, or shifted from, the operating frequency range of version A on the (or each) transmitter coil 312 of the array 314 via which a version B identification packet was received from a coupled receiver. For example, a signal of higher frequency than the version A operating frequency, such as about 300 kHz to about 1 MHz, is transmitted. In the present embodiment, a signal (or burst) of about 300 kHz to about 400 kHz is transmitted by the transmitter coils. This is achieved by controlling the transmitted power conditioner 322 to output the appropriate power signal over a predefined time period via the transmitter coils 312 selected using the selector 324. This provides a 'signature' to inform the identified version B receiver to operate in version B mode. In the present embodiment, the predefined time period is about 10 ms to about 50 ms.

For the purposes of restatement, the exemplary process performed by the system before the Power Transfer phase is as follows. On power up of the transmitter an initial state is entered in which none of the transmitter coils are powered such that no power is delivered to any proximate receivers. In this initial state the object detection keeps running to detect if a receiver has been placed on the charging surface of the transmitter. Upon triggering of an object detection result the transmitter runs a scan of the entire charging surface to determine the areas that may have a receiver device thereon. As previously described this scan may involve measuring the current inrush at the discrete transmitter coils or the search for a receiver's response to the sending of a digital communications ping by the transmitter. Further, whilst the described embodiments of the location (and identification) scan involves the scanning of the entire charging surface, it is within the scope of the present invention that the scan is performed only until a receiver device is located. Once a receiver is detected, the transmitter enters the power transfer state. It is noted however that after this initial state, the object detection, and any location and identification scan triggered thereby, continues to be performed by the transmitter so that movement or removal of the detected receiver can be determined and/or the placement of further receiver devices can be detected.

With these common elements understood, the various use cases or scenarios applicable to the system of the present invention are now described in the order they appeared earlier, i.e., scenarios (1) to (5), in the context of the Power Transfer phase and with reference to the exemplary embodiments of FIG. 3 and FIG. 9. It is noted that this order is not to be considered as a sequential order of any kind, as the determination of the correct operation state is performed for all scenarios in the same process flow. Further, various criteria other than what is described now may be required to be met in actual operation of the system. These criteria are described later in the context of specific examples.

In scenario (1), a version B transmitter is to be used to charge one or more version B receiver devices, and therefore the version B transmitter needs to be placed in version B mode.

As in the exemplary regime described earlier, the version B receiver communicates that it is version B as part of the identification packet sent in response to the ping (message) received from the version B transmitter. The communications module 330 of the transmitter 302 in conjunction with the controller 320 (e.g., using the decoder 702 and state machine 704) determines that the received identification packet identifies that the receiver device 904 is version B and in coupling range of the transmitter coil(s) 312 on which the identification packet was received. In response the controller 320 places the transmitter 302 into version B mode.

With the version B transmitter and version B receiver both in version B mode, Power Transfer in version B mode can commence in the manner discussed in relation to scenario (2). It is noted that when in the Power Transfer phase of version B mode when a second or subsequent or another version B receiver is brought into coupling proximity of the transmitter 302, e.g., a second version B receiver is placed on the charging surface, the object detection of the Selection phase is triggered thereby causing interruption of the Power Transfer phase and initiation of the Ping and Identification & Configuration phases. In these phases, the version B receiver(s) already being charged are re-discovered and any new (or moved) version B receivers are discovered. Such that when the Power Transfer phase is entered into, the powering/charging of the re-discovered receivers resumes and powering/charging of the newly discovered receivers commences. Plural version B receiver devices are able to be individually powered/charged simultaneously by the version B transmitter in version B mode even though a single inverter is employed by the transmitter since power flow control is enacted by the version B receivers themselves, as explained in detail below.

It is noted that before entering the Power Transfer phase, the transmitter 302 may perform a so-called foreign object detection step to determine if there is a (metallic or other power absorbing material) object between the transmitter coils and the receiver coil, if present. If a foreign object is detected, the transmitter will choose not to power the transmitter coils. If no foreign object is detected, the Power Transfer phase is started. An exemplary foreign object detection method is the method described in New Zealand Provisional Application No. 626547 and U.S. Provisional Patent Application Nos. 62/078,103, 62/094,341 and 62/099,750, the contents of which are expressly incorporated herein by reference.

In scenario (2), a version B receiver device is to be charged by a version B transmitter, and therefore the version B receiver needs to be placed in version B mode.

In one exemplary embodiment of the version B receiver, the initial state described earlier may be conducted in a neutral mode, i.e., with the receiver placed in neither version A nor version B mode. The selection of version B mode for operation of the version B receiver can be performed as follows from this neutral mode initial state.

With the version B transmitter in version B mode, the transmitter 302 first selects the transmitter coil or coils 312 via which the identification packet was received with the selector 324 and transmits the shifted frequency burst therewith to identify itself as a version B transmitter to the version B receiver. After sending the identification and configuration packets, the controller 910 of the receiver 904 runs a mode selection algorithm which detects the frequency of the power signals from the transmitter 302 received by the receiver coil 922 of the receiver 904, in a manner well understood by those skilled in the art. If the receiver 904 detects the 300 kHz signals from the transmitter 302, it will enter a waiting state.

After a fixed time delay, e.g., about 50 ms as stated earlier, the controller 320 changes the operating frequency of the selected transmitter coil(s) 312 to the charging frequency of the version B receiver, e.g., about 110 kHz. In the waiting state, the receiver 904 detects this change in transmit power frequency since the controller 910 continues to run the mode selection algorithm so as to keep checking the frequency of the signals being received from the transmitter 302. Once it is detected that the 110 kHz signals have been received, the mode selection algorithm selects version B mode by enabling the power regulator 924 and the LDO 920 with the controller 910 thereby connecting the output load 916 to the receiver circuitry 908 and allowing the power management circuitry 906 to control the power flow in the receiver 904.

The version B receiver may also be configured to send or more configuration (third) communication packets to the version B transmitter during the waiting state so as to select the number of transmitter coils that should be operated to power/charge the receiver-side load.

Further, in one example of an earlier version specification, in order for a power contract to be established between a version A or version B receiver and a version A transmitter, valid signal strength, identification and configuration packets need to be received by the transmitter from the receiver within a required time interval, e.g., about 500 ms. Accordingly, the version B receiver may be configured to assume it has been placed on a version A transmitter in the initial state described earlier. That is, the default mode of the version B receiver is version A mode so that the version B receiver can quickly establish a version A power contract. In this example, the mode selection algorithm is configured as a frequency detection Interrupt Service Routine (ISR) in which the default movement from the initial state to version A mode is interrupted when the version B signature signal from the transmitter is detected.

With the version B transmitter and version B receiver both in version B mode, Power Transfer in version B mode can commence and power flow control effected in the manner applicable to the configuration and operation of the receiver coil circuitry 922 and power regulator 924 of the received power management circuitry 906 and the received power conditioner 912, as described for example in afore-referenced U.S. Provisional Application Nos. 61/930,191, 61/990,409, 62/075,878 and 62/076,714 and New Zealand Provisional Application Nos. 617694, 627606 and 620979.

In scenario (3), a version B transmitter is to be used to charge one or more version A receiver devices, and therefore the version B transmitter needs to be placed in version A mode.

As in the exemplary regime described earlier, the version A receiver communicates that it is version A as part of the identification packet sent in response to the ping (message) received from the version B transmitter. The communications module 330 of the transmitter 302 in conjunction with the controller 320 (e.g., using the decoder 702 and state machine 704) determines that the received identification packet identifies that the receiver device is version A and in coupling range of the transmitter coil(s) 312 on which the identification packet was received. In response the controller 320 places the transmitter 302 into version A mode.

With the version B transmitter in version A mode, Power Transfer in version A mode can commence as follows, for example.

As discussed earlier, in version A mode of the transmitter 302 power flow control for the version A receiver is provided through the communications between the version A receiver and the version B transmitter. In particular, once in version A mode the controller 320 of the transmitter 302 processes (e.g., using the decoder 702 and state machine 704) the configuration (third) communications packet received at the communications module 330 from the version A receiver to establish a power contract with the version A receiver. All proceeding power transfer control is then handled by the version A receiver using the communications. For example, the controller 320 responds to power transfer (fourth) communications packets sent by the version A receiver. The message portion of the power transfer packets are used by the version A receiver to provide different control functions. For example, the power transfer packets may include a start power transfer packet, an end power transfer packet, an adjust power packet and an error packet. These packets are decoded by the decoder 702 and implemented by the state machine 704 to ensure the power signal is controlled and regulated so the transmitter conforms to the version A specification.

When the transmitter 302 receives the start power packet, the controller 320 adjusts the operating frequency of the transmitting coils 312 being used to power the receiver to move to the operating point specified in the message portion of the start power packet and begins power transfer. In the present example, the state machine 704 sets the amount of power transferred by adjusting the (buck-boost) output voltage of the transmitted power conditioner 322.

Once power transfer has begun, the adjust power packets are continuously sent by the version A receiver as the amount of power required by the receiver-side load varies with the charging and use status and are used to regulate the amount of power being received at the version A receiver. When the transmitter 302 receives the adjust power packets, the controller 320 adjusts the operating frequency of the transmitting coils 312 being used to power the receiver to move to the optimal operating point specified in the message portion of the adjust power packet. In the present example, the state machine 704 controls the amount of power transferred by adjusting the (buck-boost) output voltage of the transmitted power conditioner 322 as each adjust power packet is received.

If the controller 320 cannot adjust the output voltage to satisfy the required adjustment (either higher or lower) because the transmitted power conditioner 322 is at the limits of its operational range, the controller 320 may cause the selector 324 to select a different transmitting coil 312 (or set of coils) being used to worsen or improve the field coupling with the receiver coil.

When the transmitter 302 receives the end power packet or error packets, the controller 320 ends power transfer and moves back to its initial state from the Power Transfer phase. Error packets may be sent as indicators of the presence of various erroneous conditions within or in the vicinity of the receiver, such as over-temperature, over-voltage, etc.

Another possible power transfer communications packet generated and sent by the version A receiver is a received power packet, which may be continuously sent during the Power Transfer phase. These received power packets can be used by the version B transmitter to determine the difference between the power being transmitted (which is known to the controller) and the amount of power being received by the version A receiver thereby allowing calculation of any power transfer loss. The transmitter may be programmed with a predetermined threshold value of power transfer loss which is acceptable for version A power transfer. This threshold indicates a possible situation that some object other than or additional to the version A receiver is receiving some or all of the transferred power, a so-called foreign object. Such foreign objects need to be detected to reduce undesirable effects, such as inefficient power transfer to the receiver and absorption of the transferred power by the foreign object, which may be metallic, thereby causing unwanted or unsafe heating. In particular, if the controller 320 determines that the power transfer loss is higher than the predetermined threshold power transfer loss value, the transmitter 302 stops powering the receiver to prevent the foreign object from getting hot. Accordingly, the version B transmitter is able to perform foreign object detection using power loss accounting whilst in version A mode.

When power transfer is ceased, either due to receipt of end power packets or error packets (CEPS), or determination of a possible foreign object being present, the transmitter may indicate these situations to the user through the instrumentation 226, for example, such as an audible or visual indication, e.g., using the LEDs. Alternatively, or additionally, the controller may be configured to indication each situation in a different manner, i.e., different flashing or colour regimes for end power and error situations. These functions are equally applicable to version B mode of the transmitter with respect to the ending of the Power Transfer phase in either normal or erroneous operating conditions.

In another example of the present embodiment, the received power data packet may be used instead of the power adjust packet rather than in addition. That is, the transmitter 302 may be configured to determine whether power flow control is necessary based on the received power value indicated in the received power data packet.

It is noted that when in the Power Transfer phase of version A mode when a second or subsequent or another version A receiver is brought into coupling proximity of the transmitter 302, e.g., a second version A receiver is placed on the charging surface, the object detection of the Selection phase is triggered thereby causing interruption of the Power Transfer phase and initiation of the Ping and Identification & Configuration phases. In these phases, the version A receiver already being charged is re-discovered and any new (or moved) version A receivers are discovered. However, unlike version B mode in which plural version B receivers can be individually powered/charged simultaneously by the version B transmitter, in version A mode only one version A receiver can be powered/charged at a time. This is because, unlike version B mode in which power flow control is enacted by the version B receivers themselves, in version A mode power flow control is enacted by the transmitter, and in the present case of the version B transmitter this is performed by a single inverter. Accordingly, when the Power Transfer phase is re-entered, the transmitter 302 can be configured, for example, to resume powering/charging of the re-discovered receiver until the end power packet is receiver therefrom at which point powering/charging of the newly discovered receiver commences. Alternatively, the version A receivers could be alternately powered/charged over time, rather than subsequently.

Whilst it is physically possible to power/charge more than one version A receiver simultaneously, it is not possible to ensure that each version A receiver is receiving the optimal amount of power as is required by the earlier version specification of the present example. If however the earlier version specification of a particular application provides differing criteria and requirements, multiple charging could be supported in the earlier specification version mode.

In scenario (4), a version B receiver device is to be charged by a version A transmitter, and therefore the version B receiver needs to be placed in version A mode.

As described earlier, the initial state of the version B receiver may be conducted in neutral mode, i.e., with the receiver placed in neither version A nor version B mode, or default mode, i.e., with the version B receiver in version A mode so that the version B receiver can quickly establish a version A power contract. In either of these modes, as with a version B transmitter, the version A transmitter intermittently transmits a 'ping' to detect the presence of a suitable receiver. The version B receiver responds to a received ping from the version A transmitter in the same manner as discussed earlier, e.g., by communicating coupling (signal strength) and identification (and configuration) packets. However, unlike in scenario (2), if the receiver 904 is in neutral mode, after sending the identification (and configuration) packet, the version B receiver will not enter the waiting state because unlike with a version B transmitter, the receiver 904 will not detect any shifted frequency or other signature signals from the version A transmitter, rather the version A transmitter will begin transmitting power at the operating frequency, e.g., 110 kHz, based on the configuration packet received from the receiver 904. Based on the non-receipt of the shifted frequency or other signature signal, the controller 910 of the receiver 904 determines that the transmitter is version A, and therefore enters or maintains version A mode thereby establishing the power contract.

As with the version A receiver, in version A mode the version B receiver handles all proceeding power transfer control using the communications. For example, the communications module 914 of the receiver 904 generates and sends power transfer (fourth) communications packets to the version A transmitter. The message portion of the power transfer packets are used by the receiver 904 to provide different control functions. For example, the power transfer packets may include a start power transfer packet, an end power transfer packet, an adjust power packet and an error packet. These packets are decoded by the decoder and implemented by the state machine of the version A transmitter to ensure the power signal is controlled and regulated so the transmitter conforms to the version A specification.

With respect to the start power packet, the controller 910 of the receiver 904 measures the Intermediate Voltage to check if (predetermined) start-up requirements for Power Transfer of the version A specification are met or not. In the present example, the start-up requirement for Power Transfer is that the Intermediate Voltage is greater than seven (7) Volts. If the start-up requirement is not met, the communications module 914 in conjunction with the controller 910 sends an error packet to request the version A transmitter to move to an optimal operating point so that the start-up requirement is met. Once the start-up requirement is met, the controller 910 enables the LDO 920 thereby connecting the output load 916 to the receiver circuitry 908. It is noted that the power regulator 924 is not enabled in version A mode, and therefore the power management circuitry 906 does not control the power flow in the receiver 904.

Once power transfer has begun, the controller 910 continuously determines the output to the load 916. This can be done by measuring the voltage or the current output by the LDO 920. In the exemplary embodiments, the current sensing circuit 917 is used to measure the output current as described earlier. The output current samples are communicated to the controller 910 which checks the measured values against predetermined value ranges, for example by consulting a lookup table, to determine the desired Intermediate Voltage. Table 1 shows an example of the relationship of the output current and the desired Intermediate Voltage for the present embodiment in which a 5V LDO is used to regulate the output voltage to be 5V. In this case, the minimum dropout voltage is designed to be less than 100 mV at 1.5 A output. Thus, the Intermediate Voltage can be controlled to be 5.1V to allow the 100 mV dropout and keep the output voltage to be 5V.

TABLE 1

Lookup Table for desired Intermediate Voltage

| Output Current (mA) | Desired Intermediate Voltage (V) |
|---|---|
| 0-100 | 7 |
| 101-300 | 6 |

TABLE 1-continued

Lookup Table for desired Intermediate Voltage

| Output Current (mA) | Desired Intermediate Voltage (V) |
|---|---|
| 301-500 | 5.5 |
| 500-1000 | 5.1 |

At low or light load, e.g., the battery of the receiver device is near its fully charged state, the desired Intermediate Voltage is set to a high value so the receiver 904 can handle a load step without affecting the output voltage. At higher load, e.g., the battery of the receiver device requires charging, the desired Intermediate Voltage is set to 5.1V so the dropout voltage between the Intermediate Voltage and the output voltage is 0.1V to minimize the power loss across the 5V Load LDO 920.

After determining the desired Intermediate Voltage, the controller 910 of the receiver 904 samples the actual Intermediate Voltage to determine the difference between the desired Intermediate Voltage and actual Intermediate Voltage at the measured (known) output current value. Based on this difference the controller 910 sets the value of the message of the power adjust packet with the communications module 914. This may be achieved for example by dividing the calculated difference between the desired Intermediate Voltage and actual Intermediate Voltage by a predetermined scale factor. This power adjust value can be either positive (e.g., requesting the version A transmitter to provide more power) or negative (e.g., requesting the version A transmitter to provide less power). The adjust power packets are continuously sent by the receiver 904 as the amount of power required by the receiver-side load varies with the charging and use status and are used to regulate the amount of power being received at the receiver 904.

The controller 910 of the receiver 904 is also configured to generate and send received power packets using the communications module 914 so that power loss accounting for error and/or foreign object detection can be performed by the version A transmitter. The received power is a measurement of the total power (including power loss) received by the receiver from the transmitter. The received power value is calculated as: Received Power=Output Current×Intermediate Voltage+Estimated Loss. The "Estimated Loss" is predetermined from knowledge of the circuit componentry and operation.

In the Power Transfer phase, the receiver 904 constantly monitors if the load 916 has met the conditions to end power transfer as well reporting the power adjust and received power packets to the version A transmitter within any specified/required time intervals. If any of the conditions to end power transfer have been met, the receiver 904 generates and sends the end power transfer packet to the version A transmitter using the communications module 914 at which point the Power Transfer phase ends, and the receiver 904 returns to the initial state.

In another example of the present embodiment, the received power data packet may be used instead of the power adjust packet rather than in addition. That is, the receiver 904 may be configured to send the received power data packet and the version A transmitter may determine whether power flow control is necessary based on the received power value indicated in the received power data packet.

Another possible power transfer communications packet generated and sent by the version B receiver is an error packet. Error packets are indicators of the presence of various erroneous conditions within or in the vicinity of the receiver, such as over-temperature, over-voltage, etc., as determined by the controller 910 using various means in the receiver circuitry as is well understood by those skilled in the art.

In scenario (5), a version B transmitter is to be used to charge one or more version A receiver devices and one or more version B receiver devices, and therefore the version B transmitter needs to be placed in multi-version mode.

As described earlier with respect to scenarios (1) and (3), in version A mode a single version A receiver is powered/charged at a time and in version B mode multiple version B receivers are powered/charged at a time. The basic functionality of these modes holds in various situations of scenario (5) such as:

(a) a version B receiver is being powered/charged in version B mode and a version A receiver is introduced to the version B transmitter; and (b) a version A receiver is being powered/charged in version A mode and a version B receiver is introduced to the version B transmitter.

In either situation (a) or (b), the Power Transfer phase is interrupted by the object detection of the Selection phase and the Ping and Identification & Configuration phases are subsequently performed, as described earlier. In the present embodiment, in either situation (a) or (b), version B mode charging is given preference. That is, in situation (a) the version B receiver already being charged is re-discovered and the version A receiver is discovered such that when the Power Transfer phase is re-entered the version B transmitter resumes powering/charging of the re-discovered version B receiver until it is fully charged or removed from the transmitter and then commences powering/charging of the newly discovered version A receiver; and in situation (b) the version A receiver already being charged is re-discovered and the version B receiver is discovered such that when the Power Transfer phase is re-entered the version B transmitter commences powering/charging of the newly discovered version B receiver until it is fully charged or removed from the transmitter and then resumes powering/charging of the re-discovered version A receiver. This is only exemplary however, and version A mode could be given preference over version B mode, for example.

Furthermore, a multi-version mode could be implemented by the transmitter 302 in which version A and version B receivers are simultaneously or alternately powered, for example. Such a multi-version mode is particularly possible where the earlier version specification of a particular application provides differing criteria and requirements.

In the present exemplary embodiments, in scenarios (3), (4) and (5), version A mode requires power flow control to be performed by the transmitter in response to communication from the receivers. This constant stream of communicated power data, i.e., the power adjust and/or received power data packets places a further constraint on the ability to power/charge version A receivers simultaneously with other version A or version B receivers. This is because the messages in the data stream employed in the version A communications protocol, described earlier, of each receiver operating in version A mode may corrupt the messages of the other version A mode receivers or cause charging interrupts to the version B mode receivers.

A possible solution to such data package conflicts is to include the device identifier (device ID) in all communications packets/packages, generated and sent by the version A (mode) receivers, rather than just in the identification communications packet. For example, the ID code may be included in the data packets as illustrated in FIG. 6(E). In this way, techniques such as code division multiple access (CDMA) or time division multiple access (TDMA) can be used for decoding and implementing the messages of the received data packets from the individually identified receivers.

For example, when a coupled receiver needs to transmit a message it selects a random transmission window from a set of available time windows or slots and remains quiescent for the other transmission windows to allow other receiver devices to communicate in those windows. In one example, the controller 910 of the receiver 904 can be configured to use the unique device ID as a seed for the random number for the random selection of the transmission window. If the (version A) communications protocol being implemented does not have any sort of data collision detection or acknowledged packet, then there is no way that the receiver can know whether the sent message was successful or clashed with the message of another receiver. Accordingly, the receiver 904 may continue to send the message in another randomly selected time window for a cycle of time slot sets until the power transfer conditions change. When there is more than one receiver being powered/charged there will be communication errors caused by the receivers choosing the same transmission window however messages will get through in subsequent transmissions without corruption because each receiver selects different random transmission windows each time. The probability of error free communication using this method is enhanced by keeping the maximum number of receivers capable of being charged at once relatively low, e.g., less than five, and keeping the number available transmission time slots relatively high without increasing the overall communication time, e.g., about eight time windows provides a good chance of getting a message through whilst retaining sufficiently fast communication.

In scenarios (1) and (2), the amount of power to be transferred by the version B transmitter during the Power Transfer phase is initially set in accordance with the configuration communications packet and/or the start power transfer communications packet received at the communications module 330 from the version B receiver to establish a power contract with the version B receiver. In version B mode, it is possible to have power transfer control handled by the version B receiver using the communications rather than, or in addition to, the receiver-side power flow control, like the version A receiver. That is, like in version A mode, or in a combined mode of versions A and B, power transfer control can be handled by the version B transmitter alone or in combination with the power flow control of the version B receiver. For example, the version B receiver may have a predefined range of dynamic power flow control and the version B transmitter may be used for power transfer control outside of this range.

In this combined mode, like in version A mode, the controller 320 of the transmitter responds to power transfer communications packets (including start power transfer, end power transfer, adjust power and control error packets) sent by the version B receiver. These packets are decoded by the decoder 702 and implemented by the state machine 704 to ensure the power signal is controlled and regulated so the transmitter transfers the requested amount of power to the version B receiver.

Without further configuration however, this combined mode suffers from the same conflicts between power transfer packets from multiple version B receivers as discussed above for scenarios (3), (4) and (5). To alleviate this the afore-described conflict resolution is implemented. However, unlike at least scenarios (3) and (4), the power flow control provided by the version B receivers allows this combined mode to optimize power flow control and delivery, as follows.

In version B mode, since multiple version B receivers are powered at the same time, the version B transmitter receives multiple power transfer packets from multiple version B receivers. The values of these power transfer packets are typically different and therefore the correct response from the version B transmitter in adjusting the amount of power being transferred is unknown unless preset. This presetting could be that the earlier placed receiver is given priority over later placed receivers or no receiver is given priority and an average or mean power level is transferred.

However, based on the configuration of the power regulator (and conditioner) in the receiver circuitry and the advantages in power flow efficiency to the receiver-side load, it is preferable to have the power flow control circuitry in the receiver suppress or attenuate the received power (e.g., Buck control) rather than increase the received power (e.g., Boost control) to meet the load power requirements. The value of a power transfer (control error) packet is set by the receivers to be a zero value if the control point provided by the transmitter is equal to the desired control point (i.e., the received power is equal to the power required by the load), a negative value if a decrease in received power is required, and a positive value if an increase in received power is required.

Accordingly, in the combined mode, the controller of the version B transmitter is configured so as to only respond to the power transfer packet that has the highest value in order to adjust the transmitted power for that version B receiver which requested that highest power level. In this way, the other version B receiver(s) self-regulate to decrease the power supplied to the load for their own load power requirements. Accordingly, the power controller of the transmitter follows the receiver device requesting the most power.

In particular, this is achieved by the PID controller or the like of the transmitter controller collecting all power transfer (control error) values from all powered receivers during a communications frame period, choosing the maximum collected value (such that would result in the largest current on the transmitter coils) as the power transfer (control error) value which is used to update the control algorithm, and applying the updated control value at the start of the communications frame, synchronously with the start of frame transmission. If the highest CEP value is not zero, the updated control value is set so as to bring that highest value to zero over subsequent communications frames, thereby bringing at least that receiver into a steady operating state.

It has been described that the communications packets or packages are generated and sent by the communications modules of the transmitter and receivers, however the present invention is not restricted in this. Alternatively, the various data packets may each be predefined and stored for later access during operation via a lookup table, for example, rather than being generated in real time. Additionally, or alternatively still, at least some of the various portions of the data packets may be separately predefined and stored such that the data packets are 'generated' by combining the various predefined portions with other predefined portions and/or actively generated portions depending on the type of data packet required, e.g., the preamble and header (and ID) portions may be predefined and common to all packets of the same types or multiple types, the message and checksum portions may be wholly predefined, or partly predefined and partly actively generated in real time, or wholly actively generated in real time. Further, other data structures of the communications packets are possible, as understood by those skilled in the art. Furthermore, the communications modules of the transmitter and receivers are illustrated as being separate elements the respective controllers, however the present invention is not limited to this. For example, the communications functions of packet generation, data storage, data look-up, coding/decoding, implementation, and receipt and transmission may be performed within the controllers themselves. Further, the required data for the generation of the communications packets and for the measurement and calculation of the variously described data may be stored by analog and/or digital memory which is separate from, dedicated for, and/or integrated with, the controllers.

It is noted that the exemplary configuration of the receiver-side power flow control illustrated in FIG. 10 effectively provides AC-side power regulation, i.e., pre-rectification. Those skilled in the art understand that configurations implementing DC-side power regulation, i.e., post-rectification, are equally applicable. In the case of AC-side regulation, it is difficult to implement the afore-described IPT communication and power flow control (regulation) at the same time during the Power Transfer phase since the regulation introduces distortion on the AM communication signal. This is because, the use of amplitude modulation changes the intermediate voltage which causes the power regulator to regulate the voltage to compensate for this change rather than remaining in a steady state of regulation during the communication period. The amount of regulation, and therefore the amount of distortion introduced, may be sufficient to prevent the power transmitter from correctly resolving and/or receiving the data packet being communicated such that the Power Transfer is erroneously ceased. This situation may be handled as follows.

In one embodiment, during receiver to transmitter AM communication, the AC-side regulator is deactivated or disconnected, e.g., turned off, by the controller. Whilst the regulator is in this state, the intermediate voltage rises which will cause a rise in the output voltage, i.e., the voltage to the load is essentially unregulated. However, the output voltage can be maintained at a substantially constant level by the voltage regulator (LDO) during this period, since each communication period is relatively short, e.g., about 50 ms, and occurs periodically, e.g., about once per second, such that the voltage regulator can dissipate the extra power during the communication time period without overstress being caused on the voltage regulator. Accordingly, DC-side power flow control is implemented in auxiliary when the AC-side power flow control is deactivated during communications.

In another embodiment, the controller of the receiver is provided as a digital controller. The digital controller is configured to store the ADC/controller value at the time of initiating AM communications and to use this stored value for the duration of communications, thereby providing the auxiliary power regulation state. Basically, rather than completely deactivating the power regulator during communications it is maintained in the state it was in before communications. In this way the voltage regulator does not need to work as hard as in the above-described embodiment when the power regulator is completely turned off because the change in the intermediate voltage and consequential change in the output voltage is decreased.

Having now described the various use scenarios and the manner in which the system of the present invention deals with these cases, it is instructive to now describe specific details of a particular exemplary embodiment. For the receiver devices 1004, the output power to be supplied to the load 1016 is about 7.5 W, whereas for the version A receivers the output power is about 5 W. The output voltage from the LDO 1020 to the load 1016 is about 5V. These operating parameters can be provided by the exemplary circuits illustrated in FIG. 11 and FIG. 12. FIG. 11(A) to FIG. 11(G) illustrate exemplary schematic component configurations and parameters for the transmitter of FIG. 4 and FIG. 12(A) to FIG. 12(D) illustrate exemplary schematic component configurations and parameters for the receiver of FIG. 10 which are complementary to the various parameters and values already described.

Figure 11A:
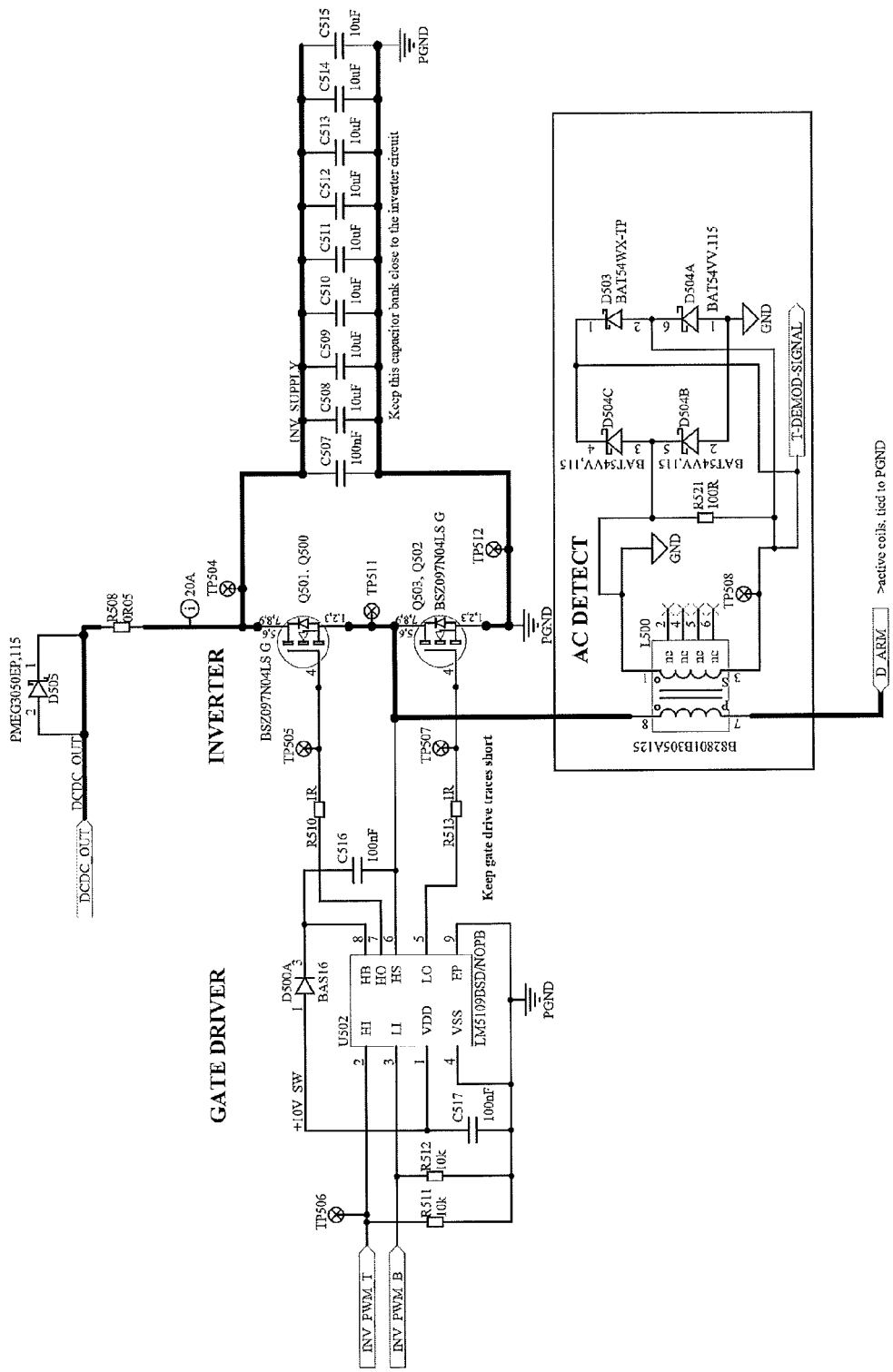
FIG. 11(A) illustrates a schematic view of an exemplary circuit operable to achieve the functions of an inverter of the transmitter.
Figure 11B:
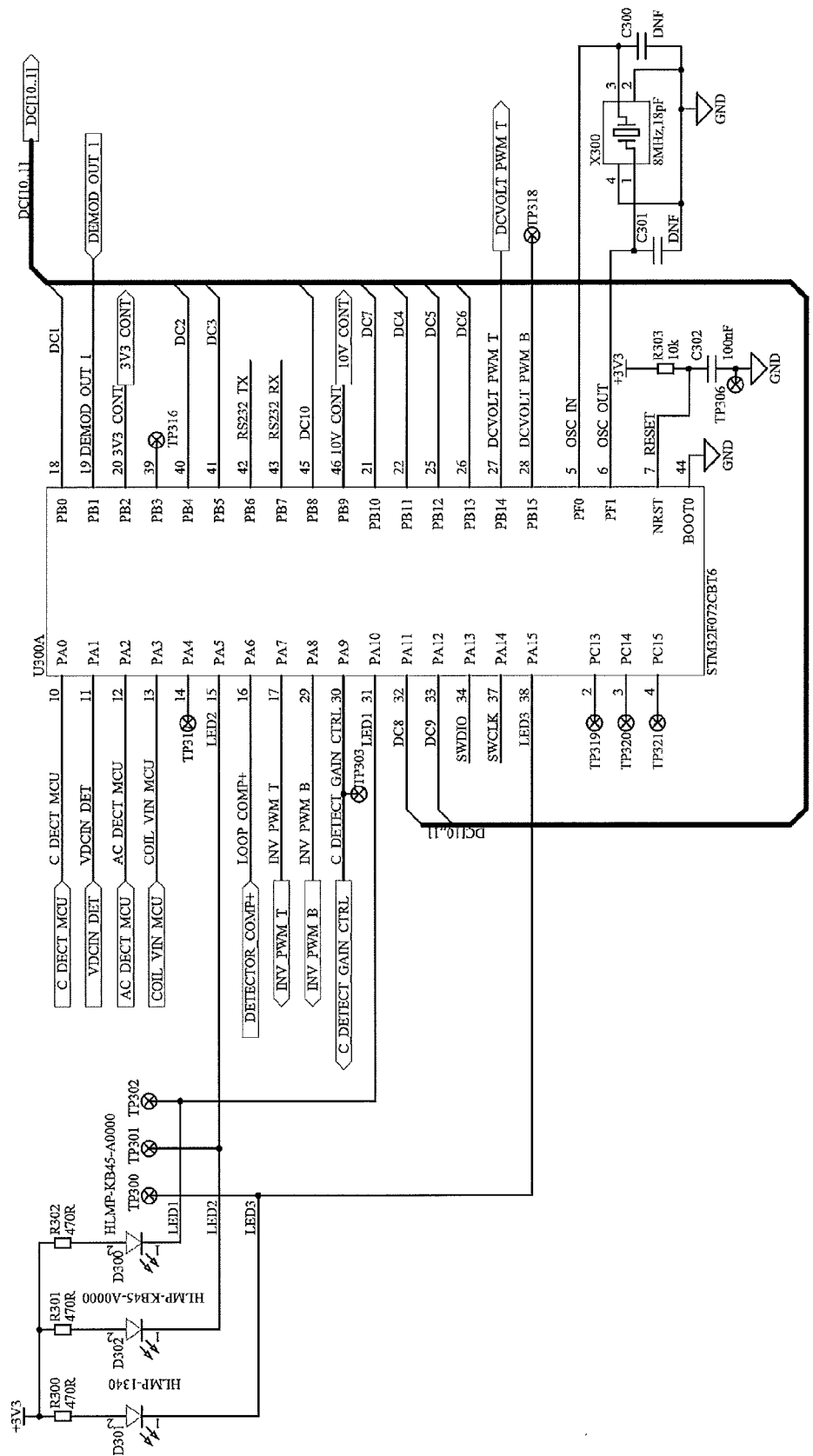
FIG. 11(B) illustrates a schematic view of an exemplary circuit operable to achieve the functions of a microprocessor of the transmitter.
Figure 11C:
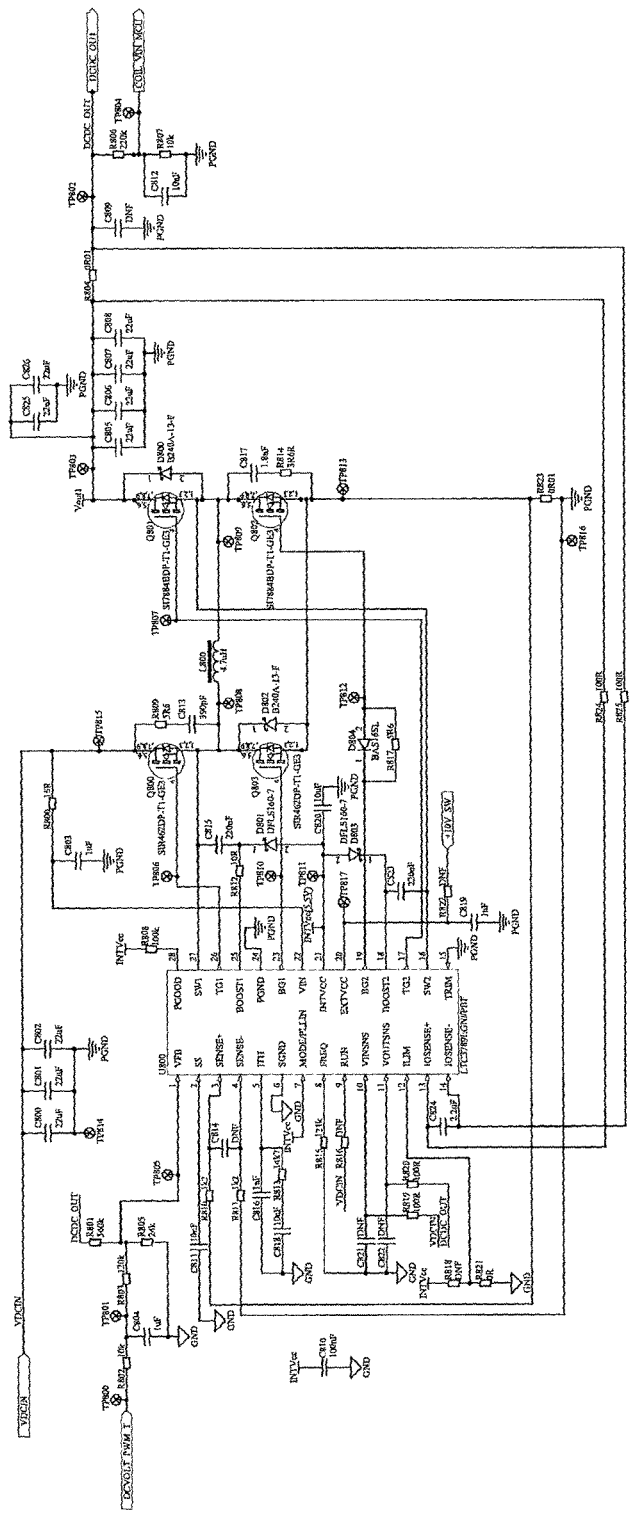
FIG. 11(C) illustrates a schematic view of an exemplary circuit operable to achieve the functions of a power regulator of the transmitter.

With respect to the transmitter 402, the rectifier 434 is a half-bridge inverter having a pair of FETs (see FIG. 11(A)) driven by the microprocessor of the controller 420 (see FIG. 11(B)) to rectify the regulated power from the Buck-Boost converter circuit of the power regulator 432 (see FIG. 11(C)) and provide the rectified power to the transmission coils 412. The transmitter coil array 414 is formed by a number of transmitter coils 412 (see FIG. 11(D)) with each transmitter coil having a switch connected to one side of the transmitter coil as the selector 424 (see FIG. 11(E)). A set of the transmitter coils can be turned on to power the receiver if the respective switches of the transmitter coils have been switched on. The detection circuit of the object detector 428 and the demodulation circuit of the communications module 430 are as illustrated in FIG. 11(F) and FIG. 11(G), respectively.

In FIG. 11(A), the inputs are: DCDC_OUT—11-21 VDC from the buck-boost regulator, +10_SW from 10V linear regulator 446 and INV_PWM_T and INV_PWM_B being a square wave pulse from the microprocessor via gate drive circuit 450, the output is: D_ARM which drives the transmitter coils, and the depicted circuit provides high frequency AC current to the transmitter coils (up to 5 Arms) and an operating frequency between about 110 kHz and about 300 kHz.

In FIG. 11(C), the inputs are: VDC_IN which is the 19 VDC input supply 442 via the EMI filter 444 and an inrush current and reverse polarity protection circuit 452 and DCVOLT_PWM_T which is a PWM signal from microprocessor used to vary output voltage regulation, the outputs are: DCDC_OUT which is designed to vary from 11V to 21V which is fed into the inverter circuit, and COIL_VIN_MCU which is connected to pin 13 of microprocessor and used to detect the output of buck-boost converter and varies from 0.48V to 0.91V as the output voltage ramp from 11V to 21V, and the depicted circuit provides variable input voltage to the inverter (11V-21V) to enable version A compatibility and an operating frequency of about 400 kHz.

Figure 11D:
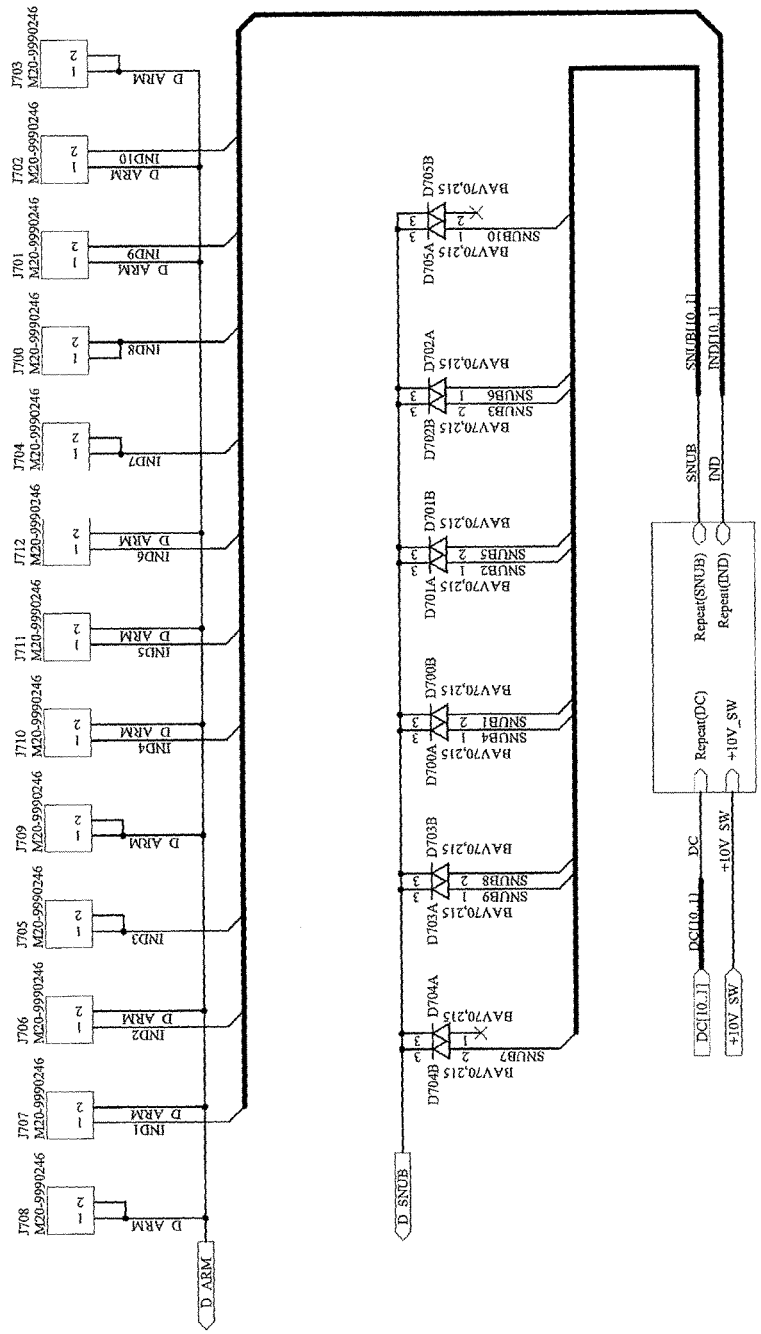
FIG. 11(D) illustrates a schematic view of an exemplary circuit operable to achieve the functions of a transmitter coil array of the transmitter.
Figure 11E:
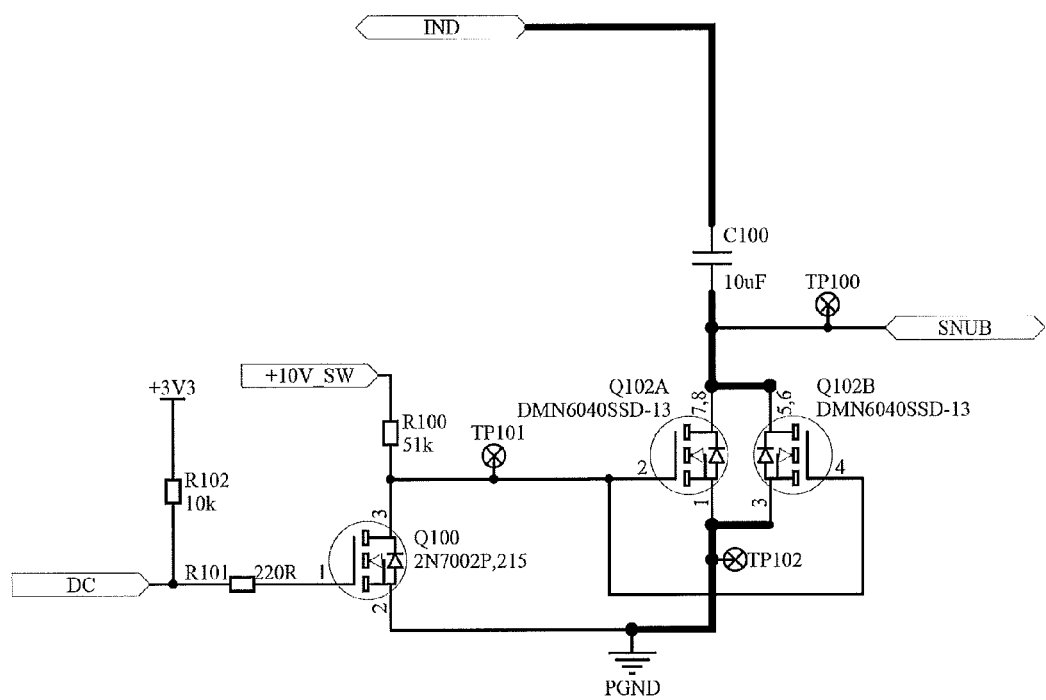
FIG. 11(E) illustrates a schematic view of an exemplary circuit operable to achieve the functions of a selector of the transmitter.
Figure 11F:
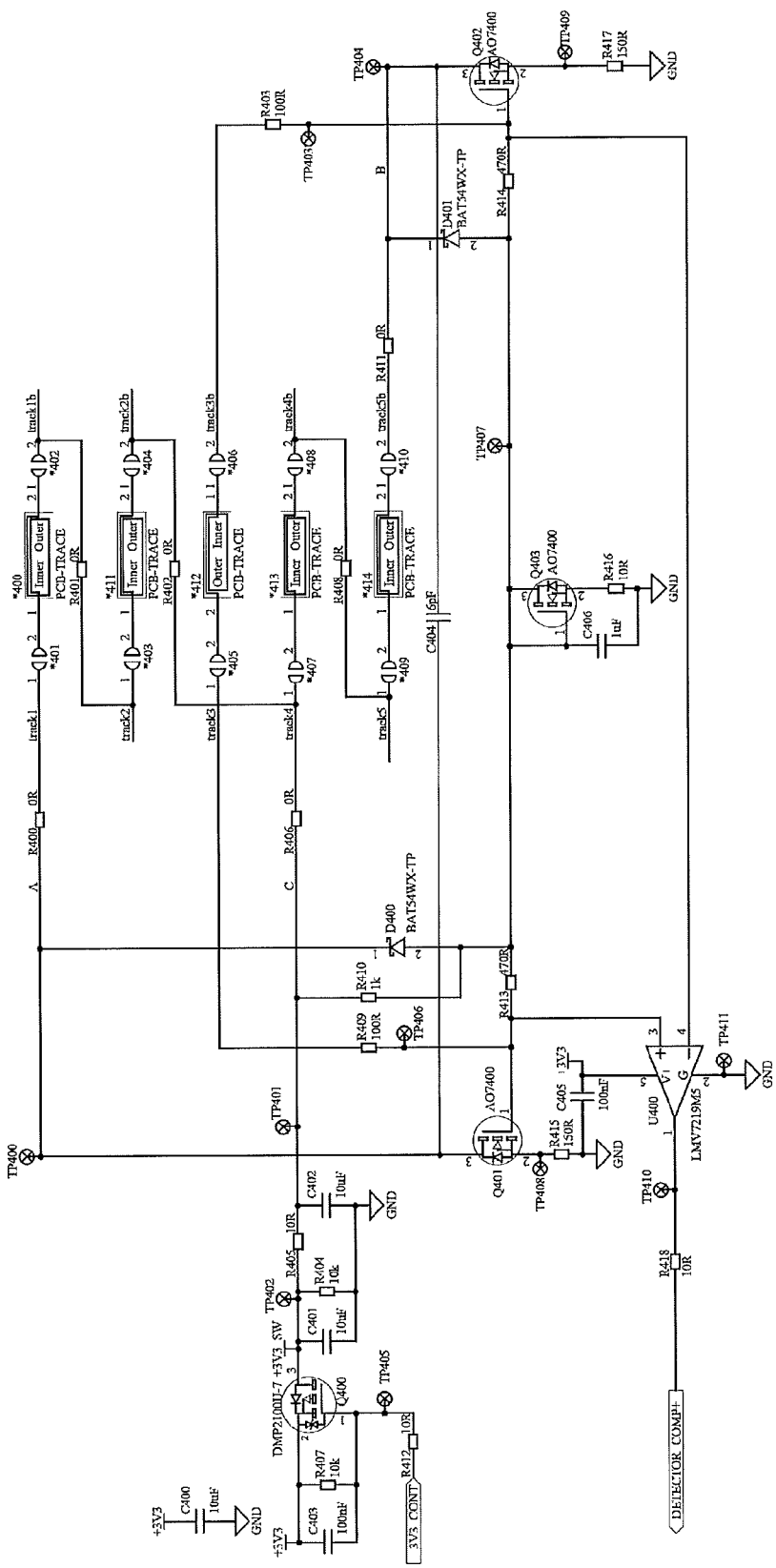
FIG. 11(F) illustrates a schematic view of an exemplary circuit operable to achieve the functions of an object detector of the transmitter.
Figure 11G:
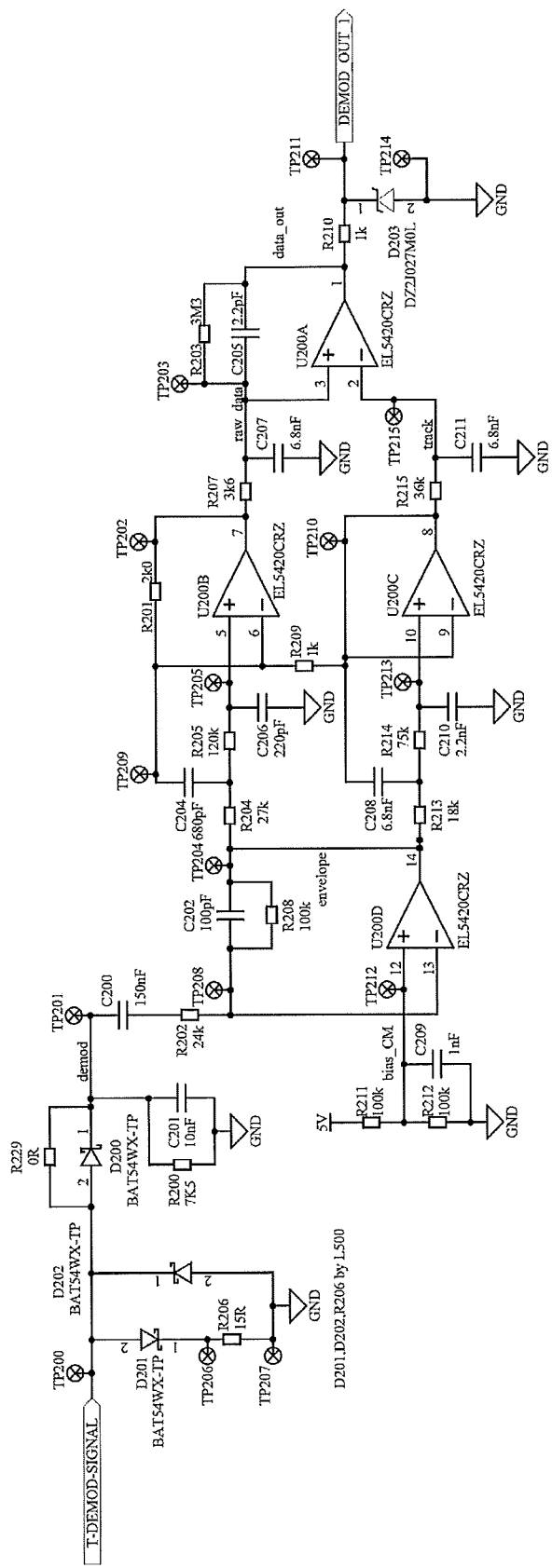
FIG. 11(G) illustrates a schematic view of an exemplary circuit operable to achieve the functions of a communications module of the transmitter.

In FIGS. 11(D) and 11(E), the inputs are: IND which is connected to one of the transmitter coils, +10_V_SW being DC supply 446, +3V3 being DC supply 440, DC being the select switch signal from the microprocessor, SNUB and D_SNUB which are both connected to a snubber circuit used to ensure that the switch voltage rating is within the limit on all conditions, and the depicted circuits provide a coil switch used to selectively turn-on the transmitter coils depending on the location of receiver with the maximum current flowing on the switch being about 2 A.

In FIG. 11(F), the inputs are: +3V3 supply 440, and 3V3_CONT which is from the microprocessor and used to enable/disable the object detection circuit, the output is:

LOOP_COMP+ which is a square wave with a frequency proportional to the oscillator frequency, and the depicted circuit provides a metal detector with frequency set at about 1 MHz where the oscillator frequency changes when a metallic object is placed on the pad surface which is detected by the microprocessor.

In FIG. 11(G), the inputs are: +5V which is the DC supply 448, and T-Demod-Signal which is the AC signal proportional to the inverter current, the output is: Demod_Out_1 which the microprocessor uses to communicate with the receiver, and the depicted circuit provides detection of the current modulation on the version B transmitter.

Figure 11H:
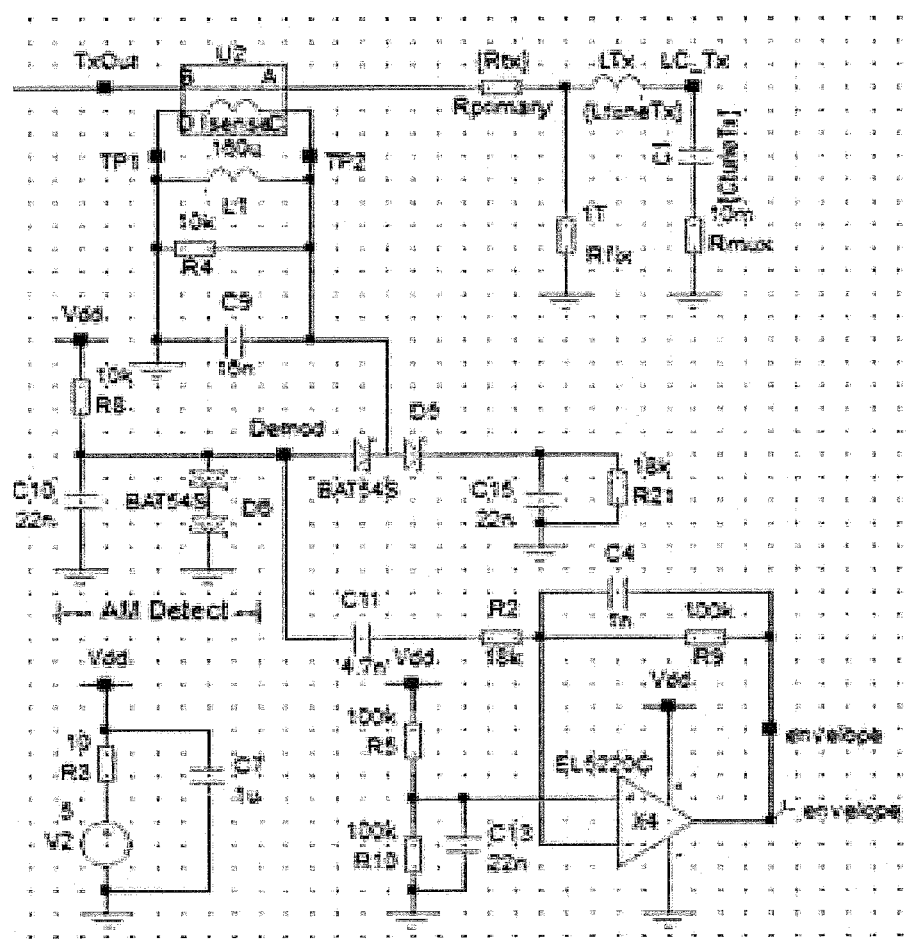
FIG. 11(H) illustrates a schematic view of an exemplary circuit for improving the functions of the communications module of the transmitter.

The Applicant has found that due to certain interactions between the transmitter and receiver resonant circuits some modulation slope reversal may occur. This is because the combined current as sensed in the demodulation circuit is a product of the transmitter's outgoing current (which resonates at a first frequency) with the incoming current from the receiver (which is at a second, different frequency). This causes distortion in the modulation signal, therefore disrupting communications. A possible solution is to employ a directional coupler which eliminates the outward transmitter current so the inward modulated current from the receiver can be sensed without distortion by separating forward and reverse currents. However, the inclusion of such a directional coupler in consumer electronics may be undesirable due to the inclusion of transformer, which increases cost and complexity. An alternative solution is to employ an amplitude phase detector 1102 at the input stage of the demodulation circuit of FIG. 11(G), as is illustrated in FIG. 11(H). In such an amplitude phase detector the two arms of input transformer 1104 are tuned so that a signal being coupled from the right-hand side of the drawing (from the transmitter coils) is tuned by capacitor 1106 and a signal being coupled from the left-hand side of the drawing (from the inverter) is tuned by inductor 1108. In this way, the forward and reverse currents are differentiated from each other according to frequency. By selecting the appropriate end of the transmitter's current sensing coil, it is possible to resonate that coil at the appropriate frequency (e.g., about 100 kHz) to optimize the level of the amplitude modulated signal from the receiver's pickup coil.

Figure 12A:
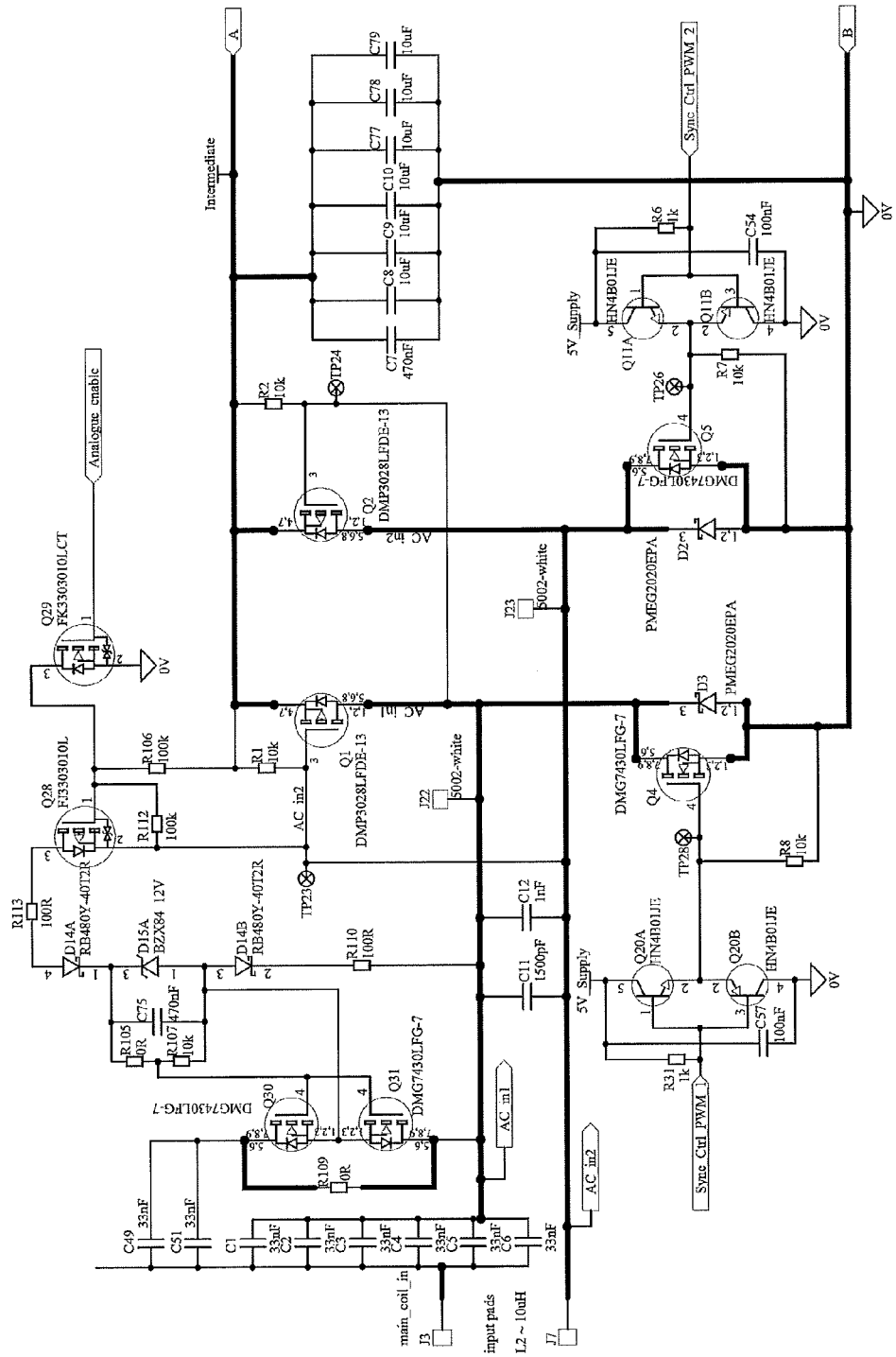
FIGS. 12(A) and (B) illustrate a schematic view of an exemplary circuit connected over points A and B operable to achieve the functions of a rectifier of the receiver.
Figure 12B:
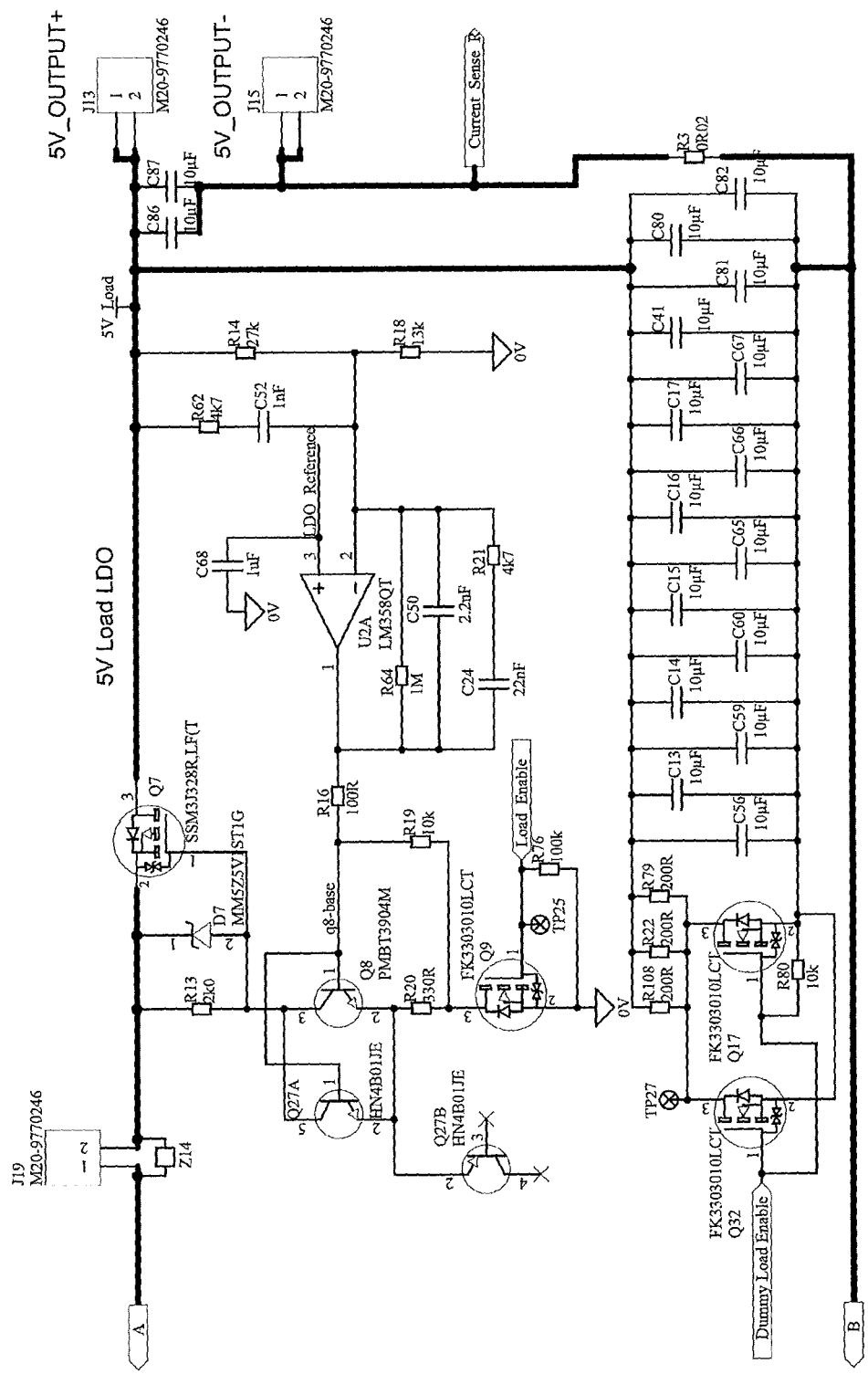
FIG. 12(C) illustrates a schematic view of an exemplary circuit operable to achieve the functions of a microprocessor of the transmitter.
FIG. 12(D) illustrates a schematic view of an exemplary circuit operable to achieve the functions of a communications module of the receiver.
FIG. 12(E) illustrates a schematic view of an exemplary circuit operable to achieve the functions of a current sensing circuit of the receiver.
Figure 12C:
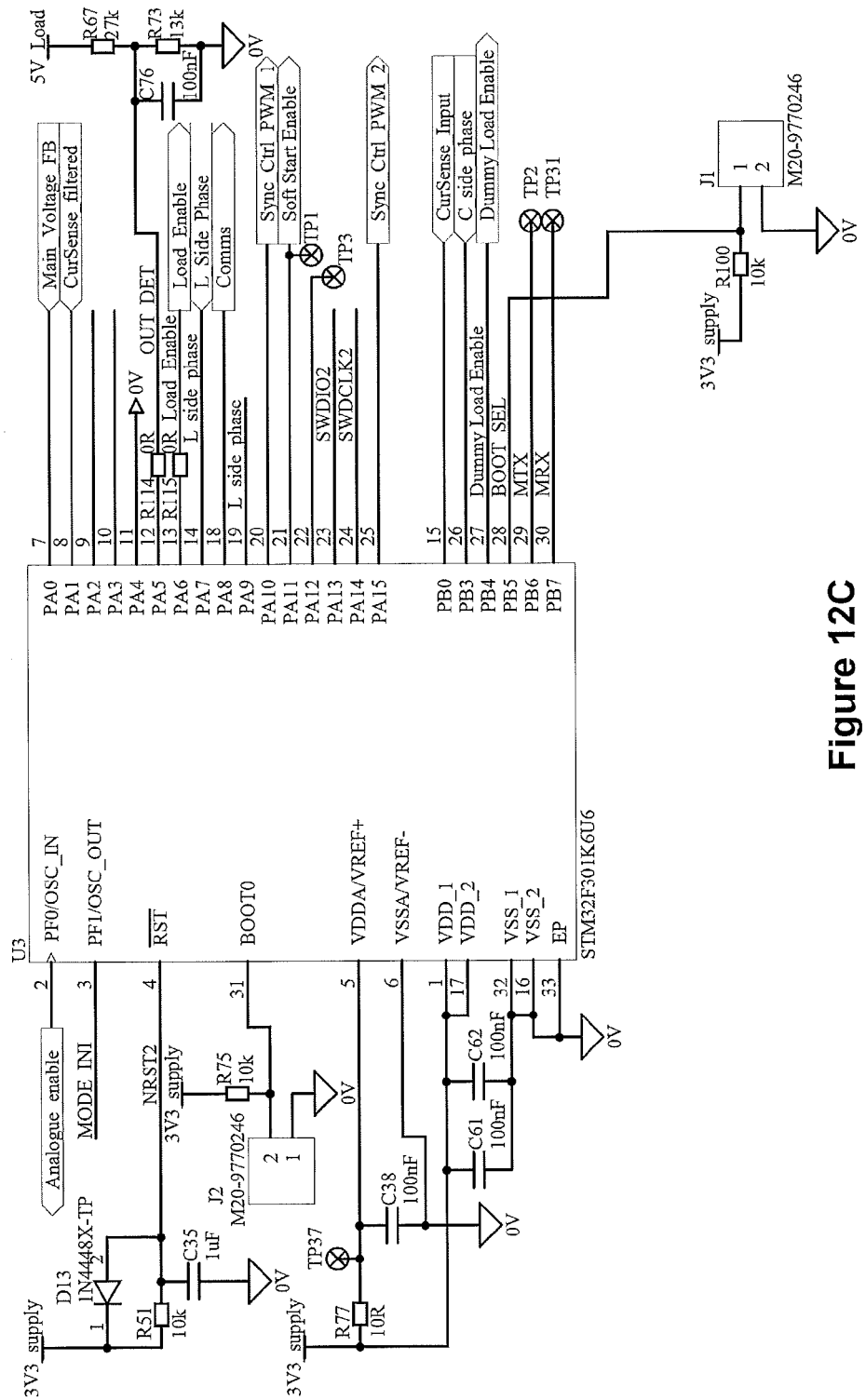

With respect to the receiver 1004, the power rectifier 1018 is configured as a full bridge rectifier which converts AC voltage into DC voltage, and has four MOSFETs in synchronous configuration, that is, two P-channel MOSFETs on the high side and two N-channel MOSFETs on the low side (see FIGS. 12(A) and 12(B)) which are switched under control of the microprocessor of the controller 1010 (see FIG. 12(C)). In particular, the synchronous rectifier control is common for both the version A and version B modes. The P-channel MOSFETs at the high side will be self-driven by AC signals while the N-channel MOSFETs at the low side will be controlled by the gate signals generated by the microprocessor. The synchronous rectifier will be enabled if the output current is more than 700 mA (digital gate signals will be created to turn the N-channel MOSFETs on and off). If the load 1016 is less than 500 mA, the synchronous rectifier will be disabled and the body diodes of the N-channel MOSFETs will be used to conduct the current. It can be understood by those skilled in the art from FIGS. 12(A) and (12(B), that the synchronous rectifier can be operated as either a full synchronous rectifier or a half synchronous rectifier. The circuitry of the LDO 1020 is also illustrated in FIG. 12(B) and is disabled by setting the Load_Enable output of the microprocessor signal to low, which disconnects the load 1016 as well, and is enabled by setting the Load_Enable signal to high. The modulation circuit of the communications module 1014 has two capacitors and two switches and the communications packets/signals are provided by modulating the capacitive load of the capacitors on the AC side of the receiver 1004 (see FIG. 12(D)). The current sensing circuit has a resistor in series with the load and an amplifier (see FIG. 12(E)) to determine the output current and the microprocessor uses this information to request the transmitter to establish an optimal operating point, determine the received power from the transmitter, determine whether the synchronous rectifier needs to be enabled, and at low (light) load, enable the half synchronous rectifier.

In FIGS. 12(A) and 12(B), the inputs to the rectifier 1018 are: AC_in½ (from the modulation circuit of FIG. 12(D)) for allowing Q1 and Q2 to self-switch; Sync_Ctrl_PWM_½; and 5V_Supply from a +5V supply switch circuit taking 5V_Load and Analogue_enable as inputs and used to disable/enable the analogue circuitry of the received power management circuitry 1006 by controlling the supply voltages of the circuits (not illustrated as configuration is understood by those skilled in the art), the inputs to the LDO 1020 are: the Intermediate Voltage; and Load_Enable and Dummy_Load_Enable from the microprocessor of FIG. 12(C)), the output of the rectifier is: the Intermediate Voltage, the outputs of the LDO are: 5V_Load and Current_Sense_R; and in the depicted circuit of the rectifier D2-D3 provide diode commutated half-rectification, but can switch Q4-Q5 synchronously by the microprocessor.

In FIG. 12(C), the inputs are: 3V3_supply from a +3.3VLDO circuit taking Soft_Start_Enable as an input and used to supply power to the microprocessor (not illustrated as configuration is understood by those skilled in the art); the Intermediate Voltage; AC_in½ (from the modulation circuit of FIG. 12(D)); and CurSense_Input and CurSense_filtered (from the current sensing circuit of FIG. 12(E)), and the outputs are: Comms (used to drive the FETs that switch the capacitors in the modulation circuit of the communications module 1014); Load_Enable (for controlling on and off states of the LDO 1020); Sync_Ctrl_PWM_½; Soft_Start_Enable (used to avoid overshoot); Dummy_Load_Enable; and Analogue_enable.

Figure 12D:
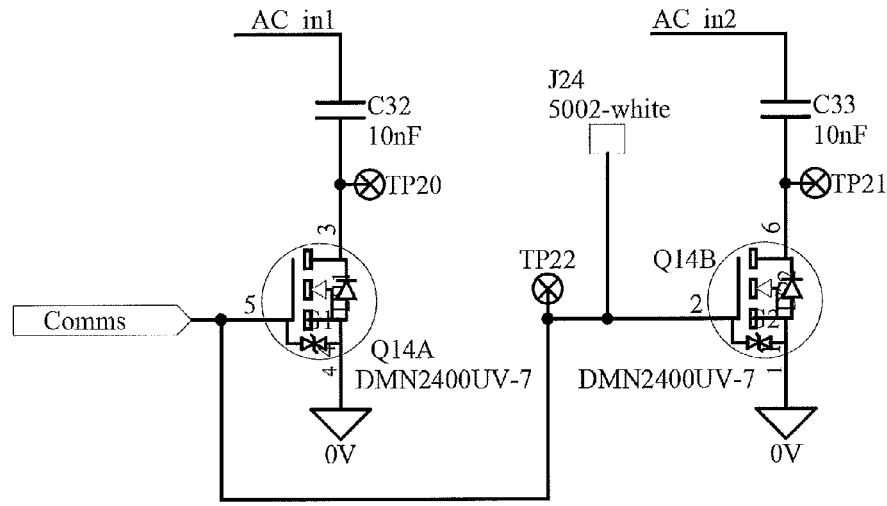

In FIG. 12(D), the input is: Comms, the output is: AC_in½, and in the depicted circuit the 4.7 nF capacitor is switched onto the outputs to modulate the amplitude of the voltage of the receiver coils thereby providing the signaling states in version A mode.

Figure 12E:
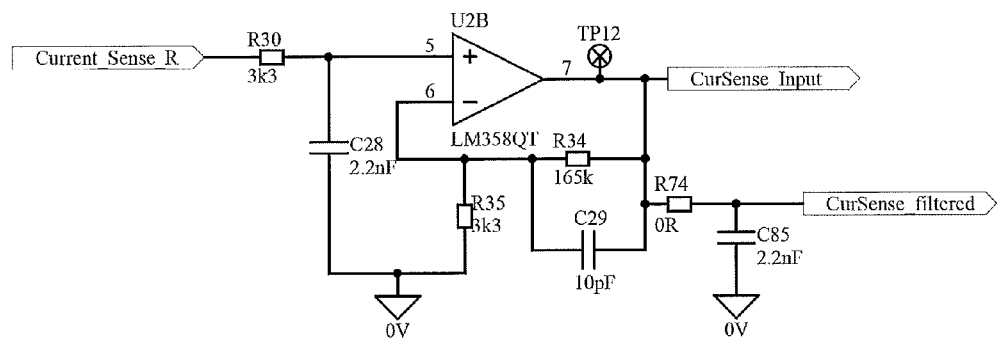

In FIG. 12(E), the inputs are: 3V3_Supply; 5V_Supply; and Current_Sense_R, and the outputs are: CurSense_Input (input to a comparator of the microprocessor for fast output current transition detection used to turn-off the control for the synchronous rectifier) and CurSense_filtered (being the amplified output current which the microprocessor takes as an analogue input for output power monitoring used during version A and version B modes).

Figure 13A:
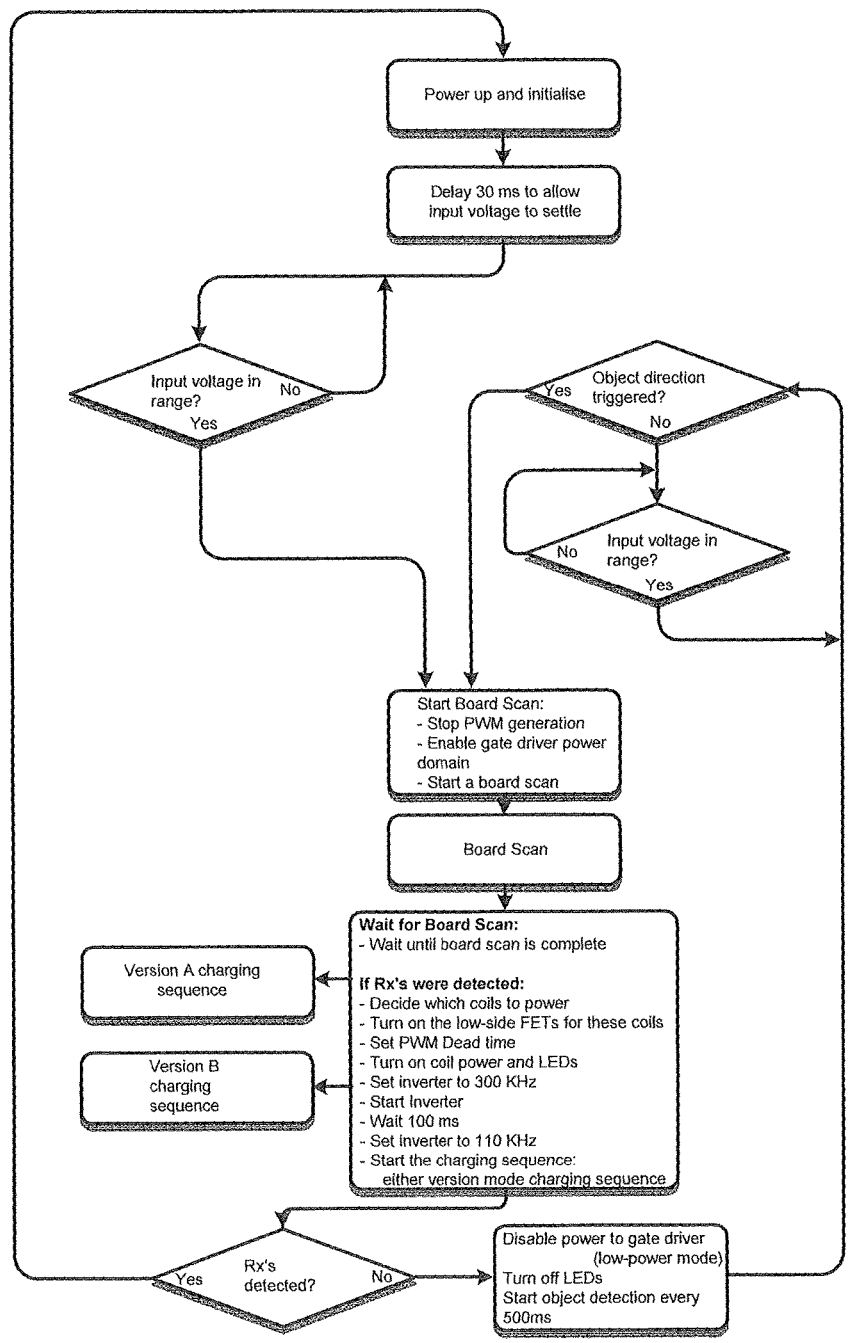
FIGS. 13(A)-(C) are flow diagrams of a control sequence conducted by the transmitter.
Figure 13B:
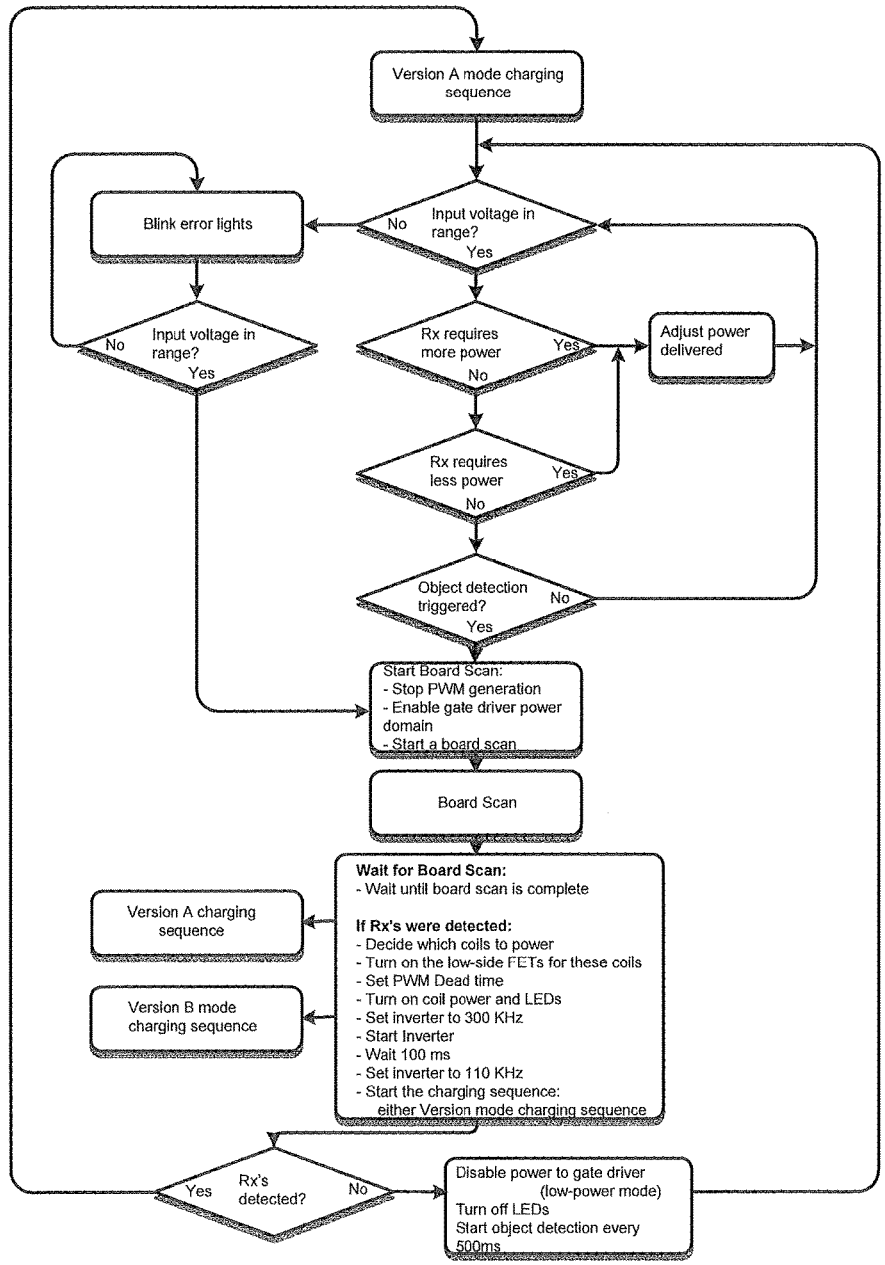
Figure 13C:
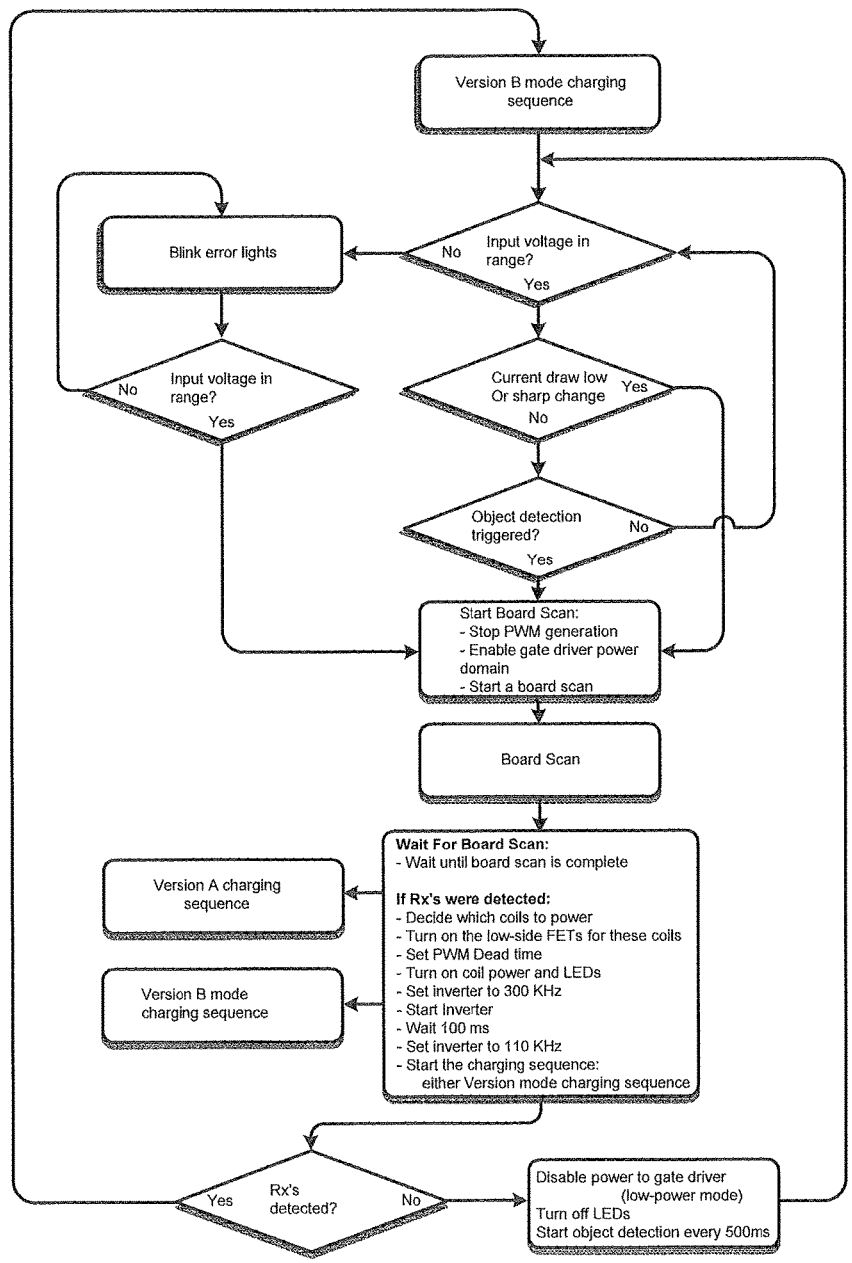
Figure 14A:
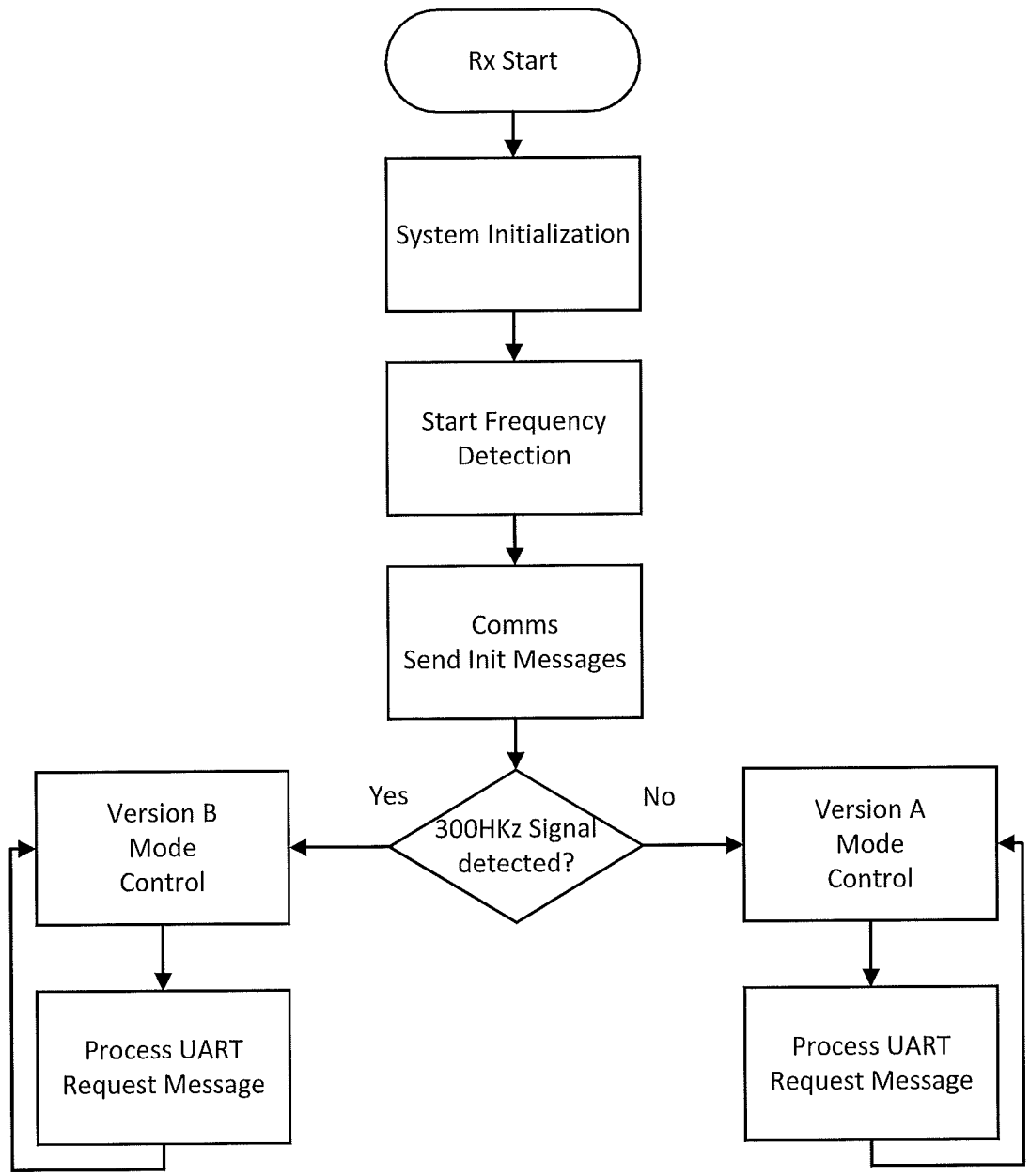
FIGS. 14(A)-(C) are flow diagrams of a control sequence conducted by the receiver.
Figure 14B:
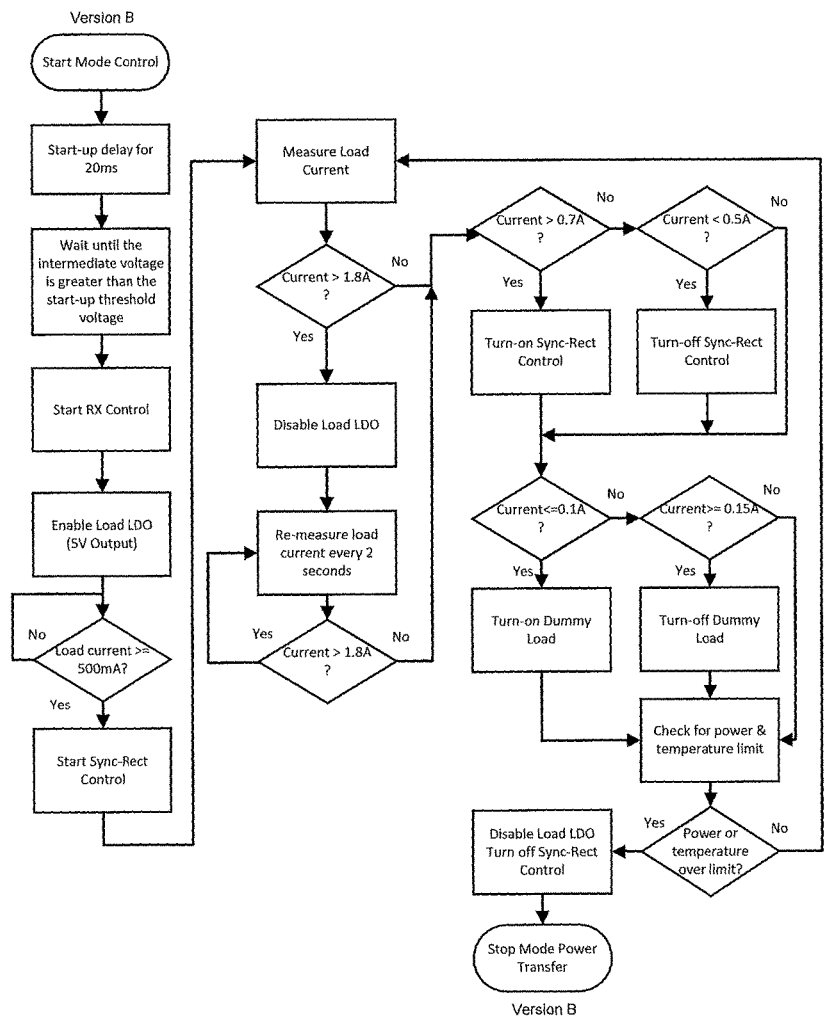
Figure 14C:
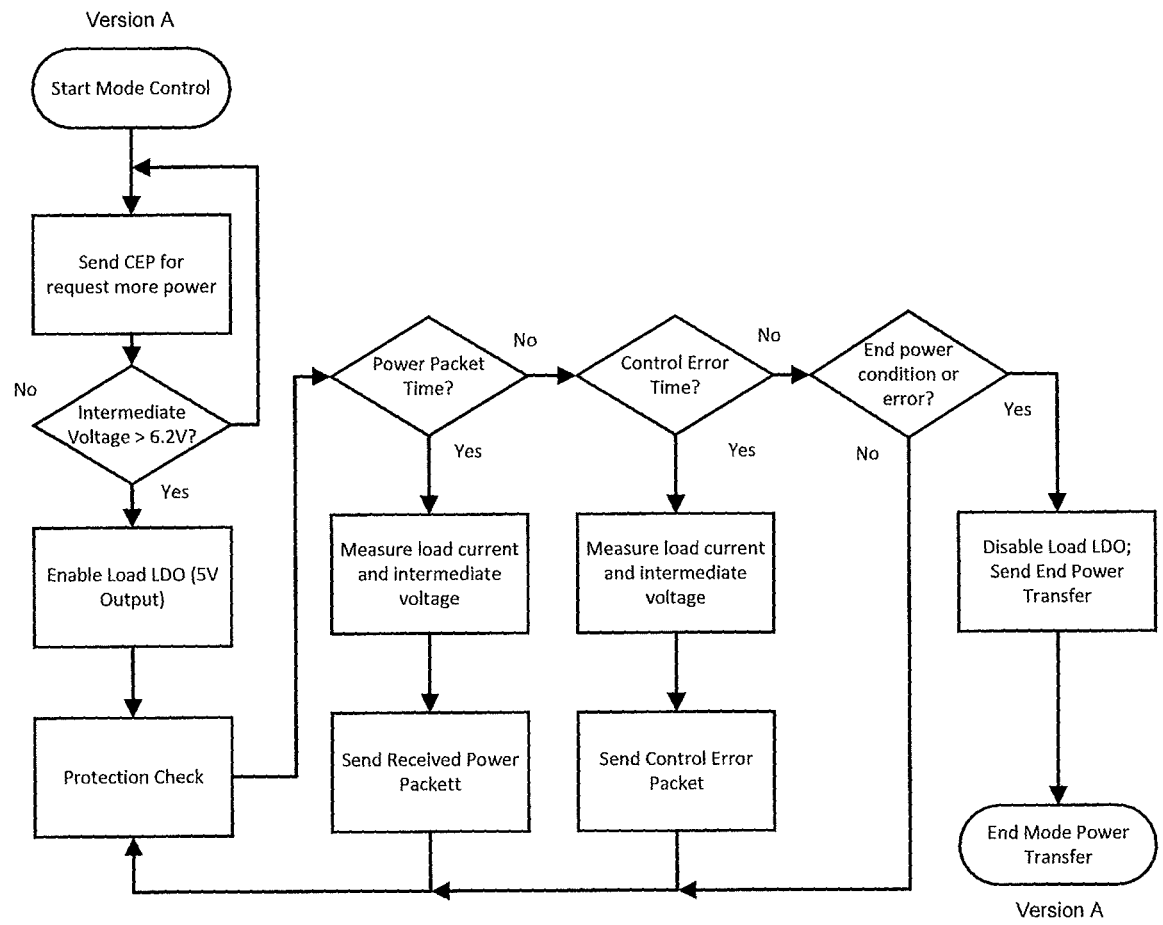

FIG. 13(A) to FIG. 13(C) are flow diagrams of the control flow implemented by the controller of the power transmitter and FIG. 14(A) to FIG. 14(C) are flow diagrams of the control flow implemented by the controller of the power receiver of the present invention, that is, version B transmitters and receivers, as discussed earlier.

Figure 15A:
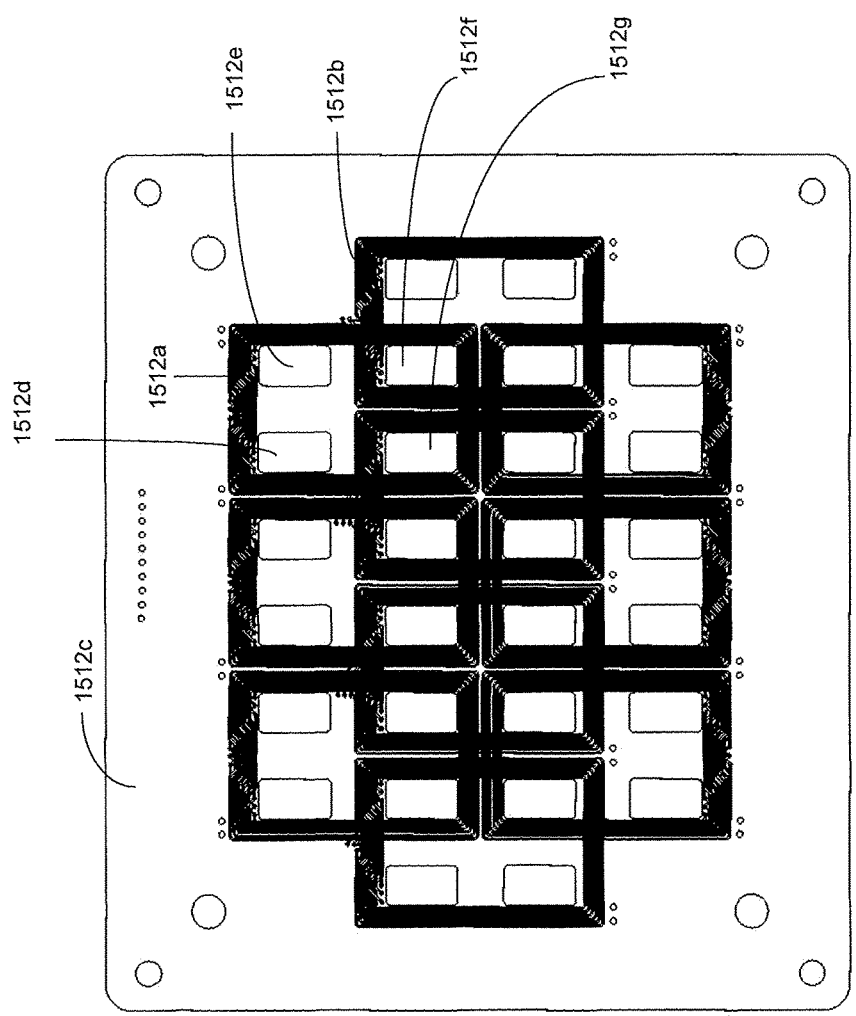
FIGS. 15(A)-(C) illustrate an exemplary transmitter coil array.
Figure 15B:
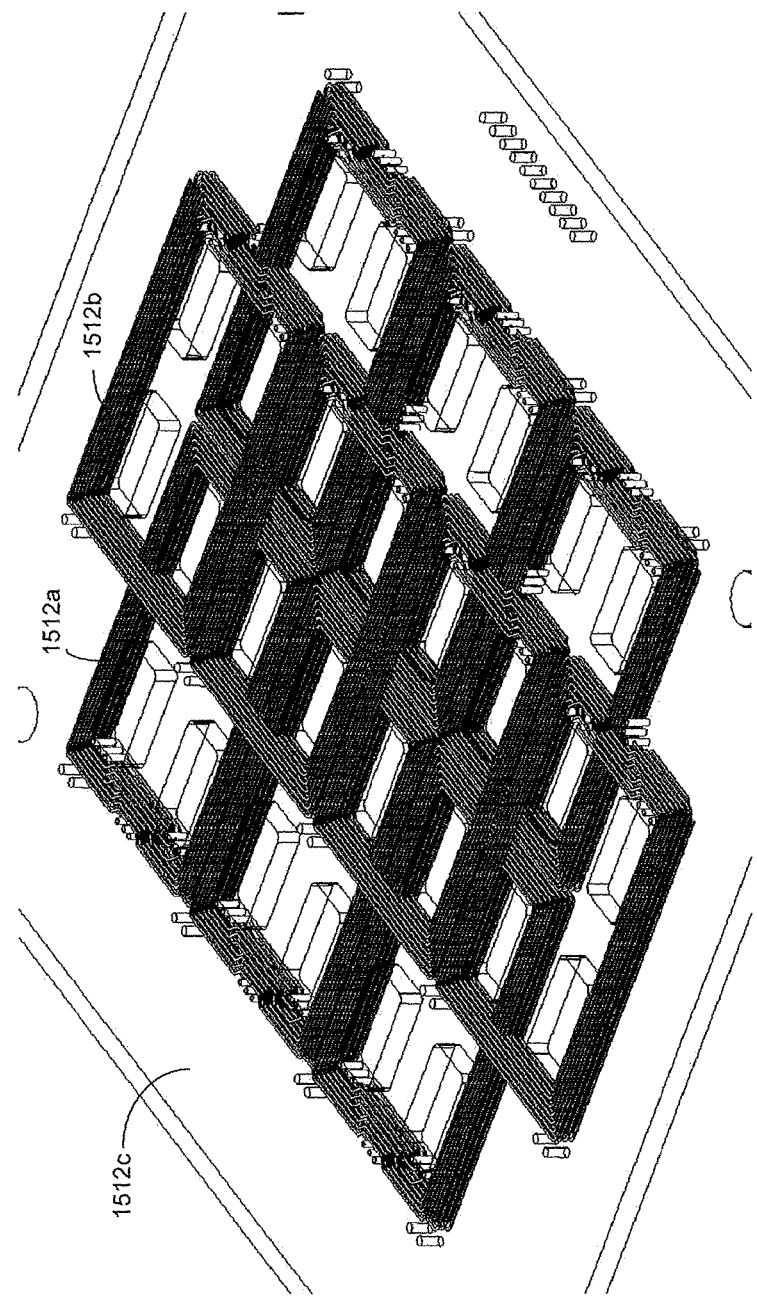
Figure 15C:
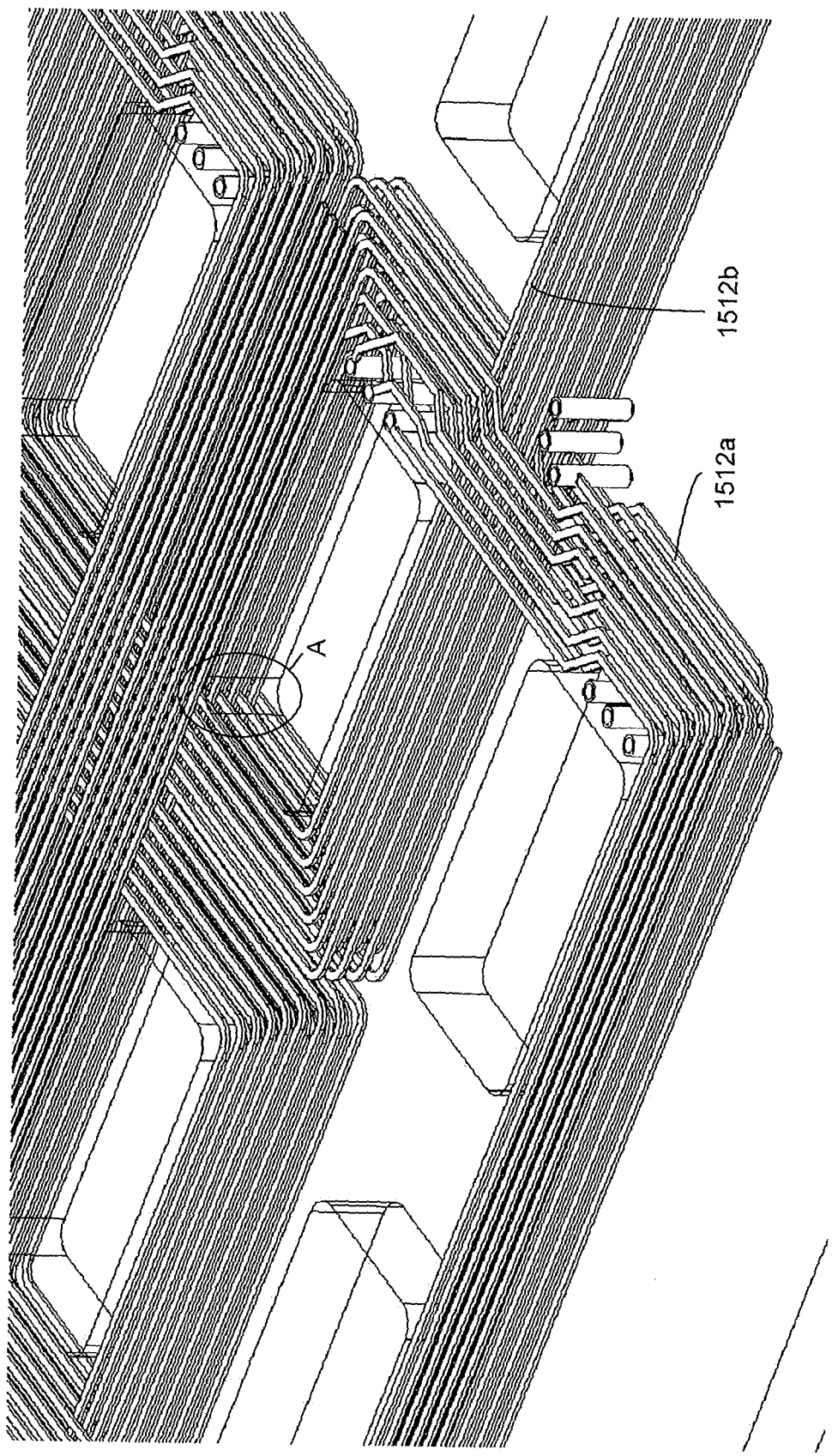

The transmitter coil array and operation according to various exemplary embodiments of the present invention are now described. As described earlier, the transmitter has an array of transmitter coils for providing spatial freedom and multiple receiver device powering/charging. One way of providing such functionality is to provide a repeated pattern of transmitter coils in multiple-layered or multiple-planar arrays with each coil being generally co-planar with the other coils of that layer. One possible embodiment of a two layered array with an interlayer offset or overlap of transmitter coils is illustrated in FIGS. 15(A)-(C). Such a configuration provides benefits such as improved uniformity in the coupling magnetic field. In the illustrated exemplary embodiment the transmitter coils are provided as two dimensional planar coil shapes of electrically conductive material fabricated using PCB techniques over plural PCB 'layers'. In this embodiment, the transmitter coils are depicted as being generally square in shape; this is merely exemplary and other two dimensional shapes are possible such as circular, triangular, rectangular, and other polygonal shapes, where such shapes are conducive to the array configuration. For example, providing the coils with an octagonal shape may allow the coils to be more closely spaced, which may further enhance the uniformity of the IPT field.

As illustrated in FIGS. 15(A)-(C), one layer of transmitter coils 1512a are overlayed by a second layer of transmitter coils 1512b within a PCB 1512c. The first layer 1512a has six coils and the second layer 1512b has four coils in the depicted example, however other numbers of coils and combinations over the layers are possible. Each coil 1512a and 1512b has several 'windings' such that an interior space is provided in which no windings are present. That is, the radial center of each transmitter coil is void of electrically conductive material. The overlayed coils define four common openings within each coil—see common openings 1512d to 1512g within coil 1512a. This allows slugs formed of magnetically permeable material to be provided within each common opening as described below. As depicted the centers of the coils are aligned which assists in the creation of a uniform magnetic field when two or more adjacent/overlaying coils are selected for transferring power. As most clearly shown in FIG. 15(C), each PCB coil 1512 is fabricated as four PCB "layers" and these layers are interlayered in the first and second layers as shown in the circled area marked A. This interlayering further assists the creation of a uniform magnetic field. The first and second layers may be 'stacked' rather than 'interlayered' however, that is, all PCB layers of the second layer being stacked over all PCB layers of the first layer. Whilst two layers are depicted, more than two layers are possible depending on the IPT field and transmitter coil array requirements of the particular application.

Figure 15D:
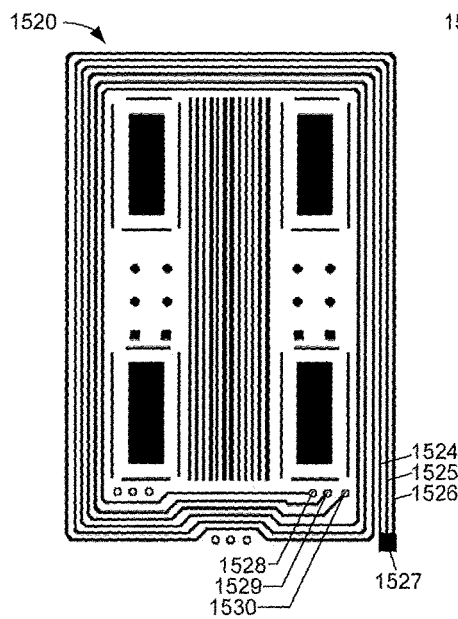
FIGS. 15D to 15G illustrate an exemplary winding pattern that may be employed for a four layer transmitter coil.
Figure 15E:
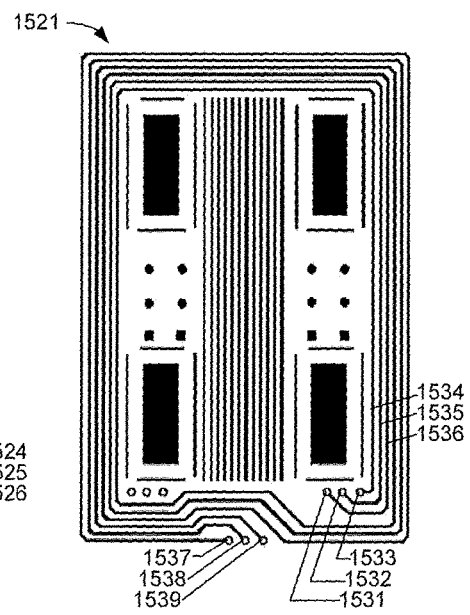
Figure 15F:
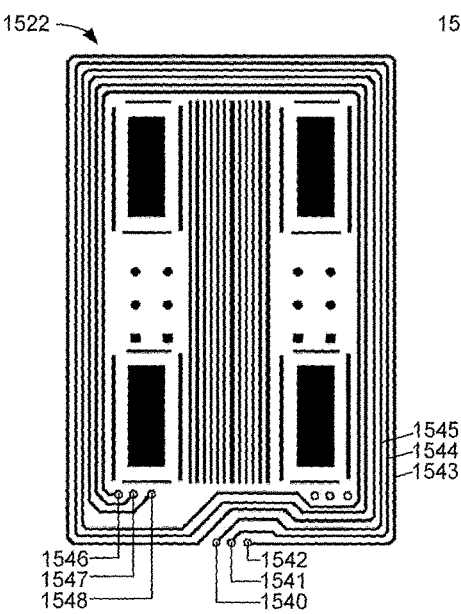
Figure 15G:
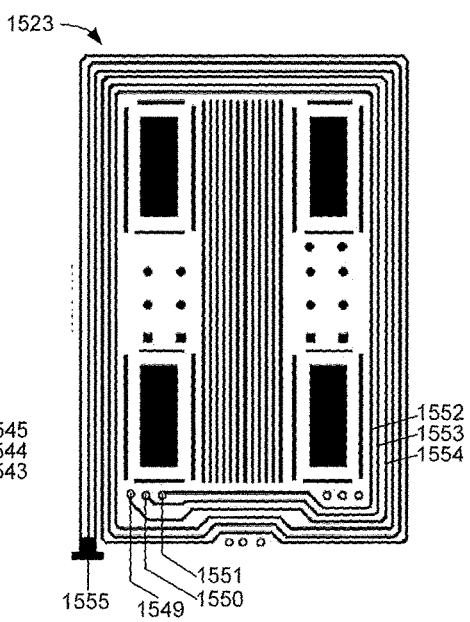

Referring now to FIGS. 15D to 15G a specific winding pattern that may be employed for a four layer transmitter coil 1521a or 1512b (FIG. 15B) will be described. FIG. 15D shows a PCB top layer 1520; FIG. 15E shows a PCB third layer 1521 (The second PCB layer being an interleaved layer of an adjacent overlapping coil); FIG. 15F shows a PCB fifth layer 1522 (The fourth PCB layer being an interleaved layer of an adjacent overlapping coil); and FIG. 15G shows a PCB seventh layer 1523 (The sixth PCB layer being an interleaved layer of an adjacent overlapping coil and the eighth layer being below layer 1523). The PCB layers are vertically stacked above each other and interconnected as will be described below.

Looking firstly at top layer 1520 a first coil terminal 1527 is connected to three parallel windings 1524, 1525 and 1526. Whilst three parallel windings are shown it will be appreciated that the number of parallel windings may be varied depending upon the application. Where only a single winding is used unacceptable losses and heating may result from the "skin effect" where a large current is carried by a small surface area of a winding. By providing parallel windings this effect may be ameliorated.

These parallel windings form two loops and end at terminations 1528, 1529 and 1530. The terminations 1528, 1529 and 1530 are interconnected to terminations 1531, 1532 and 1533 of the third PCB layer 1521 shown in FIG. 15E (i.e. termination 1528 is connected to termination 1531; termination 1529 is connected to termination 1532; and termination 1530 is connected to termination 1533). Terminations 1531, 1532 and 1533 are connected to parallel windings 1534, 1535 and 1536.

It will noted that in the first layer 1520 that parallel winding 1524 is the closest to the centre of the coil and parallel winding 1526 is the most distant from the centre of the coil, whereas in the third PCB layer 1521 winding 1534 (connected to winding 1526) is the closest to the centre of the coil and parallel winding 1536 (connected to parallel winding 1524) is the most distant from the centre of the coil. Thus between layers the innermost parallel winding and outermost parallel winding swap positions between layers.

Likewise for the fifth layer 1522 the terminations 1537, 1538 and 1539 of the third layer 1521 are interconnected to terminations 1540, 1541 and 1542 of the fifth PCB layer 1522 shown in FIG. 15F (i.e. termination 1537 is connected to termination 1540; termination 1538 is connected to termination 1541; and termination 1539 is connected to termination 1542). Terminations 1540, 1541 and 1542 are connected to parallel windings 1545, 1544 and 1543.

Likewise for the seventh layer 1523 the terminations 1546, 1547 and 1548 of the fifth layer 1522 are interconnected to terminations 1549, 1550 and 1551 of the seventh PCB layer 1523 shown in FIG. 15G (i.e. termination 1546 is connected to termination 1549; termination 1547 is connected to termination 1550; and termination 1548 is connected to termination 1551). Terminations 1549, 1550 and 1551 are connected to parallel windings 1552, 1553 and 1554 which are commonly connected to second coil termination 1555. The coil may be driven by applying an alternating drive signal to first coil termination 1527 and second coil termination 1555.

It will noted that between layers the parallel winding that is the closest to the centre of the coil and parallel winding that is the most distant from the centre of the coil alternate. This ensures that no single one of the parallel windings is exposed to the greatest induced currents experienced closest to the centre of the coil. This helps to avoid coil burn out. Further the parallel windings reduce the applied current per parallel winding and reduce the coil resistance.

Figure 15H:
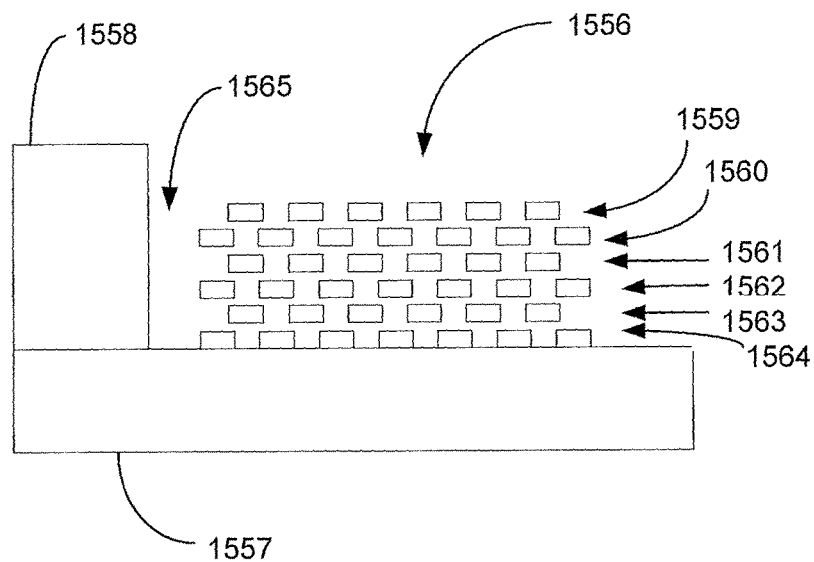
FIGS. 15H and 15J illustrate exemplary transmitter coil arrangements.

FIG. 15H shows a cross-sectional view through one side of a single transmitter coil 1556 located on a magnetically permeable base 1557 with the coil 1556 surrounding magnetically permeable slug 1558. In this case a single coil is shown although it will be appreciated that the design may be applied to the interleaved coil design described above. The transmitter coil 1556 is formed as six PCB layers 1559 to 1564 with only the conductors shown for clarity. The windings of layers 1559 to 1564 may be offset between layers to improve current distribution. The conductors of each layer are copper conductors of a width of greater than 0.25 mm, a thickness of 0.14 mm and a spacing of greater than 0.2 mm. As in the previous embodiment parallel windings are employed, preferably three parallel windings. The parallel windings may be distributed between winding layers—for example the first three parallel windings may include conductors from both layer 1559 and 1560. Preferably each set of parallel windings are distributed between two layers. The slug 1558 extends sufficiently above coil 1556 to substantially reduce induced currents in the coil windings. The slug 1558 may project about the height of the winding above the winding. In one preferred embodiment the slug extends about or greater than 1 mm above the height of the winding.

An air gap 1565 is provided between transmitter coil 1556 and slug 1558 to reduce induced currents in the windings of transmitter coil 1556.

Figure 15J:
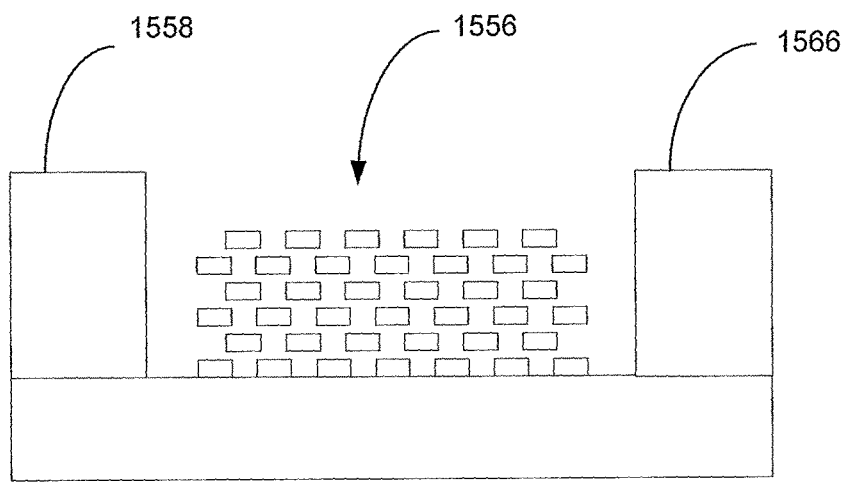

FIG. 15J shows a variant of FIG. 15H in which a slug 1566 is provided on the outside of transmitter coil 1556 as well as slug 1558 on the inside. This configuration further reduces induced currents in the transmitter coil 1556 and in fact results in lower losses for a loaded than an unloaded coil due to the field shaping effect of the receiving coil. However, due to the added cost and complexity of the additional element this design may only be justified in more demanding applications.

It will be appreciated that the design features of FIGS. 15H and 15J may be applied to the transmitter coil array of FIGS. 15A to 15G with suitable adaption.

Figure 16:
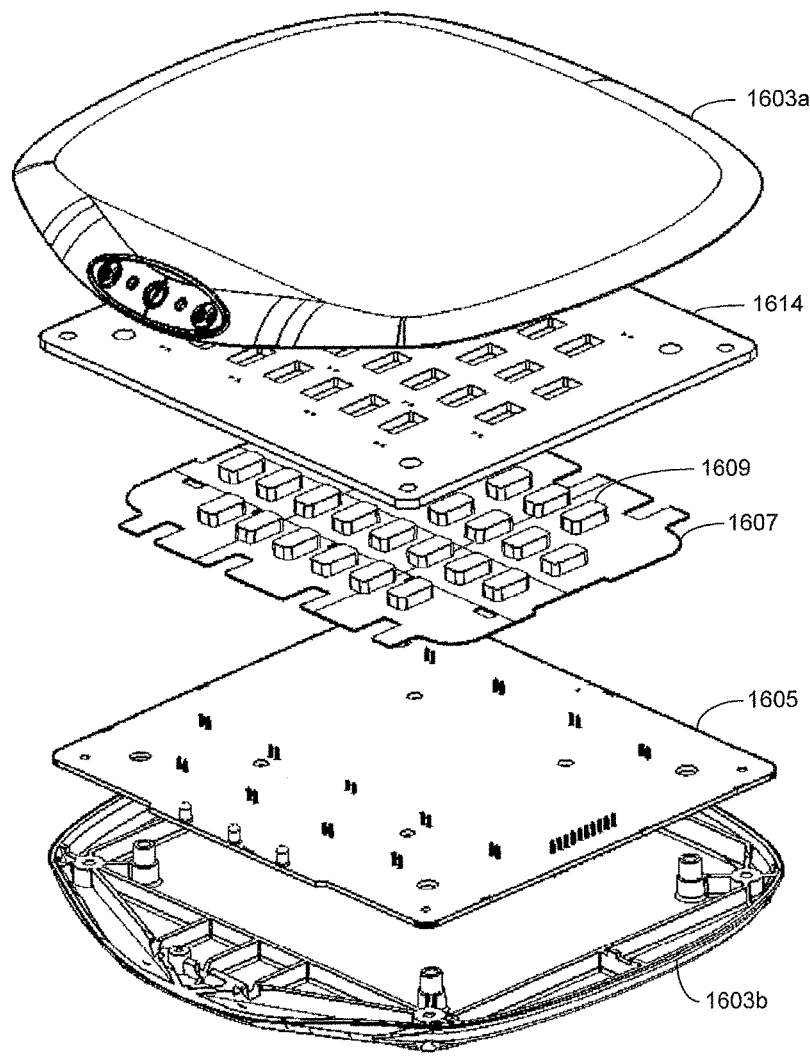
FIG. 16 is an exploded view of an exemplary transmitter.
Figure 17:
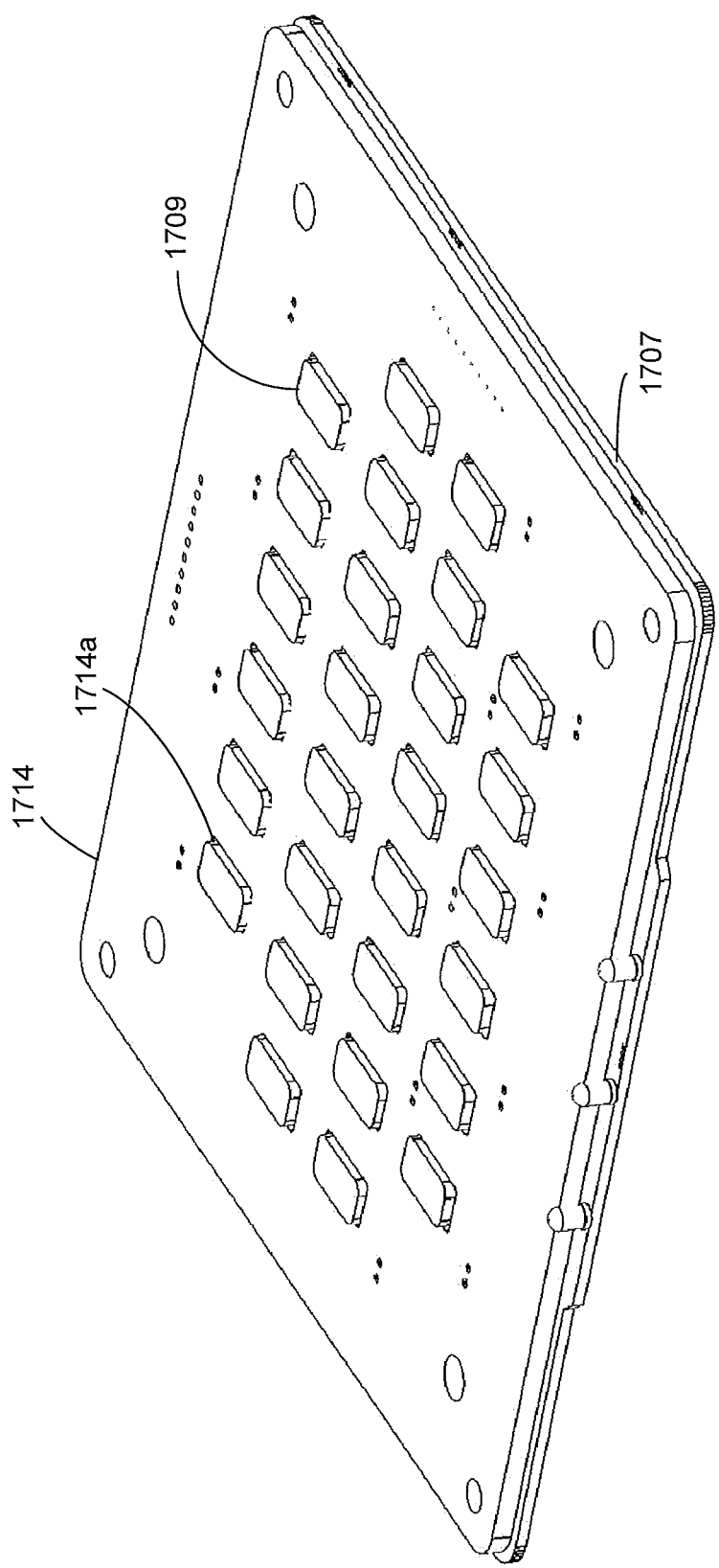
FIG. 17 illustrates isolated components of the transmitter of FIG. 16.
Figure 18:
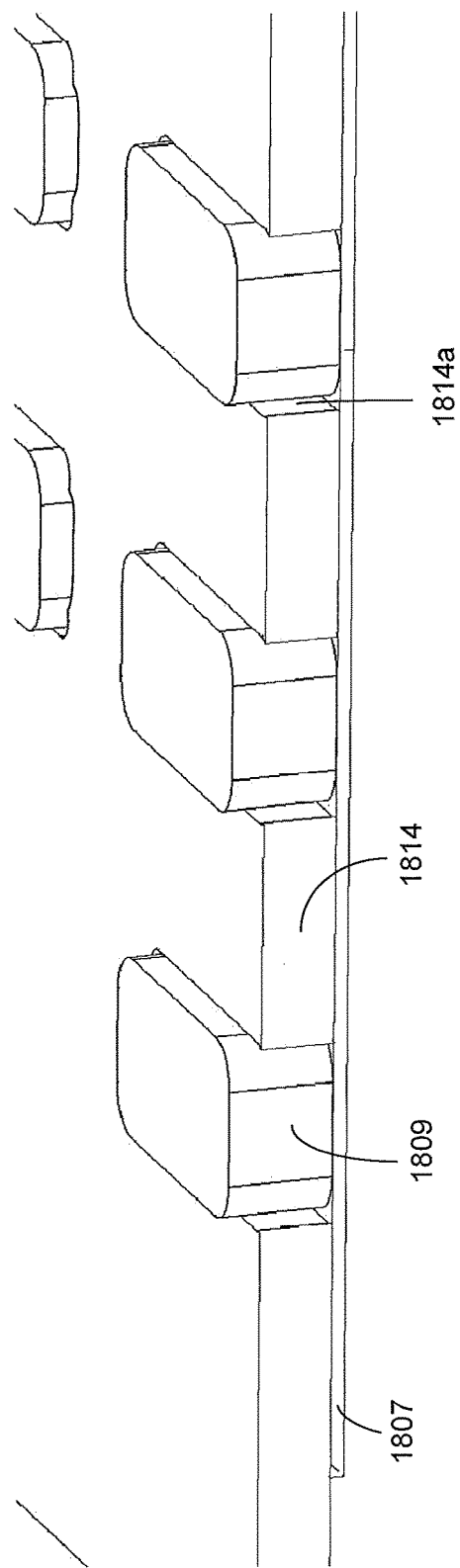
FIG. 18 is a cross-sectional view of the depiction in FIG. 17.

FIG. 16 illustrates a PCB coil array 1614 in an exploded form a transmitter 1602 applicable to the present embodiment. The transmitter 1602 has a top casing 1603a and a bottom casing 1603b, a main PCB circuitry board 1605 which carries the driving circuitry, object detector and communications module and other circuitry of the transmitter. The PCB coil array 1614 is positioned on a magnetic material layer 1607. The material layer 1607 is formed of a material which enhances the magnetic field induced in the transmitter coil array, such as ferromagnetic or ferrite material. As illustrated the material layer 1607 has protrusions 1609 for further enhancing the magnetic field which are either integral with the magnetic material layer or mounted (positionally or adhesively) thereto. This is more clearly seen in FIG. 17 in which a PCB coil array 1714 is shown mounted on a material layer 1707 in isolation. As can be seen the PCB coil array 1714 has through-holes 1714a through which protrusions 1709 of the material layer 1707 protrude such that each transmitter coil has at least one protrusion 1709 within the interior thereof. FIG. 18 shows this in even more detail in cross-section, where like references numerals are used for like elements of FIG. 17. Each protrusion or slug 1809 may project about the height of each winding 1814 above the top of each winding 1814. Preferably each slug 1809 projects about or more than 1 mm above the top of each winding 1814.

Figure 19:
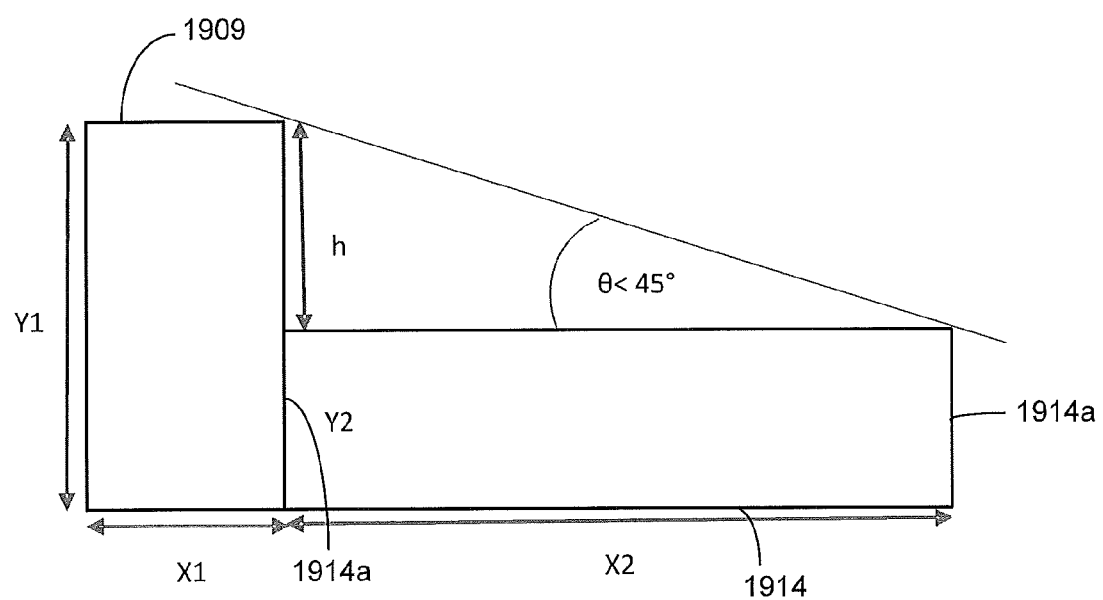
FIG. 19 illustrates a relationship between a ferromagnetic protrusion and a PCB transmitter coil layer.

As can be seen the protrusion or slugs of the ferrite material layer project above the PCB coil array layer. The Applicant has found that this provides further benefit to the influence on the magnetic field. FIG. 19 illustrates a protrusion 1909 projecting above a segment of a PCB coil layer 1914 by height h which is determined to be such that the angle theta is less than 45 degrees from the edge of the next hole 1914a in the PCB coil layer 1914. It is understood that instead of being provided as protrusions of a magnetic material layer, the 'slugs' of magnetic material may be provided as independent elements with or without the magnetic material layer omitted, and may be provided as part of the transmitter coil array fabrication, e.g., as part of the PCB or other substrate used for positioning the coils. Further, in the illustrated examples each coil surrounds four magnetic material elements where these elements are at the internal corners of the rectangular shaped coils, this configuration assists the multi-layering of the coil arrays whilst maximizing the amount of magnetic material within the 'cavity' of each coil thereby optimizing the beneficial influence. It is understood that other arrangements of the coils and magnetic material elements are possible with less, more or differently shaped elements. Further, the magnetic material elements need not project above the top layer of transmitter coil array if the application is better suited for this, e.g., the elements and coil array could be co-planar.

The beneficial influence or enhancement of the transmitter magnetic or IPT field includes the shaping of the field to provide uniform or increased IPT coverage at reasonable power transfer levels, such as increased height of the IPT field (so-called "z-height" with respect to the Cartesian geometry of the transmitter pad). The Applicant has found that increased z-height can also, or additionally, be provided by increasing the number of adjacent transmitter coils that are powered simultaneously. Accordingly, a combination of these mechanisms, e.g., mechanical and control, can be used to increase the effective wireless power transfer range of the power transmitter. Shaping the field in this manner may also reduce induced currents in the coil windings and/or improve current distribution in the coil windings. With ferrite cores extending to a height at or below the surface of the coils induced currents may be experienced at the inner and/or outer windings of the coils; whereas the current distribution may be more even when a magnetic core extending above the surface is used and/or reduce induced currents. Alternatively, or in combination, extending the ferrite core to the outer edge of the coil and/or extending it to a portion of the receiver may further improve the coil current distribution and/or reduce induced currents.

The illustrated embodiment of the transmitter coil array shows PCB coils. This is however only an exemplary manner of configuring and manufacturing the IPT coil array. The coils may be wound coils, either by hand or machine or may be fabricated in some other manner such as stamping, printing, etc., as explained earlier. The relative positioning and functioning of the coils within the array is the factor of importance in providing an IPT field that provides effective, reliable and efficient wireless power transfer.

The afore-described wireless power transfer system may be provided as an end-user consumer electronics system, either in combination, e.g., transmitter and one or more receivers provided as a 'package' or 'set', or separately, e.g., transmitter is provided as a separately obtainable and operable unit from the receiver(s), based on the multi-model or compatible configuration. Alternatively, the wireless power transfer system may be provided as a kit for evaluation or educational purposes of original design manufacturers (ODMs) or original equipment manufacturers (OEMs) which manufacturer consumer electronics so that various configurations or capabilities can be tested and/or integration or incorporation of wireless power into their products can be assessed. Such a kit may comprise the components, modules, instructions and learning materials necessary for wireless power transfer and the configuration and adjustment of the system for the design, modification, adaption, testing, evaluation, or building of wireless power transfer systems for different applications, e.g., power levels, field coverage, etc.

Such a wireless power transfer kit may comprise a wireless power transmitter and multiple wireless power receiver devices, having the configurations and features as described herein and illustrated in the attached drawings. The kit may include instructions for arranging, configuring, optimizing, adapting, and the like, the kit components for wireless power transfer. The instructions may teach how to adapt, use, build, or evaluate components of the system. The electrical components of the wireless power transfer kit may have a plurality of electrical contacts to enable measurement of operating parameters, using measurement equipment such as an oscilloscope, a multimeter, a power meter, a current meter, a voltage meter, a probe, and the like.

Whilst the present invention has been illustrated by the description of the embodiments thereof, and while the embodiments have been described in detail, it is not the intention to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the general inventive concept.

The invention claimed is:

1. A system for power transfer comprising:
a wireless power transmitter having a plurality of transmitter coils and a controller coupled to the plurality of transmitter coils; and
a plurality of wireless power receivers,
wherein the controller is configured to:
determine receiver characteristics of the plurality of wireless power receivers; and
energise one or more of the plurality of transmitter coils based on the determined receiver characteristics to provide wireless power to the plurality of wireless power receivers.

2. The system of claim 1 wherein the controller is configured to:
determine a mode of power transfer based on the determined receiver characteristics and a determined receiver identification information; and
energise the one or more of the plurality of transmitter coils based on the determined mode, the determined receiver characteristics and the determined receiver identification information to provide wireless power to the plurality of wireless power receivers,
wherein in a first mode the controller is configured to respond to a power flow control communication from one or more of the plurality of wireless power receivers to control power flow by adjusting an amount of power being transmitted, and in a second mode the controller is configured to adjust the amount of power being transmitted to a selected value.

3. The system of claim 2, wherein the receiver characteristics of one or more of the plurality of wireless power receivers comprise a Version Code and the wireless power transmitter is configured to operate in the first or second mode dependent on the respective Version Code(s).

4. The system of claim 2 wherein the controller is configured to transfer power to two or more of the plurality of wireless power receivers simultaneously in the second mode.

5. The system of claim 1, wherein the controller is configured to:
determine the receiver characteristics based on modulation of a wireless power signal received using one or more of the plurality of transmitter coils; and
determine a number of transmitter coils to power a respective wireless power receiver based on the determined receiver characteristics.

6. A wireless power transmitter comprising:
a plurality of transmitter coils; and
a controller coupled to the plurality of transmitter coils, wherein the controller is configured to:
determine receiver characteristics of a plurality of wireless power receivers placed on a surface of the wireless power transmitter, and
energise one or more of the plurality of transmitter coils based on the determined receiver characteristics to provide wireless power to the plurality of wireless power receivers.

7. The wireless power transmitter of claim 6, wherein the controller is configured to determine receiver identification information of the plurality of wireless power receivers, and is configured to energise one or more of the plurality of transmitter coils based on the determined receiver characteristics or the determined receiver identification information.

8. The wireless power transmitter of claim 6, wherein the controller is configured to determine the receiver characteristics based on one or more of the plurality of transmitter coils.

9. The wireless power transmitter of claim 8, wherein the controller is configured to determine the receiver characteristics based on modulation of a wireless power signal received using one or more of the plurality of transmitter coils.

10. The wireless power transmitter of claim 6, wherein the controller is configured to determine the receiver identification information based on one or more of the plurality of transmitter coils.

11. A wireless power receiver comprising:
one or more receiver coils; and
communication circuitry configured to, upon receiving a first wireless power signal using the one or more receiver coils from a wireless power transmitter, transmit a signal to the wireless power transmitter including one or more characteristics of the receiver,
wherein the one or more receiver coils are configured to receive a second wireless power signal after the signal is transmitted to the wireless power transmitter, the second wireless power signal based on the transmitted one or more characteristics of the receiver.

12. The wireless power receiver of claim 11 wherein the receiver characteristics include version information, and wherein the version information is associated with a desired parameter of power transfer to the wireless power receiver.

13. The wireless power receiver of claim 12 wherein the communication circuitry is configured to send the version information in a packet subsequent to a signal strength packet.

14. The wireless power receiver of claim 12 wherein the desired parameter of power transfer includes:
a first mode of operation wherein the wireless power receiver is configured to communicate power flow control commands to the wireless power transmitter to adjust an amount of power being transmitted; and
a second mode of operation wherein the wireless power receiver forgoes communicating power flow control commands to the wireless power transmitter.

15. The wireless power transmitter of claim 10, wherein the controller is configured to determine the receiver identification information based on modulation of a wireless power signal received using one or more of the plurality of transmitter coils.

16. The wireless power transmitter of claim 6, wherein the controller is configured to energise one or more of the plurality of transmitter coils to provide inductive power transfer to the plurality of wireless power receivers.

17. The wireless power transmitter of claim 6, further comprising a plurality of drive circuitries, each drive circuitry coupled to a respective at least one coil of the plurality of transmitter coils.

18. The wireless power transmitter of claim 6, further comprising at least one drive circuitry, the at least one drive circuitry selectively coupled to the plurality of transmitter coils.

19. The wireless power transmitter of claim 7, wherein the controller is configured to:
 determine a mode of power transfer based on the determined receiver characteristics or the determined receiver identification information; and
 energise the one or more of the plurality of transmitter coils based on the determined mode, the determined receiver characteristics and the determined receiver identification information to provide wireless power to the plurality of wireless power receivers, wherein in a first mode the controller is configured to respond to a power flow control communication from one or more of the plurality of wireless power receivers to control power flow by adjusting an amount of power being transmitted, and in a second mode the controller is configured to adjust the amount of power being transmitted to a selected value.

20. The wireless power transmitter of claim 19 wherein the characteristics of one or more of the plurality of wireless power receivers include whether the power receiver(s) include(s) circuitry for controlling power flow to a load of the receiver(s).

21. The wireless power transmitter of claim 19 wherein the controller is configured to transfer power to two or more of the plurality of wireless power receivers simultaneously in the second mode.

22. The wireless power transmitter of claim 6, wherein the controller is configured to, prior to the energising one or more of the plurality of transmitter coils, determine which one or ones of the plurality of transmitter coils to energise based on information received from one or more of the plurality of wireless power receivers as to a measure of signal strength received by the receiver(s) from each respective energised one of the plurality of transmitter coils.

* * * * *